United States Patent
Chang et al.

(10) Patent No.: US 12,425,203 B2
(45) Date of Patent: Sep. 23, 2025

(54) SECURING SECRETS AND THEIR OPERATION

(71) Applicants: Mingtai Chang, Los Angeles, CA (US); Lin Zhan, Shanghai (CN)

(72) Inventors: Mingtai Chang, Los Angeles, CA (US); Lin Zhan, Shanghai (CN)

(73) Assignees: Mingtai Chang, Los Angeles, CA (US); Lin Zhan, Shanghai (CN)

( * ) Notice: Subject to any disclaimer, the term of this patent is extended or adjusted under 35 U.S.C. 154(b) by 91 days.

(21) Appl. No.: 18/277,027

(22) PCT Filed: Feb. 11, 2022

(86) PCT No.: PCT/US2022/016240
§ 371 (c)(1),
(2) Date: Aug. 11, 2023

(87) PCT Pub. No.: WO2022/174122
PCT Pub. Date: Aug. 18, 2022

(65) Prior Publication Data
US 2024/0405980 A1    Dec. 5, 2024

Related U.S. Application Data

(60) Provisional application No. 63/148,142, filed on Feb. 11, 2021.

(51) Int. Cl.
*H04L 9/08* (2006.01)

(52) U.S. Cl.
CPC .......... *H04L 9/0863* (2013.01); *H04L 9/0841* (2013.01)

(58) Field of Classification Search
CPC ............................ H04L 9/0863; H04L 9/0841
USPC .......................................................... 713/184
See application file for complete search history.

(56) References Cited

U.S. PATENT DOCUMENTS

| | | | | |
|---|---|---|---|---|
| 8,020,005 | B2* | 9/2011 | Mani ................ | G07C 9/37 713/182 |
| 8,837,741 | B2* | 9/2014 | Hawkes ............ | H04L 63/067 380/283 |
| 9,418,242 | B2* | 8/2016 | Spalka ............. | H04L 9/30 |
| 10,114,966 | B2 | 10/2018 | Narayanaswamy et al. | |

(Continued)

OTHER PUBLICATIONS

[No Author Listed] [online], "Threat Models—Hardware Wallet Research #1," Live Overflow, Jan. 4, 2019, retrieved on Sep. 3, 2024, retrieved from URL <https://www.youtube.com/watch?v=MoGzPQhwW9s>, 10 pages with machine transcipt.

(Continued)

*Primary Examiner* — Samson B Lemma
(74) *Attorney, Agent, or Firm* — Fish & Richardson P.C.

(57) ABSTRACT

Methods, systems, and apparatus, including computer programs encoded on computer storage media, for providing secure protection of secrets. In some implementations, a passphrase and data corresponding to an authenticatable entity are received. An entropy extender is generated based at least on the data associated with the authenticatable entity. A key pair is generated using the passphrase and the entropy extender, the key pair comprising a public key and a private key. An identifier is generated using data from the public key, wherein the identifier maps to a file for storing content related to the authenticatable entity.

21 Claims, 20 Drawing Sheets

(56) References Cited

U.S. PATENT DOCUMENTS

| | | | |
|---|---|---|---|
| 11,032,075 B2* | 6/2021 | Le Saint | H04L 9/0891 |
| 11,057,193 B2* | 7/2021 | Kuang | H04L 9/085 |
| 2007/0150747 A1 | 6/2007 | Mani et al. | |
| 2013/0243194 A1 | 9/2013 | Hawkes et al. | |
| 2014/0189372 A1 | 7/2014 | Spalka et al. | |
| 2016/0065370 A1* | 3/2016 | Le Saint | H04L 9/321 |
| | | | 713/155 |
| 2016/0277368 A1* | 9/2016 | Narayanaswamy | H04L 63/123 |
| 2020/0374113 A1 | 11/2020 | Noam et al. | |
| 2021/0036840 A1* | 2/2021 | Kuang | H04L 9/0869 |
| 2022/0103369 A1* | 3/2022 | Adams | H04L 9/3234 |

OTHER PUBLICATIONS

Academy.moralis.io [online], "Silk Road, Ross Ulbricht and 1HQ3Go3ggs8pFnXuHVHRytPCq5fGG8Hbhx," Jan. 10, 2021, retrieved on Sep. 6, 2024, retrieved from URL <https://academy.moralis.io/blog/silk-road-ross-ulbricht-and-1hq3go3ggs8pfnxuhvhrytpcq5fgg8hbhx>, 26 pages.

Ai-fi.net [online], "Ai-Fi Counterseal Wallet," available on or before Nov. 27, 2020, via Internet Archive: Wayback Machine URL <https://web.archive.org/web/20201127195050/https://ai-fi.net/help/countersealwallet.html>, retrieved Sep. 4, 2024, retrieved from URL <https://ai-fi.net/help/countersealwallet.html>, 18 pages.

Ai-Fi.net [online], "Best Ai-Fi Security Practices," Nov. 1, 2021, retrieved on Sep. 5, 2024, retrieved from URL <https://ai-fi.net/aifiwebblog/best%20ai-fi%20security%20practices.html>, 14 pages.

Ai-Fi.net [online], "Crypto Wallets," May 2021, retrieved on Sep. 5, 2024, retrieved from URL <https://ai-fi.net/aifiwebblog/survey.html>, 18 pages.

Ai-fi.net [online], "Secrets in Plain Sight," available on or before Oct. 20, 2020, via Internet Archive: Wayback Machine URL <https://web.archive.org/web/20201020144229/https://ai-fi.net/help/anonymouscloudstorage.html>, retrieved on Sep. 4, 2024, URL <https://ai-fi.net/help/anonymouscloudstorage.html>, 16 pages.

Ankel et al., "Top cryptocurrency scams of 2019—and how most hackers got away with it," Business Insider, Dec. 27, 2019, 11 pages.

Arstechnica.com [online], Intel SGX defeated yet again—this time thanks to on-chip power meter, Nov. 10, 2020, retrieved on Sep. 4, 2024, retrieved from URL <https://arstechnica.com/information-technology/2020/11/intel-sgx-defeated-yet-again-this-time-thanks-to-on-chip-power-meter/>, 10 pages.

Bitcoinelectrum.com [online], "How to spend from an offline paper wallet using Electrum," available on or before Nov. 12, 2020, via Internet Archive: Wayback Machine URL <https://web.archive.org/web/20201112033645/https://bitcoinelectrum.com/how-to-spend-from-an-offline-paper-wallet-using-electrum/>, retrieved on Sep. 4, 2024, URL<https://bitcoinelectrum.com/how-to-spend-from-an-offline-paper-wallet-using-electrum/>, 3 pages.

Castellucci, "Cracking Cryptocurrency Brainwallets," Presentation, Presented at DEF CON 23 Conference, Aug. 31, 2015, 60 pages.

Certificate transparency.dev [online], "Working together to detect maliciously or mistakenly issued certificates," available on or before Oct. 28, 2020, via Internet Archive: Wayback Machine URL <https://web.archive.org/web/20201028051637/https://certificate.transparency.dev/>, retrieved on Sep. 4, 2024, retrieved from URL <https://certificate.transparency.dev/>, 6 pages.

Chiaravalloti [Online], "Techniques of Enhance Learning and Memory," Talk was given at a TEDx Herndon event, Aug. 2, 2016, retrieved on May 6, 2024, retrieved from URL <https://www.youtube.com/watch?v=JbLAGpQ9RXg>, 1 page [Video Submission].

Cimpanu [online], "Exclusive: Google removes 49 Chrome extensions caught stealing crypto-wallet keys," Apr. 14, 2020, retrieved on Sep. 4, 2024, retrieved from URL <https://www.zdnet.com/article/exclusive-google-removes-49-chrome-extensions-caught-stealing-crypto-wallet-keys/>, 7 pages.

Comm, "Why Cryptocurrency is Still Secure Despite the Hackers," readwrite, Dec. 19, 2019, 4 pages.

Counterseal.net [online], "Ai-Fi Incognito Cloud," available on or before Apr. 15, 2021, via Internet Archive: Wayback Machine URL <https://web.archive.org/web/20210415170614/https://counterseal.net/>, retrieved Sep. 6, 2024, retrieved from URL <https://counterseal.net/>, 8 pages.

Crackstation.net [online], "Salted Password Hashing—Doing I Right," available on or before Jan. 14, 2021, via Internet Archive: Wayback Machine URL <https://web.archive.org/web/20210114123354/https://crackstation.net/hashing-security.htm>, retrieved on May 7, 2024, URL <https://crackstation.net/hashing-security.htm>, 10 pages.

Dailyalts.com [online], "Digital Assets: DOJ Seizes Bitcoin Worth $1B, Allegedly Linked to Silk Road," Nov. 6, 2020, retrieved on Sep. 4, 2024, retrieved from URL <https://dailyalts.com/doj-seizes-bitcoin-worth-1b-allegedly-linked-to-silk-road/>, 7 pages.

Decrypt.com [online], Bitcoin Holder Loses $16 Million in BTC to Well-Known Scam, Aug. 31, 2020, retrieved on Sep. 6, 2024, retrieved from URL <https://decrypt.co/40253/bitcoin-holder-loses-16-million-in-btc-to-well-known-scam>, 9 pages.

Decrypt.com [online], Electrum Malware Scam Scalps $32,000 in Bitcoin, Nov. 13, 2020, retrieved on Sep. 3, 2024, retrieved from URL <https://decrypt.co/48123/electrum-malware-scam-scalps-32000-in-bitcoin>, 9 pages.

Docs.bnbchain.org [online], "BNB Chain: Empowering the Future of Decemtralized Applications," upon information and belief, available No. later than Dec. 11, 2021, retrieved on Oct. 3, 2024, from URL <https://docs.bnbchain.org/>, 3 pages.

Docs.bnbchain.org [online], "BNB Chain: An Ecosystem of Blockchains," upon information and belief, available no later than Dec. 11, 2021, retrieved on Oct. 3, 2024, URL <https://docs.bnbchain.org/docs/overview/>, 3 pages.

Drozhzhin [online], "How to hack a hardware cryptocurrency wallet," Jan. 10, 2019, retrieved on Sep. 3, 2024, retrieved from URL <https://www.kaspersky.com/blog/hardware-wallets-hacked/25315/>, 15 pages.

Enm178.github.io [online], "Online Tools," available on or before Jan. 5, 2021, via Internet Archive: Wayback Machine URL <https://web.archive.org/web/20210105163005/https://emn178.github.io/online-tools/sha256.html>, retrieved on May 6, 2024, URL <https://emn178.github.io/online-tools/sha256.html>, 2 pages.

Gennaro et al., "Fast multiparty threshold ECDSA with fast trustless setup," Presented at the Proceedings of the 2018 ACM SIGSAC Conference on Computer and Communications Safety, Toronto, Ontario, Canada, Oct. 15-19, 2018, pp. 1179-1194.

Github.com [online], "Bitcoin Hardware Wallet Interface," April 6, retrieved on Sep. 4, 2024, retrieved from URL <https://github.com/bitcoin-core/HWI?tab-readme-ov-file#readme>, 5 pages.

Guinnessworldrecord.com [online], "Greatest Robbery of a Bank," available on or before Dec. 5, 2020, via Internet Archive: Wayback Machine URL <https://web.archive.org/web/20201205225331/https://www.guinnessworldrecords.com/world-records/greatest-robbery-of-a-bank?fb_comment id-816657355038351_970675476303204>, retrieved Sep. 3, 2024, retrieved from URL <https://www.guinnessworldrecords.com/world-records/greatest-robbery-of-a-bank?fb_comment_id=816657355038351_970675476303204, 4 pages.

Hackaday.com [online], "Hacking Hardware Bitcoin Wallets: Extracting the Cryptographic Seed from a Trezor," Feb. 4, 2021, retrieved on May 7, 2024, retrieved from URL <https://hackaday.com/2021/02/04/hacking-hardware-bitcoin-wallets-extracting-the-cryptographic-seed-from-a-trezor/>, 15 pages.

Help.myetherwallet.com [online], "Advice and answers from the MyEtherWallet Team," available on or before Oct. 1, 2021, via Internet Archive: Wayback Machine URL <https://web.archive.org/web/20211001182938/https://help.myetherwallet.com/en/#%3A~%3Atext%3DHowever%2C%20the%20inaccessibility%20of%20Apple%27s%2Cinformation%20tied%20to%20one%27s%20wallet>, retrieved on Sep. 5, 2024, URL <https://help.myetherwallet.com/en/#%3A~%3Atext%3DHowever%2C%20the%20inaccessibility%20of%20Apple%27s%2Cinformation%20tied%20to%20one%27s%20wallet>, 4 pages.

International Preliminary Report on Patentability in International Appln. No. PCT/US2022/016240, mailed on Aug. 24, 2023, 2 pages.

International Search Report and Written Opinion in International Appln. No. PCT/US2022/016240, mailed on Jul. 7, 2022, 13 pages.

(56) References Cited

OTHER PUBLICATIONS

Invitation to Pay Additional Fees in International Appln. No. PCT/US2022/016240, mailed on Apr. 27, 2022, 2 pages.
Itsfoss.com [online], "Tiny Yet Useful: 14 Raspberry Pi Zero Alternatives That Cost Less Than $20," Feb. 8, 2024, retrieved on Sep. 4, 2024, retrieved from URL <https://itsfoss.com/raspberry-pi-zero-alternatives/>, 32 pages.
Kingsley-Hughes [online], "5 iPhone security settings you should check right now," Jul. 4, 2020, retrieved on Sep. 5, 2024, retrieved from URL <https://www.zdnet.com/article/5-iphone-security-settings-you-should-check-right-now/>, 8 pages.
Medium.com [online], "Creating a client-side encryption system," Mar. 12, 2018, retrieved on May 7, 2024, retrieved from URL < https://medium.com/passpill-project/creating-a-client-side-encryption-system-aaa601b4ad35>, 17 pages.
Medium.com [online], "Hardware wallet attacks and defenses," Mar. 13, 2019, retrieved on Sep. 3, 2024, retrieved from URL <https://medium.com/@trussywallet/hardware-wallet-attacks-and-defenses-609c0d1babfc>, 9 pages.
Minilock.io [online], "File encryption software that does more with less," available on or before Dec. 3, 2020, via Internet Wayback Machine URL <https://web.archive.org/web/20201203092349/https://www.minilock.io/>, retrieved on Sep. 3, 2024, retrieved from URL <https://www.minilock.io/>, 1 page.
Mitzenmacher et al., "Why Simple Hash Functions Work: Exploiting the Entropy in a Data Steam," InSODA, Jan. 20, 2008, 8:746-755.
Moghimi et al., "TPM-Fail: TRM meets Timing and Lattice Attacks," 29th USENIX Security Symposium, Aug. 12, 2020, 2057-2073.
Moneysafebox.com [online], "Offshore deposite boxes in Austria," available on or before Feb. 20, 2020, via Internet Archive: Wayback Machine URL <https://web.archive.org/web/20200220112319/https:/moneysafebox.com/rent-safe-deposit-box-in-austria.html>, retrieved on Oct. 9, 2024 from URL <https://moneysafebox.com/rent-safe-deposit-box-in-austria.html>, 2 pages.
Ndss-symposiun.org [online], "Giving State to the Stateless: Augmenting Trustworthy Computation with Ledgers," available on or before Jan. 19, 2021, via Internet Archive: Wayback Machine URL <https://web.archive.org/web/20210119075458/https://www.ndss-symposium.org/ndss-paper/giving-state-to-the-stateless-augmenting-trustworthy-computation-with-ledgers/>, retrieved on May 7, 2024, URL <https://www.ndss-symposium.org/ndss-paper/giving-state-to-the-stateless-augmenting-trustworthy-computation-with-ledgers/>, 2 pages.
News.bitcoin.com [online], "Crypto Hardware Wallet Firm Ledger Hacked, One Million Customer Emails Exposed," Jul. 29, 2020, retrieved on Sep. 4, 2024, retrieved from URL <https://news.bitcoin.com/crypto-hardware-wallet-firm-ledger-hacked-one-million-customer-emails-exposed/#%3A~%3Atext%3D0-%2CCrypto%20Hardware%20Wallet%20Firm%20Ledger%20Hacked%2C%20One%20Million%20Customer%20Emails%2Cwere%20affected%20by%20the%20breach>, 18 pages.
Onlinehashcrack.com [online], "Professional Cloud Password," upon information and belief, available No. later than Dec. 11, 2021, retrieved on May 6, 2024, retrieved from URL <https://www.onlinehashcrack.com>, 4 pages.
Onlinehashcrack.com [online], "Cloud Password Recovery Services assisting cyber security experts," upon information and belief, available no later than Dec. 11, 2021, retrieved on May 6, 2024, URL < https://www.onlinehashcrack.com/>, 4 pages.
Salazar [Online], "8 1 Key Derivation 14 min," Dec. 3, 2012, retrieved on Sep. 3, 2024, <https://www.youtube.com/watch?v=dxtLeMOVBys>, 1 page [Video Submission].
Signal.org [online], "Technology Preview for secure value recovery," Dec. 19, 2019, retrieved on Sep. 5, 2024, retrieved from URL <https://signal.org/blog/secure-value-recovery/>, 15 pages.
Tails.net [online], "Home," upon information and belief, available no later than Dec. 11, 2021, retrieved on Sep. 5, 2024, retrieved from URL <https://tails.net/>, 7 pages.
Theguardian.com [online], "Dropbox hack leads to leaking 68m passwords on the internet," Aug. 31, 2016, retrieved on Sep. 4, 2024, retrieved from URL <https://www.theguardian.com/technology/2016/aug/31/dropbox-hack-passwords-68m-data-breach>, 3 pages.
Thenextweb.com [online], "Researcher demonstrates how vulnerable Ledger Nano S wallets are to hacking," Mar. 20, 2018, retrieved on Sep. 5, 2024, retrieved from URL <https://thenextweb.com/news/ledger-nano-s-hack-cryptocurrency>, 7 pages.
Thesslstore. Com [online], "What is an Air Gapped Computer?," Mar. 13, 2018, retrieved on May 7, 2024, retrieved from URL <https://www.thesslstore.com/blog/air-gapped-computer/>, 9 pages.
ThreatsHub.org [online], "Stick a fork in SGX, it's done: Intel's cloud-server security defeated by $30 chip and electrical shenanigans," Nov. 14, 2020, retrieved on Sep. 5, 2024, retrieved from URL <https://www.threatshub.org/blog/stick-a-fork-in-sgx-its-done-intels-cloud-server-security-defeated-by-30-chip-and-electrical-shenanigans/>, 5 pages.
W3.org [online], "Decentralized Identifiers (DIDs) v1.0," Jul. 19, 2022, retrieved on May 7, 2024, retrieved from URL <https://www.w3.org/TR/did-core/>, 113 pages.
Wikipedia.com [online], "List of Live CDs," Nov. 2, 2020, retrieved on May 7, 2024, retrieved from URL <https://en.wikipedia.org/wiki/List_of_live_CDs>, 7 pages.
Wikipedia.com [online], "Multi-signature," Mar. 21, 2021, retrieved on Sep. 5, 2024, retrieved from URL <https://en.bitcoin.it/w/index.php?title=Multi-signature&oldid=68564>, 3 pages.
Wikipedia.com [online], "Single point of failure," Jan. 24, 2021, retrieved on May 7, 2024, retrieved from URL <https://en.wikipedia.org/w/index.php?title=Single_point_of_failure>, 3 pages.
Wikipedia.org [online], "Security through obscurity," Dec. 2, 2020, retrieved on Sep. 5, 2024, retrieved from URL <https://en.wikipedia.org/wiki/Security_through_obscurity>, 5 pages.
Wikipedia.org [online], "Shoulder surfing (computer security)," Dec. 10, 2020, retrieved on Sep. 5, 2024, retrieved from URL <https://en.wikipedia.org/wiki/Shoulder_surfing_(computer_security)>, 5 pages.
Wikipedia.org [online], "Trust on first use," Nov. 20, 2020, retrieved Sep. 5, 2024, retrieved from URL <https://en.wikipedia.org/wiki/Trust_on_first_use>, 4 pages.

\* cited by examiner

FIG. 16

SECURING SECRETS AND THEIR OPERATION

CROSS-REFERENCE TO RELATED APPLICATION

This specification claims the benefit of U.S. Provisional Application No. 63/148,142 filed Feb. 11, 2021, and titled "Method for Securing Secret and their Operations," which is incorporated herein by reference in its entirety.

TECHNICAL FIELD

This specification relates generally to providing secure storage, protection, and operations of secrets.

BACKGROUND

Public key cryptography commonly relies on private-public key pairs for encryption and decryption of digital data according to various cryptographic algorithms. Effective security requires keeping the private key private, although the public key can be openly distributed. However, public key cryptography is susceptible to security vulnerabilities from a range of untargeted and targeted attacks.

SUMMARY

The techniques described in this specification provide, among other things, systems and methods for mitigating a class of vulnerabilities of conventional secret safekeeping approaches caused by either the lack of entropy strength or structural weaknesses exposing some single point of failure (SPOF). Based on the application requirements, minimal entropy strength of user inputs can be enforced and further enhanced by certain entropy extending mechanisms. Contents of secrets can be distributed to multiple components, the joint operations of which result in a complete defined operation performed based on the contents of various transaction requests. Each of the components, either hardware or software, can store various keys and transactional data, which ultimately eliminates critical single points of failure. Specifically, the components can store private keys, contents of data relevant to a user, transaction operating information, signing logic, and other information.

Another dimension of the subject matter disclosed herein involves adapting components into "Live Devices", frequently built with bootable SD, CD, DVD, CD-ROM or DVD-ROM containing a bootable operating system and the transactional logic without the transactional data (such as private keys), which is to be retrieved during session start-up. To support the live stateless systems on various devices, the operational context of prior sessions is to be securely retrieved from some external storage. This specification contains a foundational component method by the name of Personal Entropy eXtending (PEX) token, Token or token (if not further qualified) for short, which is protected by a cryptographic key pair of any desired entropy (number of random bits), combining a human readable passphrase of enforced strength and a client-side entropy enhancing random string of arbitrary length (akin to the concept of cryptographic "salt"). The PEX token is also referenced as Crypton, Crypton token, Crypton Token, Krypton, Krypton token or Krypton Token. The term "Krypton" herein indicates the same as the term "Crypton." With this foundational Token component, a method may be structured into sessions that serialize the operations in time scale with periodic checkpoints (in terms of the state variables collected in a token) that partitions all transactions into clusters or sessions of transactions and the inactivity period between clusters when all transactions are terminated or completed. As long as the state variable data consistently collected at checkpoints are correctly stored in PEX tokens, the logic may remain stateless between sessions and restart running "live" with constant code checksum as described before and recover its prior state correctly based on Tokens. More on sessions will be described later.

For self-contained threat management without relying or outsourcing the defense to third-parties, the following guidelines can be observed: Eliminate all single points of failure by adopting redundant components, distributing critical components into multiple composites, and integrating extraneous components such as a recovery seed into the mainline of the method. Build up the defenses from bottom up in layers, starting from trustworthy enclaves. This may involve, but not limited to, hardware mechanisms such as dedicated hardware, SGX and TEE designs, etc. Critical state information in the enclave may be stored on device or off device to the companion redundant units or external immutable ledgers. A highly effective design is to run critical methods from "live" systems, which are clean and free of exploits at startup. To realize these embodiments the "live" components must be driven cleanly through careful isolation and preservation of state variables, which must be preserved between sessions. (The PEX tokens are invented for this purpose.)

Optionally, human operators can be involved for critical operational data entry or confirmation: For those lock and key method utilized in this specification, if the PEX token scheme is adopted for formulating the key, the required password/passphrase prior to key derivation is entered from memory with guaranteed presence of the key possessor/owner.

To ward off hidden malware and clandestine attacks, critical operational steps, such as crypto transaction signing, operator authentication data entry and confirmation (such as PIN code entry), etc., may be optionally configured to require the proof of a secret possessor's presence through specified human interface that demands operator confirmation by manual keystrokes. Confirmation through operator inputs, fingerprinting entry, biometric inputs, etc., is all acceptable verification if the underlying utility software is considered trustworthy.

For crypto transactions, the sender/recipient account identification and involved amount are displayed and confirmation required. For zero-day attacks, this is the last line of defense. This can also be an effective means of discovering phishing attempts or hardware tampering. Construct firewalls and sandboxes for devices to be protected. Round up all vulnerable or attackable elements and enclose them within a protected perimeter allowing access only to specified and managed egress/ingress gateways with firewall rules enforced. Implement penetration test, malware-infection testing (virus scanner) and vulnerability discovery (security audit) within the protected perimeter.

In one general aspect, a method is performed by a server. The method includes: receiving, by one or more processors, a passphrase and data corresponding to an authenticatable entity; generating, by the one or more processors, an entropy extender based at least on the data associated with the authenticatable entity; generating, by the one or more processors, a key pair using the passphrase and the entropy extender, the key pair comprising a public key and a private key; and generating, by the one or more processors, an identifier using data from the public key, wherein the identifier maps to a file for storing content related to the authenticatable entity.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation causes the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes storing, by the one or more processors, data associated with the identifier with a plurality of identifiers; and in response to successfully storing the data associated with the identifier, providing, by the one or more processors, data indicating a type of storing of the data identifying the identifier.

In some implementations, the method includes wherein (i) the passphrase is a human readable passphrase and (ii) the data corresponding to the authenticatable entity is at least one of an email address, a telephone number, a social security number, and a random identifier.

In some implementations, the method includes wherein generating the key pair based on the passphrase and the entropy extender further comprises: evaluating, by the one or more processors, a strength of the passphrase, wherein the strength is based on a configured strength requirement; determining, by the one or more processors, the strength of the passphrase satisfies the configured strength requirement; generating, by the one or more processors, the entropy extender that comprises at least one of the passphrase and the data representing the authenticatable entity based on the strength of the passphrase satisfying the configured strength requirement; generating, by the one or more processors, a set of inputs to a KDF that comprises the passphrase and the entropy extender using multiple iterations of cryptographic calculations; and generating, by the one or more processors, the key pair comprising the public key and the private key from the results of KDF.

In some implementations, the method includes wherein generating the identifier using the data from the public key further comprises: generating, by the one or more processors, the identifier by transforming the public key; and mapping, by the one or more processors, the identifier to a name of the file that stores content associated with the authenticatable entity.

In some implementations, the method includes wherein storing the data associated with the identifier further comprises: generating, by the one or more processors, a key associated with the identifier by performing a function associated with a Diffie Hellman scheme that encrypts the data associated with the identifier and enables forward secrecy; and storing, by the one or more processors, the data associated with the identifier with other hashed representations corresponding to each identifier of the plurality of identifiers.

In some implementations, the method includes storing, by the one or more processors, the data associated with the identifier based on a type of operation included in the received request, wherein the type of operation comprises a create operation or a write operation.

In some implementations, the method includes wherein storing the data associated with the identifier comprises storing an entry in a log file containing each identifier of the plurality identifiers.

In some implementations, the method includes wherein the authenticatable entity can include at least one of an individual, a group, an account holder, and an organization.

In some implementations, the method includes generating, by the one or more processors, a first wallet that enables interfacing with a transactional network and data in the first wallet is protected by a first seal and a corresponding identifier; generating, by the one or more processors, a plurality of second wallets, each second wallet storing a component of data for a requester and each second wallet is protected by a second seal and a corresponding identifier, wherein the first wallet and the second wallet can communicate; receiving, by the one or more processors, a request to access at least one second wallet of the plurality of second wallets from the requester, wherein the request includes the corresponding identifier to access the first seal of the first wallet and the corresponding identifier to access the second seal of the second wallet; and granting, by the one or more processors, access to the data within the plurality of second wallets based on the identifiers being used to unseal the first wallet and the second wallet.

In some implementations, the method includes wherein the plurality of second wallets are structured as a live system, and the method comprises: authenticating, by the one or more processors, the authenticatable entity with the live system using an additional token based on the passphrase and the entropy extender.

In some implementations, the method includes wherein generating the key pair using the passphrase and the entropy extender further comprises: generating, by the one or more processors, a seed based on the entropy extender and the passphrase, wherein the seed is associated with a wallet of the authenticatable entity; and generating, by the one or more processors, the key pair based on the generated seed.

In some implementations, the method includes deriving, by the one or more processors, the passphrase from biometric data recorded from the authenticatable entity.

In another general aspect, a method is performed by a server. The method includes: receiving, by one or more processors, a first authentication input and a second authentication input, wherein the first authentication input provides a first source of entropy and the second authentication input provides a second source of entropy distinct from the first source of entropy, wherein the first authentication input and the second authentication are both secrets of an authenticatable entity; generating, by the one or more processors and using the first authentication input and the second authentication input, a key pair for the authenticatable entity, the key pair comprising a public key and a private key; generating, by the one or more processors, a token identifier using data from the public key; generating, by the one or more processors, a digital signature of a message by encrypting the message using the private key from the key pair of the authenticatable entity, wherein the message comprises the token identifier or data derived from the token identifier; and submitting, by the one or more processors, the token identifier and the digital signature to a server system, wherein the remote system is configured to authenticate the authenticatable entity using the digital signature, and the remote system is further configured to map the token identifier to a file associated with the authenticatable entity in response to a successful authentication of the authenticatable entity.

In some implementations, the method includes wherein the first authentication input and the second authentication input are both entered by a user who is the authenticatable entity or who is an agent of the authenticatable entity.

In some implementations, the method includes wherein the second authentication input comprises an entropy extender for enhancing the first source of entropy of the first authentication input.

In some implementations, the method includes wherein authenticatable entity maintains data representing the second authentication input as a secret separately from the secret for the first authentication input.

In some implementations, the method includes wherein the first authentication input and the second authentication input correspond to different qualitative categories of inputs.

In some implementations, the method includes wherein the first authentication input is a passphrase and the second authentication input corresponds to one or more biometric features associated with the authenticatable entity.

In some implementations, the method includes wherein the one or more processors are processors of a client device.

In some implementations, the method includes wherein generating the key pair comprises combining the first authentication input and the second authentication input, generating a seed from the first authentication input and the second authentication input, and deriving the key pair based at least in part on the seed.

In some implementations, the method includes wherein the remote system is configured to authenticate the digital entity using the public key to decrypt the digital signature.

In some implementations, the method includes wherein the file is indexed by the token identifier.

In some implementations, the method includes wherein the remote system is a distributed system.

In some implementations, the method includes wherein the remote system never receives the first authentication input, the second authentication input, or a seed derived from the first authentication input and the second authentication input.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5-19 are diagrams that illustrate example components of a system for generating a PEX token.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
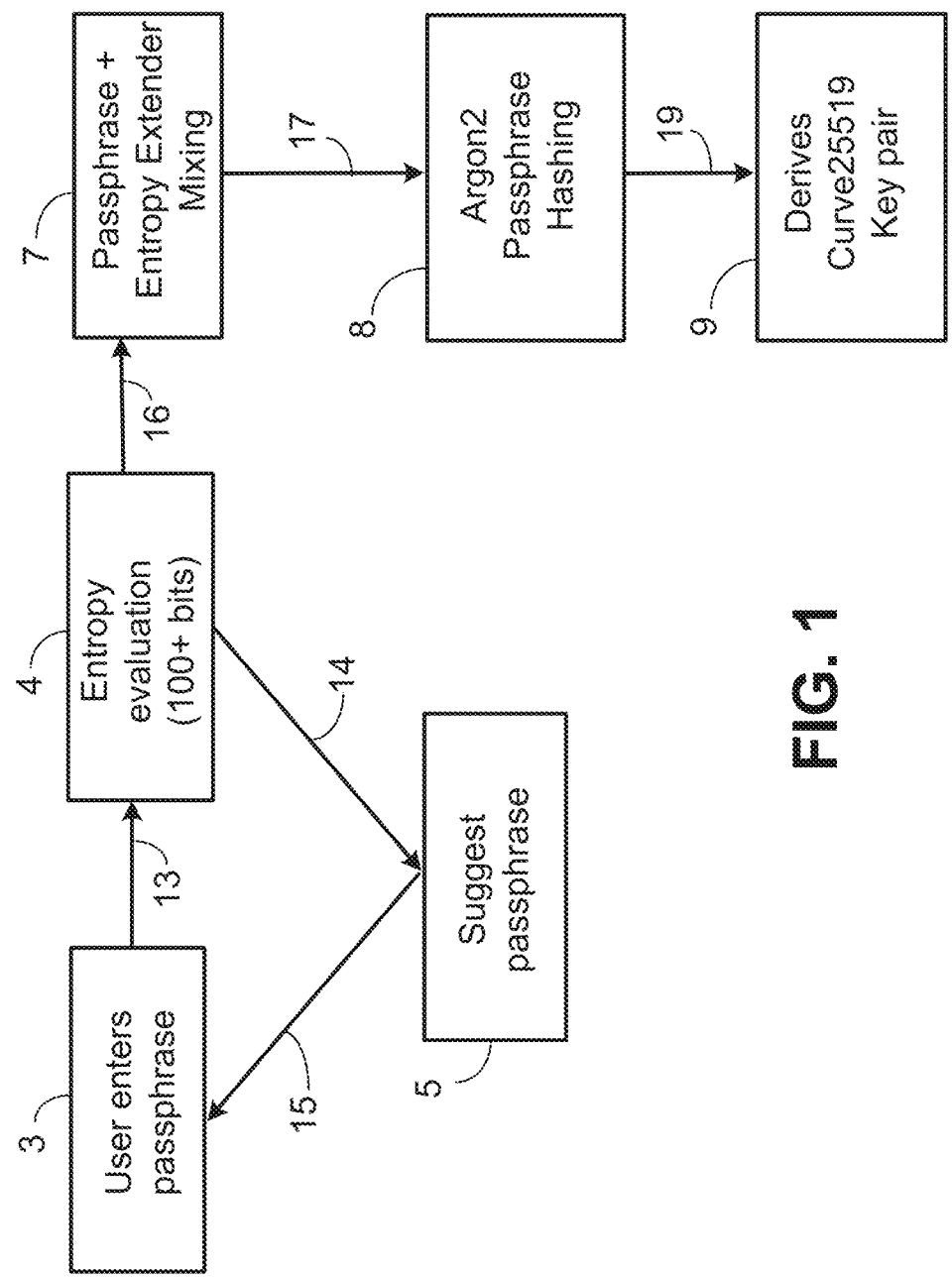
FIG. 1 is a block diagram that illustrates an example of a system for generating a PEX token.

Cryptocurrencies, such as BITCOIN, ETHEREUM, TETHER, XRP, etc., are digital assets that apply encryption techniques to publicly regulate the generation of crypto coins and verify the transfer of funds in a decentralized and trustless manner based on community consensus. The crypto investors have total control over their own transactions along with the cost savings and convenience in managing their financial assets. However, this pseudonymous, near instant and low-cost manner of transacting assets come at a cost. The advantage of complete control is traded off against the lack of protection and little oversight from any governmental institutions in risk mitigation. This decentralized market exposes individual investors to much graver financial perils without any safety net to fall back to. A case in point is how your financial transactions are protected. The personal liability of any credit card fraud is less than $50 once confirmed, whereas the damage of a crypto theft could be catastrophic and total.

As a consequence, hacking on crypto assets has exploded into a crime syndicate. In the unfortunate event that the private keys of your BITCOINs are compromised, the attacker can steal all your coins remotely and tracelessly without repercussion. Managing one's cryptocurrencies is not for the faint of heart. It all boils down to the protection of your private keys for all your crypto holdings. As the famous expression goes, Not your Keys, Not your Coins.

To figure out how our crypto holdings ought to be protected, we must first understand the nature of the beast. Although we are dealing with "digital assets" when we participate in the cryptocurrency market, similar to the digital fiat assets or the non-cash money, our exposure to risks and the crime prevention services available to us are much different. We no longer deal with financial institutions through banking or investment accounts, but face the task of managing our private "ledgers" ourselves in terms of blockchain transactions and crypto trading accounts. Minimally, we must first educate ourselves on how our crypto accounts are typically maintained and protected without involving any third-party financial institutions. No amount of computing power on one's computing devices or publishing transactions on immutable ledger would automatically offer an alternative safety net.

It is apparent that we are entering a brave new world of self-managed and decentralized markets of digital assets without the protective umbrella offered by various financial institutions we have been relying on. Regardless of how promising it may be, for most of us this new world is outside of our comfort zone. To find our way around it, we tend to relate those new crypto products and concepts to something we are accustomed to. However, this attempt so far seems to have misled rather than illuminated. When we first ventured into this field, as an introduction, we are told to acquire a "wallet," which can be "soft" running on standard PCs or mobile devices, or "hard" if we want to safeguard it with some "stronger" purposely-designed hardware to fend off "attacks." Then there is the notion of "Recovery Seeds," which would save you from ruin if your crypto wallet was lost, stolen, or "compromised" by a plethora of devastating possibilities.

However, unlike traditional wallets for holding paper money, credit/debit cards, driver's license, etc., a crypto wallet holds nothing tangible but implements an interface for crypto data to work with the external blockchain. The "Hardware Wallet" is not a crypto wallet in the sense of that previously defined, but a separate storage on dedicated hardware that peels off private keys and other functions from a regular "soft" wallet for signing blockchain transactions. The hardware wallet is rarely standalone and almost always requires an external "soft wallet" or "bridge" (Trezor) for dealing with the blockchain and its consensus network, in which case that external "wallet" or bridge is described as "watch-only" (but not necessarily harmless). For fear of losing the secrets, they further create a "Recovery Seed," which is the passphrase/mnemonics based on which all secrets in the wallet may be reconstructed. So in addition to the need to secure our private keys in the wallet, we must also protect the recovery seeds as a separate task, which are usually "strongly suggested" to be kept in an unspecified safe place. This recovery seed effectively doubles the attack surface of the original wallet. It would be game over if either the wallet was lost or the Recovery Seed compromised.

The description and naming of the concept of wallet and recovery seed are quite inaccurate and problematic. Crypto assets are intangibles. They operate under the PKI (Public Key Infrastructure) framework. A crypto account for storing cryptocurrencies is protected by a key pair: the public key and its associated private key. Although we use the word "key" to describe them, they are not to be confused with the hardware objects of locks and keys in the real world. A casual glimpse of the private key will confer the ownership upon the viewer if they choose to act on it. They are best described as "secrets," the mere sighting or viewing of which steals or cancels them. We tend to use words like "wallet, "safe," "vault" to describe how we store our private keys, which forms the wrong mental imagery for our non-tangible secrets. Worse yet, as will become clear later, misinformed concepts beget incorrect actions.

The concept behind crypto wallets is more akin to the magical Aladdin lamps, the "rubbing" of which with a PIN code or password would set off the escape of the Genie inside. A casual glimpse of the secrets inside the wallet may cause them to lose their magic power (or internal crypto values) without altering the bits and bytes of what the wallet is constructed of. There is no way to tell if a wallet retains its value or not by staring at it. With this more accurate imagery of the magic Aladdin lamp and the fragile PIN code, it allows us to create and measure our protection strategies in a new light. The hardware wallets are preferably portable, given that the PIN is usually inadequate to ward off persistent offline attacks, especially when the PIN code entry throttling logic fails. The owner is best not to leave the hardware wallet out of sight. The "Recovery Seed," when stored separately, needs the same tender care. In other words, to do it right, for those risk-averse individuals or those with substantial crypto holdings to preserve, the correct practice is to carry their hardware wallets in their pockets along with their recovery seeds before a more user-friendly approach can be found. To store those Recovery Seeds in cold storage offline is fundamentally flawed. To convince oneself of this point of concern, just picture our leaving behind our Aladdin lamp at home with feeble rubbing tricks (PIN) that would allow the Genie to pop out. To top it off, some users leave two lamps (the wallet and the Recovery Seed) both in the "secure" confines of their home, with the "Recovery Seed" usually recorded on a suggested "acid-free" paper or notebook barely protected.

Protection of Secrets

A secret protection method is to preserve and protect valuable secrets from being revealed to unintended parties. The leaking of a secret will turn the secret into a non-secret and lead to irreparable damages which the secrecy is originally designed to prevent. Leaking a safe combination may cause the loss of the safe's content. Leaking one's password to a web service or computing devices may lead to the loss of digital content hidden behind the various application lock screens. Leaking the private keys within a BITCOIN wallet results in the BITCOINs in the wallet to be stolen.

Under the PKI (Public Key Infrastructure) the secrets mostly involve private keys of the PKI key pairs, which are the basic construct for conducting cryptographic key exchange or negotiation, producing crypto transaction signatures, authenticating the identity of the owner of the private keys, etc. Those private keys may be randomly generated, or derived through some algorithms based on the originating passwords, such as those in the PBKDF2 key derivation function. For ease of key derivation or administration in the crypto wallet application scenarios, a single "seed" secret or key may be utilized to derive the rest of the keys in the wallet through an algorithm. BIP 0032 is one such standard algorithm.

Attack Targeting

There are two types of attack: untargeted and targeted. Untargeted attacks are generally online—only, lacking specificity and costing little to launch. Targeted attacks are specific to identified targets or individuals, potentially involving manual background investigation and even offline measures (theft, home invasion, etc.) on high-value marks. Targeted attacks naturally entail higher cost, to be justified by the potential return on investment. Untargeted attacks may be launched to discover vulnerable or high-value targets and progress into a targeted one in the follow-on stages. Phishing attacks and password guessing have a much higher chance of success if the target or mark is locked in, albeit at a higher cost to launch.

Single Points of Failure

A single point of failure (SPOF) is a part of a system that, if it fails, will stop the entire system from working. SPOFs are undesirable in any system with a goal of high availability or reliability, be it a business practice, software application, or other industrial system. It is a well-understood concept in reliability engineering. This specification offers a method that mitigates a class of structural vulnerabilities that exposes all currently available secret safekeeping approaches to SPOF. Here we use crypto wallets as examples for presenting the method of our application, as they are popular mechanisms for protecting valuable secrets.

Under the crypto wallet application scenarios, those keys in the wallet are typically protected by one of the following methods:

Software Wallet: A software wallet combines the PKI key materials with the crypto transaction signing functions into a single software package, which may run independently as an "app," or be embedded in a web page (web wallet).

Hardware Wallet: A hardware wallet separates the functions of a software wallet into two part: the "front-end" wallet, which interfaces directly with the blockchain network and a separate back-end "key vault," a custom designed hardware which houses all the private keys and is dedicated to sign all the crypto transactions. Sometimes this can be built on a simple bootable device of USB or CD ROM with weaker protection.

Front-End Wallet: As mentioned above, due to the complexity of blockchain interfaces and specific crypto transactions, the Front-End wallet is the assembly of functions that deal with the blockchain servers. The open-sourced Electrum is one such wallet that supports Blockchain. It may be made into a "watch only" wallet as a conduit for crypto transactions with keys residing and operating in separate external devices.

Figure 2:
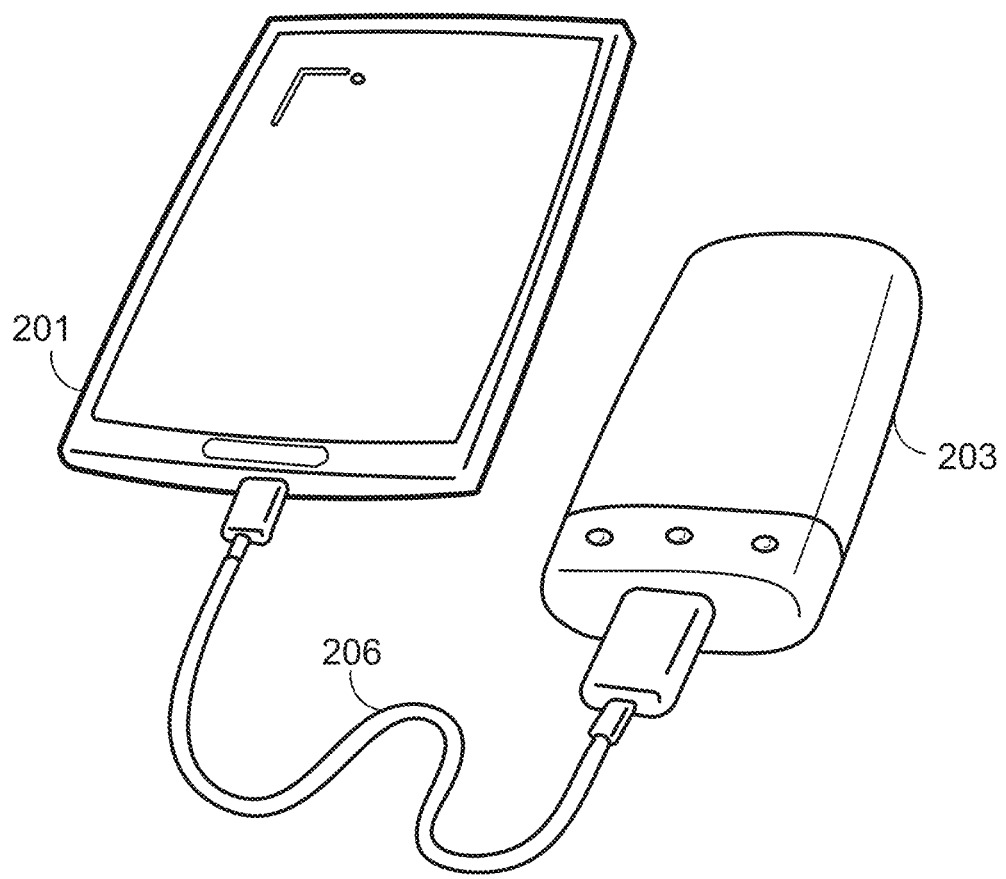
FIG. 2 is a block diagram that illustrates an example of a system for storing keys based on a separate front-end wallet and hardware wallet.

In FIG. 2 of the drawings, the Front-End wallet, says Electrum, is on the device 201, embodied in a smartphone. The hardware wallet 203 is embodied in a dedicated hardware device (e.g. Ledger, Trezor, etc.).

The interface 206 between the Front-End wallet and its hardware back-end may be through some wired (e.g. USB) or wireless (e.g. Wi-Fi, Bluetooth) means, in which case a "pairing" step needs to take place before both wallets may cooperate with each other. It may also be "air-gapped", in which case the hardware wallet may be off the network altogether and the communication are conducted through some manual means such as copy-and-paste across devices, 2D barcodes or QR codes, etc., which reduces the attack surface but is by no means attack proof.

Presently all popular crypto wallets suffer a variety of "single points of failure" of one kind of another, which is defined as a vulnerability in a method which can be exploited to defeat the complete assembly of protection mechanisms by focusing on attacking a single component, usually running on a single device. Once the targeted component is compromised, some or all secrets held and protected by the method may be revealed to the perpetrator in totality. Once a "single point of failure" of a crypto wallet was successfully exploited and some or all of the private keys are revealed, valuable cryptocurrencies stored inside the wallet would be stolen. Some attacks don't result in the loss of secrets but inflicting a denial of service attack designed to hijack some resources (e.g. private keys) or make them unusable (e.g. by encrypting them) in order to effect a follow-on ransom demand.

The typical targets of attacks on crypto wallets are: the password of the software wallet and the PIN code of the software/hardware wallet.

The private keys are stored in the wallet but exposed during transmission and during the operations for effecting a certain function set (transaction signing, status listing, outstanding balance display, etc.)

The recovery seed or passphrase, which is recorded outside of the wallet for recovery purposes. A successful attack on this recovery seed would spell the loss of all the private keys, hence the complete loss of the coins in the wallet. Although the recovery seed or passphrase may adopt certain external scheme to eliminate its single point of failure, such as the SSS (Shamir' Secret Sharing scheme) allowing splitting the seed into multiple "shares," it requires many more secrets to be hidden and substantially reduces the reliability of the whole method (combing the wallet with the SSS). Besides, storing a secret offline or offsite is inherently problematic, as there is generally no monitoring or auditing apparatus/method to guarantee its safety, as the loss event of a secret is usually not accompanied with a physically discernable symptom.

In some implementations, the passphrase can be derived from biometric data. For example, the token can include specification of mapping rules that map biometric data into fixed strings or symbols that may become part of the passphrase, Entropy Extender or both to further extend the entropy without relying on memorization, paper copies, and other recording devices, exclusively. This also effectively increases the dimensions of multi-factor authentication schemes.

Seed/passphrase splitting implies that the original string before splitting is derived from a single key space, which may not be uniform for the pseudo random function or biased towards the application key space. It may not look random and must be remedied to ward off possible hacking. In some implementations, the Extract-then-Expand paradigm offers a remedy over conventional methods so that the output looks random and indistinguishable from uniform distribution, but Seed/Passphrase Splitting doesn't allow such a remedy as the "extractor" usually adopts a "salt," a fixed non-secret string chosen at random, which cannot come from the original string arbitrarily. An example embodiment can include: The server or client device performs the hash function to mask the original passphrase, such as with the example "pass_hash=blake2s(passphrase)". Then, the key derivation function (KDF) is performed with an extract-then-expand, with additional password hashing—"seed=KDF(pass_hash, entropy_salt, iterations). Lastly, a keypair is created using the following—"keypair-ed25519_create_keypair(seed)". The entropy_salt is independently generated based on a specific Extract-then-Expand paradigm. The splitting scheme does not offer such an option for manipulation.

In some implementations, the entropy strength of the passphrase can be independently specified and enforced. An example embodiment utilizes the open source zxcvbn for this purpose. By contrast, the Splitting scheme does not offer such an option to constrain a subset of the passphrase/password independently from the remaining part. Each wallet can have its own unique seed. Conventional Passphrase Splitting requires the memorization of a large number of seeds, since all seeds are different and there is no possibility of sharing a common component. For instance, the PlexiWallet would require 2 completely different seeds.

Indeed, splitting, by design, is based on a single factor, whereas the Crypton token described in this specification is formed from two independent factors for implementing "multi-factor" protection. Another option is to store the Extenders with a Password Manager with a single password, which is shorter and memorizable. However, the Password Manager can then become a SPOF (Single Point of Failure). The Memorability as a requirement reduces the entropy, compared with the KDF based PEX scheme. The Password Manager doesn't usually offer the option of using a PKC key-pair as the lock/unlock mechanism.

Attacks and Exploits

The following is a list of example attacks or exploits on various components of a secret preserving method:

Invasion of malware (virus, worms, etc.) on the devices which host the software wallet. Supply Chain Attack: If the wallet or part of it is acquired through a third party, the acquisition and/or delivery process may be compromised such that the production of the wallet can no longer be trusted to achieve its intended purpose. Although this is mostly aimed at hardware wallets, this attack risk can be generalized to include any scenarios when a third-party service provider is trusted to supply or service the wallet. [Zengo escrow scheme based on Threshold Signature scheme]

"Shoulder Surfing" attack: This is usually effected by spying on the user when they are entering the password of a software wallet (through) or the PIN code of a hardware wallet. Side channel attacks on the hardware wallet: This typically requires the physical possession of the device lasting for a certain period.

"Evil Maid" attacks, which is the attack by physically breaking into the storage where the hardware wallet is stored. This is usually coupled with the ensuing side channel attack and other hardware exploitation after getting hold of the hardware device.

"PIN code attack": This can be as simple as the "shoulder surfing" attack or through "evil maid attack" followed by a side channel attack, which is usually required to defeat the time constraints (e.g. number of retries) when entering the PIN. Note that the strength of PIN code is grossly weaker than the private keys even taking into consideration possible hardware support and needs to be strengthened in commensurate with what it is designed to protect.

"Man in the Middle" attacks aimed at the communication channel between the front-end wallet and the back-end hardware wallet. This may result in the loss of private keys or transaction signatures. It may also operate as ransomware.

The above is just a sample of possible attacks on computing devices and those methods running over them. All methods are vulnerable to attacks. As are well recognized, methods running on dedicated hardware are not immune to attacks and exploits either. Architecturally, those methods with certain inherent single points of failure are most vulnerable, as attacks concentrated on those critical "single points of failure" can bring down the entire structure of the method by compromising just a single targeted weakness. The cyber world has become an intense battlefield, which is "a scene of constant chaos," as keenly observed by Napoleon 200 years ago in the context of military operations. "The winner will be the one who controls that chaos." This specification offers a collection of methods for controlling chaos faced by any secret preserving methods.

Note that an attack may take multiple steps, starting from attacking a single specific vulnerability. For instance, an attack may initially swap out the software or firmware in a device to an infected one that appears behaviorally identical as before but contains hidden reconnaissance logic so that follow-on attack may be launched based on the information newly and illegally collected. Any method running on a platform, perhaps based on popular operating systems, is easily attackable, regardless of if it is on a dedicated hardware device or not. Any single point of failure quickly becomes the weakest link.

A method with no obvious single points of failure requires the attackers to compromise multiple attackable vulnerabilities and to painstakingly coordinate the attacks on multiple devices together in order to breach the integrated defense, often across computing platforms of different lineage, which is considerably more difficult to accomplish.

There are other issues when one of those single points of failure contains a large amount of operational data in order to scale up. For instance, a wallet may contain many sub-wallets each handling different crypto applications, use cases, or crypto coins. For instance, a BITCOIN sub-wallet (or wallet) may handle "petty cash," another for legal expenses, and yet another for specific purchases. If all those sub-wallets are implemented on the same wallet package, the damages to that single point of failure when compromised are substantial. This is why many crypto coin asset holders adopt many wallets, one per intended application. This is popular when multiple hardware wallets are used, which inherently have resource limitations. This limitation on "scaling up" needs to be addressed. As the number of sub-wallets multiplies, the potential loss of losing the wallet bundle increases proportionally. The number of recovery passphrases or seed passphrases also multiplies with added burden to store and protect them. It is also difficult to apply global integrity constraints over all individual wallets. For instance, placing an upper limit on daily crypto spending is difficult to automate when crypto transactions are conducted on multiple independently operated wallets.

Modern day computing devices are truly impressive. They easily pack more computing power than the computers used for the Apollo 11 moon landing and only occupy a fraction of the size. However, we are easily carried away by this simple performance comparison, overlooking other support functions such as inbuilt redundancy, reliability assurance, real time monitoring, and the clean room shielding against malware or network intrusion. Specifically on the subject of safeguarding digital secrets, popular personal computing devices only offer a smattering of what's required to safeguard digital assets or secrets which have very little to do with computing power.

This specification describes a method that distributes secrets to multiple components (Seals, or data set containing secrets and storable as Crypton tokens), the joint operations of which result in the completion of a defined operation performed based on the secrets and the transaction requests. In the simplified case of a secret splitting into 2 separate components, e.g. Seal 1 and 2, those operations performed and their end result may be formalized as follows:

$t1=f1(t, s1)$ is the modified transaction after operating on by Seal 1 when transaction t is first received as a request for operations which only the configured Seals are capable of conducting. t1 is forwarded to Seal 2 when this step on Seal 1 completes. To carry out the operation f1, the state variables and involved secrets are fetched and later restored to the PEX token created for Seal 1.

$t2=f2(t1, s2)$ is the operation applied by Seal 2 after receiving t1 from Seal 1. To carry out the operation f2, the state variables and involved secrets are fetched and later restored to the PEX token created for Seal 2.

If the operations on transaction t are not complete after the above 2 steps, t2 may be routed back to Seal 1 for additional operations.

Without losing generality, it is assumed that the operations on received transactions may be serialized and routed between Seal 1 and 2 in multiple rounds. The operation rounds terminate and results with status code returned to the original requester when the successive rounds of operations applied to the then transaction succeeds or some termination or error condition occurs.

Specifically, under the application scenario of crypto wallet signature collection, the transactions are blockchain-based crypto transactions, usually involving crypto asset sender, recipient, and amount, and the operations frequently applied are transaction signatures provided by both Seal 1 and Seal 2, each of which carries half of the signature functionally.

The hardware wallet addresses the lack of sufficient protection on popular computing devices by supplementing them with an external hardware of purpose-built function set. Its compact form factor makes it portable, hence the physical security if it is carried around in one's pocket. Its arcane design and custom software temporarily shield it from malware. Unfortunately, it has also created a single point of failure at the same time. For instance, a loss or theft of the hardware wallet can be disastrous with a "window of complete annihilation" before the recovery seeds are re-applied. Similarly, a loss or theft event of the offline recovery seeds is even more sinister as its occurrence may be out of sight and completely undiscovered until too late. A more timely feedback loop on both those items is sorely missing.

This specification describes a method of safeguarding digital secret with the following characteristics:

In this way, there are no single points of failure: For instance, the private keys and transaction signing logic embedded in those hardware wallets will be distributed into multiple components or devices.

The Back-End Wallet, which may optionally be embodied in dedicated hardware, from which the private keys are stored or retrieved if not resident, is structured as a "live" system that always starts from an invariant/identical code base of fixed code checksum. The data to drive the live system must be entered (login) each time the system is activated with a key (passphrase and Entropy Extender) created through a PEX Token.

All system states are stored and locked into certain specific Tokens, needed for operating the system, including access logs and auditing history. There is no need to have separate recovery seeds. It may be considered as integrated into the activation of the method and not designed to be stored separately, offline or offsite, which effectively avoids creating an additional point of failure. Activation of the method by initiating an application session through the entry of key for the specific tokens serves as the "burglar alarm" for detecting any abnormality during wallet access sessions, as the security of the method may almost be equated to that of the specific tokens. (This frequent monitoring and auditing is sorely missing in the use of offline recovery passphrase of a wallet, the protection of which is completely detached from the wallet.)

The recovery seeds are integrated into the method functionally, requiring the entry of a passphrase whenever the method is invoked. This entry of passphrase is suggested, but not limited to, to be from user's memory. This demand of user memorization turns the passphrase into both as the authentication/authorization mechanism and as the proof of owner's physical presence. There is no separate offline or offsite "recovery passphrase" or "recovery seed."

For securing secrets in the digital world under the "lock and key" model, regardless of its encryption scheme, whether it is symmetric or asymmetric (e.g. symmetric encryptions: EAS, Triple DES, asymmetric ones PKE: RSA, ECC, etc.), the strength and protection are usually about the Entropy of the key. This is believed to include all scenarios of quantum one-way functions. The Entropy is calculated based on the randomness of key generation and ultimately the length once the randomness scheme is determined. After the entropy and key length are determined, the next design challenges are the storage and management issues of those keys. The focus of this specification is not on the generation of random key strings, which is a complicated issue in itself, but the preservation of those keys once they are created. In particular, this specification concentrates on the general use cases when the key length is beyond any encoding scheme that utilizes passphrases or passwords which exceeds our mental abilities in memorizing them. This covers most use cases for all crypto currencies currently offered on the market.

A wallet is a collection of data or secrets controlled and protected by a set of interfaces, through which those data or secrets may be managed and applied in a specific way. A popular wallet is for managing users' crypto assets such as BITCOINs, XLMs in Stellar Network, Ethereum accounts, etc. Another example is the wallet utilized for managing the many identities in the DIDs (Decentralized Identifiers) framework. The wallet covered in this specification relates to the management of secrets in the PKI environment where the secrets and data to be protected are primarily private keys.

Software wallet is the simplest crypto wallet implemented in software, which runs: As an application (app) on generic desktop PC, laptop, or mobile devices such as iPhone and ANDROID, with the standard OS supports such as WINDOWS 10, Linux, iOS, ANDROID, etc. (web wallet) Within dynamic web pages or browser extension running code, script, WebAssembly and any other supported programming languages.

The software wallet or web wallet usually involves only a single hardware device running a popular application platform, typically shared with many other applications. It obviously may run on a dedicated device. The hardware wallet is created to extract the private keys and transaction signature logic from a software wallet and host them onto an external dedicated hardware device (back-end wallet). The primary reason for this separation of functions is to physically separate critical crypto functions from those easily attackable generic platforms (e.g. WINDOWS, iOS, Linux, etc.), which are usually connected to the Internet and constantly under online attacks. However, although a hardware wallet can be made less vulnerable to online attacks by disconnecting it from the Internet when not in use, it is still susceptible to offline attacks launched from dedicated hardware labs if it can be possessed physically, or through the hacking of the PIN code.

The hardware wallet itself may be attached to the front-end wallet or "bridge" either through some wired or wireless connections (USB, Bluetooth, Wi-Fi, wired LAN, etc.) or through images and/or manual input entry in an air-gapped arrangement.

Both the software and hardware wallets don't offer any integrated facilities to protect the "recovery seed" for their wallets.

In order to reduce component counts, eliminating all single points of failures, allowing a fully software method for protecting secrets in the wallet, this specification integrates the following algorithms:
Threshold Signature Scheme Key vaults separate from the front-end wallet but effecting a redundancy framework based on the Threshold Signature Scheme above.

"PEX Tokens" as a basic building block of this specification to run the back-end wallet from a state-less constant code base with fixed code checksum driven/assisted by those tokens.

The method of storing secrets in "PEX Tokens" is described in more detail in a later section of this specification.

Once the key vaults are restructured based on a scheme that may produce signature independently from multiple locations, such as the Threshold Signature or Multi-sig schemes, and redundancy is obtained to eliminate certain single points of failure, it allows this specification to build the whole wallet package in software without relying on the relatively expensive and dedicated hardware wallet with resource constraints and without necessarily security guarantee. With this new structure and flexibility from software construction, a great number of wallets or hierarchy of wallets of high complexity may be supported in the same package, each with its own security and protection rules on enforcing users' wallet transactions in terms of amount, frequency, etc. More later.
Custodian Account Through Third-Party Services It is difficult to DIY the security protection adopted by Crypto Custodian Services, such as the multi-factor authentication or the bank Security Token in addition to the password. The primary impediment is the fact that in the DIY situation both the server and client are played by the users themselves, an obvious single point of failure. To breach the bank security both the client running on client devices and the server hosted by the bank externally must be compromised at the same time, which is not impossible but substantially more difficult considering the resources the banks possess and the independently architected protection mechanism implemented by the servers. In other words, there is not much technology to borrow from in the case of self-managed secret protection or crypto wallets in particular, if a user has determined that the banks or any third-party financial or crypto services are not to be trusted with their keys.

The other loss event many owners of crypto holdings are mentally ill prepared is the immediacy of its damage. If your wallet recovery passphrase is stolen, all the crypto currencies may disappear instantly without the banks bearing the brunt of the loss. Even the detection of such a disastrous loss may take a long lag time. This specification sets out to correct this particular aspect as well.

Design

The method defined in this specification aims to offer a secret protection method that eliminates all single points of failure, including the seed passphrases if adopted and maintained for high usability. Most importantly, all critical operations or transactions directly involve the owner of the secret as an option. In the application of this method to crypto wallets, the external protection mechanism such as the Shamir's Secret Sharing (SSS) scheme of seed passphrases is not considered user friendly in the context of this specification as it is not integrated with the crypto wallets. If not integrated, the breach of the seed passphrase is not immediately detectable within a reasonable tolerance time due to the lack of constant involvement of the wallet owner. However, schemes like SSS may still be helpful tools for preserving any type of passphrase (including the one required in a PEX token below).

PEX Tokens

The PEX token is partially based on a prior technology by the name of Minilock, which is to create a passphrase-based authentication mechanism with key derivation logic based on Scrypt. It is offered as an alternative to PGP, with the application in the creation of a key pair in order to produce an identity certificate. The entropy of the construct is limited by the "memorizability" of the passphrase which has an upper bound around 100-bit of entropy. Its entropy strength is not expandable as it is designed to be a convenient and "portable" form of key pairs to be retrieved from memory. On the other hand, the PEX token method in this specification is not aimed to create a memorizable passphrase for identifying or authenticating users themselves. It is to offer the method of creating a key pair of arbitrary entropy bit length, comprising a passphrase of defined entropy strength, memorizable as the critical part of the keys and then complemented by an Entropy Enhancer of arbitrary strength for generating the final key pair during the definition of the PEX token. The public keys created become part of the file/token identification for storing secrets or any contents associated with the token. The retrieval of the content requires proof of ownership by demonstrating the possession of the private key through, say, some standard challenge-response protocol.

Part of the "PEX Tokens" are also described later (as Krypton Tokens, collected here as Appendix I), which mainly focuses on applying the mechanism through a cloud service (Ai-Fi Incognito Cloud). Its applicability extends to other storage arrangements other than the cloud as well, such as storing the Tokens to users' PC, disks, USB thumb drive, SD card (e.g. on Raspberry Pi) mobile platforms, or even IPFS externally. PEX Token is the shorthand for Personal Entropy eXtending Token. Much like the BITCOIN addresses and their public-private key pairs that protect the BITCOIN users' crypto assets, the placement of those tokens are highly flexible without affecting their cryptographic strength. In the case of storing PEX Tokens in the Ai-Fi Incognito Cloud, which is password-less and account-less with the requests submitted through Tor pseudonymously, the tokens are not directly discoverable or targetable, including even the Ai-Fi cloud provider, which thwarts all brute force attacks because there is no target or cue available to confirm the success or failure of any guessed password and Entropy Enhancer. Since the PEX tokens are solely designed for protecting personal secret, unlike those BITCOIN addresses which are tied to key pairs involved in crypto transactions, they are strictly private without the need to publish them in any public ledgers. This makes it possible to hide them in an incognito cloud (password-less and account-less). The "personal" nature of this secret storage method implies that a PEX token may be committed to and owned by a single user privately. However, it doesn't rule out other possibilities of utilizing the construct for administrative purposes in shared settings for effecting teamwork.

This method already has a prototype implemented; the key generation related to its GUI is detailed in the section "Secrets in Plain Sight."

The symmetric encryption key for the token content is "negotiated" (self-contained) by a ECDHE scheme with the ephemeral public key stored in the token itself, which can be combined with the token private key to recover the encryption key for the protected content. Applying a PKI key pair to generate encryption keys is common knowledge. For instance, PGP generates its symmetric key by encrypting the key with the public key of the recipient, which happens to be the sender as well in our case. Although achieving similar protection, PGP does reveal something about the public key each time this key generation is performed. The scheme in our ECDHE has no such weakness, as the Diffie Hellman ephemeral keys are randomly generated without involving the token owner's key pair.

The generation of a PEX token is depicted in FIG. 1 of the drawings in this specification, with the Curve25519 key pair as part of the example construction. Other embodiments of any key pair schemes or standards under the PKI framework can be similarly constructed for any key length.

This method starts at 3, where the user is invited to enter a passphrase which is delivered to an evaluator at 4 through path 13. The evaluator 4 evaluates the entropy strength based on a configured strength requirement (100+ bits in the example drawing) with an adopted strength meter. The open source "zxcvbn" is a well-known entropy meter in the public domain. If the entered passphrase failed to pass the strength evaluation, the user is sent through 14 and 15 to retry the data entry for a passphrase of sufficient strength. An automatically generated passphrase of sufficient strength may be requested in 5.

The user exits the evaluation loop 13, 14, 15 only when a passphrase of sufficient strength passes the evaluation, in which case it enters the logic for entropy enhancement at 7 through 16. The user augments and appends their passphrase with additional entropy source with many possibilities, such as personal email address, additional word list, arbitrary bit strings, etc. They may also request the PEX token software to suggest a random string of specified entropy. The Minilock scheme is to create a passphrase-based authentication mechanism with key derivation logic based on Scrypt. Its obvious application is the construction of a key pair as part of an identity certificate. The entropy of the construct is limited by the memorizability of the passphrase, as the first passphrase in steps 13, 14, 15 has exhausted that requirement. Entropy Enhancer is not considered. The entropy string created in 7 may be separately protected. It may be written down and stashed away in notebooks or over multiple locations. It may also be safeguarded by some secret sharing scheme like the Shamir's Secret Sharing. It may even be stored in another PEX token. As it is a bit string that complements the base passphrase, any untended revelation of it does not create a SPOS crisis if the entropy strength of the passphrase is sufficient to overcome the risk of losing the Entropy Extender.

Once the complete passphrase and its entropy extender are formed satisfactorily, the logic moves on to the key derivation at 8 and 9, following path 17 and 19 by combining the passphrase and the Entropy Extender in a variety of ways or by simply concatenating them. Argon2 is depicted as an example key derivation scheme with Curve25519 key pairs generated in the last phase 9. Any other key derivation functions may be applied based on various embodiment tradeoffs in 8 and 9.

To summarize, the PEX token is "personal" in the sense that a passphrase is required and to be retrieved from memory by individual users when requested. This suggested "personal" involvement can serve as an important aspect of identity proof when the generated key pair is used for authentication purposes. It is further extendable to arbitrary entropy strength through the construct of Entropy Extender, which may be separately stored, copied and managed (e.g. through SSS) without catastrophic fallout when compromised as it does not constitute a single point of failure (unlike the recover seed in traditional wallet implementation).

Incremental Construction of the Method

Security and reliability are relative concepts. Given the fact that all popular computing platforms, such as MICROSOFT WINDOWS, APPLE iOS, or ANDROID operating system, etc., are all having known vulnerabilities and not immune to future zero-day attacks, any software constructs are undoubtedly neither fully secure nor future proof. However, an incremental build-up of the method described in this specification allows the users to calculate and assess their risk exposure as the construction of the method in this specification moves forward.

At least one of the Seals is built from scratch over either a dedicated hardware deemed trustworthy or a device based on a "live" operating environment, e.g. a limited few reliable application components running on a base live Linux with the PEX token package. This dedicated hardware to run Seal on, structured as a "live" system with constant code checksum at startup, reduces the attack surface and further enhances the reliability. This is optional and selected only when we have security concerns over some running Seals. To address any security concerns without dedicated hardware, we can take the extra step by creating a "live" Seal on a software platform (e.g. through a bootable USB thumb drive) which renews itself to a code base of constant code checksum between sessions. Its internal session state is stored in one or multiple PEX tokens and recoverable based on retrieved token.

Considering what they are designed to protect, some of the potential single points of failure in traditional wallet design are particularly weak in its defense mechanism. Such is the case of the PIN code for a software or hardware wallet. Since the wallet itself is stateful and contains all the key materials necessary for signing transactions, a compromised PIN code would ruin the wallet. In addition, in the case of the "recovery seeds," it only stores key materials and not state information maintained internally within the wallet. All popular wallets provide no integrated protection due to the difficulty in bootstrapping the defenses and recovery of non-key-related state information from only the "recovery seeds." Even if the recovery seeds are protected by additional means such as Shamir's Secret Scheme, the state information maintained in the wallet is not protected or recoverable. Although those data may be reconstructed by recalculating from their original context during recovery, the fact that they are stored in the wallet leaks a large amount of information for attackers. Then there is the issue of the private keys usually replicated in the wallet device itself. There is a critical need to create a method to integrate into the wallet implementation a recovery mechanism comparable to the "recovery seed" in terms of safeguarding it (with only a recovery passphrase) but incorporating all the state information without replicating critical information in two separate places.

The secret preserving method of this specification is made "token driven" and can optionally be run from a constant code base of fixed code checksum from the beginning boot-up. The state variables of the method are stored in the PEX tokens for involved individual Seals, containing but not limited to the TSS configuration, pairing of Seals, public keys, private key shares of the Seal, transaction logs, transaction integrity constraints (e.g. transaction amount per defined the time period, recipient white/black list, etc.), etc. A session is defined as starting at the point where the state token is read in and ending when there are no more transaction or administrative activities over an idle period or when the user signals its termination. At termination time, the state token is updated and written out to some secure store in order to be ready for the next session. This allows the wallet to remain stateless after a working "transaction session" and therefore invulnerable to attacks between login sessions to reduce the window of vulnerability. In other words, the wallet is not attackable or becomes a potential single point of failure while not in session.

Figure 4:
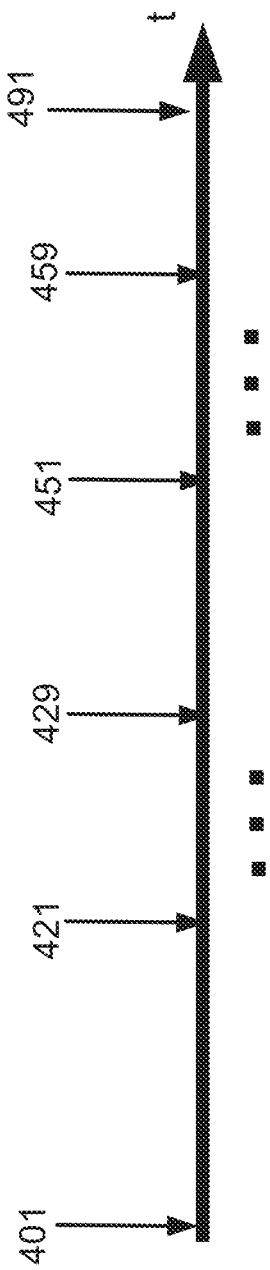
FIG. 4 is a diagram that illustrates a series of transactions against a seal system.

More specifically, if a Seal is constructed as a "live" system, it starts out from a clean codebase with constant code checksum at 401 in FIG. 4 of the drawings, which represents the arrivals/departures of transactions to a "live" Seal in a serialized fashion on the time axis t. Before the "live" Seal starts its operation, the user must carry out a login procedure by entering the passphrase and the Entropy Extender of a PEX token at 401. Once successfully logged in, the operation of the Seal comprises a series of sessions. The session starts as the first arrival of a transaction 421 and 451 when the Seal is not in session. The session, once started, lasts until some termination criterion or criteria are met, for instance, at the expiration of "idle timer" which counts the time without receiving or handling of transactions or the user input or at receiving user command forcing the termination of the current session, at 429 and 459. There are typically many transactions received and serviced between 421 and 429, and between 451 and 459. The operations structure as sessions may simply terminate at 491 by turning off the power, unplugging the "live" system, leaving it unattended for a defined period of time, etc. Between sessions, such as between 429 and 451, there is no transaction being processed and the "live" system is free to checkpoint its "states" and writes it out to permanent storage in a memory device for the next session. If the transaction processing logic needs to be "fail-safe," some state recovery scheme can be implemented to preserve the integrity of the system. In the crypto wallet applications where the method is primarily designed to perform crypto signatures on received transactions, the state recovery is not critical, as the signature operation is either completed or uncompleted. The transaction signature can always be re-applied to complete a previously uncompleted transaction.

One of the Seals built up from a "live" or clean system is designated as the Primary Seal, which is relied upon to interface with the Front End Interface and orchestrates other applications of secrets like transaction signing involving many Seals. In situations where a live or clean system is not readily available, one of the Seals is designated as the Primary if it is presumed of having sufficient reliability based on other considerations such as exhaustive virus scanning, segregated system with little contacts with the internet, or running on a virtual machine reasonably insulated from its complicated surroundings of unknown risk exposure. Reliability is a relative concept. The Primary Seal is selected based on its preferred confidence level. Note that many safety measures such as the Trezor virtual keypad are not meaningful unless the underlying platform is sufficiently secure.

TSS Redundancy for Enhancing Reliability

Traditional wallets are implemented either as a standalone construct, frequently based on software only, or as a combo of software wallet (as a "bridge" or wallet for "watch only" without directly storing the secret keys within an external hardware wallet. Both constructs provide a recovery scheme based on the recovery seed through which the whole hierarchical deterministic wallet may be reconstructed, typically based on BIP 0032 and BIP 0039 standards. The software wallet itself, the external secondary hardware wallet, and the recovery seed are three of the glaring "single points of failure." It will become clear later that in this specification the recovery seeds are no longer part of the standard recovery scheme in this specification, which will be replaced by the integrated secret safekeeping method based on PEX tokens.

To eliminate the risk of single point of failure on the hardware wallet, unlike the traditional wallet that the function of both the secret storage and the transaction signing based on the stored secrets are combined onto a single piece of hardware, this specification adopts an alternative redundancy design such that the hardware wallet is further split into at least two separate components which work separately but cooperatively to store the secret and to complete the transactions. In engineering, redundancy is the duplication of critical components or functions of a system with the intention of increasing reliability of the system. Systems can be made robust by adding redundancy in all discovered SPOFs.

This specification describes a method involving multiple components, each of which may reside on an independent device or be hosted on a device shared with other components. One of the components, the Front-End Interface, faces the network where the application or user requests are from. There may be one or many Back-End Components that dispenses various functions involving the preserved secrets contained within. In other words, those Back-End Components are where all the relevant secrets are deposited. Secrets preserved and protected in those Back-End Components are used to deliver a well-defined function set, but they are never revealed or retrieved directly.

Figure 3:
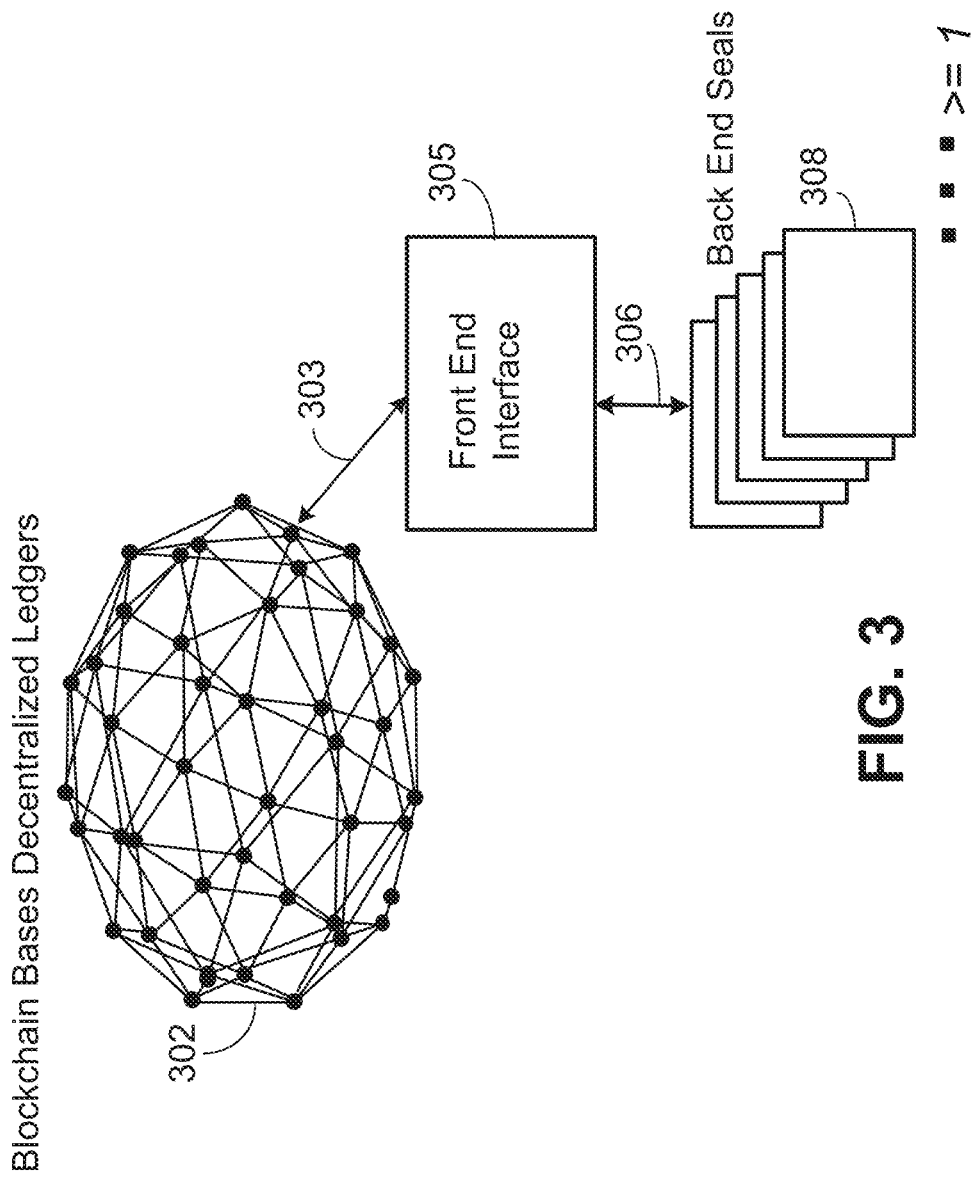
FIG. 3 is a block diagram that illustrates an example of a decentralized ledger system with a front end wallet that interfaces with various back end components.

FIG. 3 is the drawing of the architecture for the method described in this specification. In the use case of cryptocurrencies, the Front-End Interface 305 is the crypto wallet that deals with the blockchain or decentralized ledgers 302 directly through network interface 304, such as the Electrum wallet for BITCOIN. The Back-End Components 308 comprises one or many components of distributed nature forming the various parts of "hardware" wallets. The term "Seal" is used to describe those on the back-end that store partial secret private keys and produce crypto signatures. A Seal may be capable of providing a signature for constructing parts of a crypto transaction independently, e.g. in the case of multi-signature transactions, or be designated to work with other Seals jointly in order to successfully produce signatures for transaction requests, e.g. in the application of TSS (Threshold Signature Scheme).

The number of Seals may vary, depending on the actual design for the various embodiments, as indicated by the caption for collection of interoperating Seals 308. The traditional hardware wallet has a single Seal constructed out of a dedicated hardware. The interface 304 for accessing 302 follows the interface standard per the specified blockchain or ledger. The connectivity 306 is between the Front-End Interface 305 and all the back-end seals 308, which may be wired or wireless, or air-gapped so the connectivity 306 may be limited to manual means such as through photographic tools such as 2D barcode or QR code. The communication between those Seals in 308 may be wired or wireless, possibly involving network broadcasts, or air-gapped per the preferred embodiments.

Threshold Signature Scheme (TSS) is a cryptographic protocol for distributed key generation and signing. TSS allows constructing a signature that is distributed among different parties (for example three users), and each party receives a share of the private signing key. To sign a transaction, at least two of these three parties need to participate. In the case of an individual user owning all pieces of components, threshold signatures allow for two-factor security or splitting the ability to sign between two devices so that a single compromised device won't put valuable assets at risk. For businesses, threshold signatures allow for the realization of access control policies that prevent both insiders and outsiders from stealing corporate funds. TSS technology allows this specification to replace all signing commands with distributed computations. The private key is distributed in multiple shares, by combining which the TSS logic is able to perform the signing function jointly to appear as from a single signer with a specific public key.

Those multiple shares of private keys are independently generated without ever needing to be combined into a single private key to match the public key. The private key distributed and stored through TSS in multiple key shares is no longer a single point of failure. This specification is based on the algorithm documented in the seminal paper "Fast Multiparty Threshold ECDSA with Fast Trustless Setup" published in 2018.

There are two stages in creating a hardware wallet comprising multiple cooperating Seals described in this specification:

Stage 1 is for initializing the secret vaults and Key Generation in a distributed fashion:

The first step is for setting up TSS parameters of each Seal. This will initialize the network connectivity and configure all participating Seals according to a TSS configuration plan. It is assumed that stage 1 runs in a secure environment with strictly controlled minimal threat exposure. For example, if 2 out of 2 configuration is to be realized, both Seals may run from "live" computing platforms within a completely predictable environment with minimal threat exposure and without interference from the Internet. It may run in a 2 out of 3 configuration such that the third Seal assumes an additional backup role, each has its own PEX token for storing secrets, state variables, and other configuration specific data. It may also run in any other configurations and threshold specification allowable through the TSS technology. It certainly allows the outsourcing of some of the Seals and their PEX tokens to external third parties for administrative flexibility and taking advantage of additional resources.

The second step is also the most complex. We need to define the quorum policy: count of total parties (n) that holds secret shares and threshold, which means at least t+1 parties need to take part in the signing process. We need to generate a key which will be public and used to verify future signatures. However, we also have to generate an individual secret for each party, which is called a secret share. The functions guarantee the same public key to all parties and a different secret share for each. In this way, we achieve: (1) privacy: no secret shares data is leaked between parties, and (2) correctness: the public key is intact with secret share. They need to agree on the connectivity, network startup protocol and the access control. In this specification, we will mostly describe the case of 2 out of 2 as an example embodiment without losing the generality for extending to other threshold configurations.

After the key shares are generated, each Seal generates a database for its respective key materials along with other state variables and creates a PEX token to store its database of configuration and state variables. In the case of 2 out 2 configuration, these PEX tokens are independently and separately created and may be distributed to individuals or participating parties based on administrative and management policies. If a Seal is structured as a "live" system, the user must enter the correct PEX token to "log in." Both Seals are additionally protected by their respective PIN code based on idle or inactivity timers. Once a Seal is locked out of its active session, a time-restricted PIN with a defined number of allowed attempts must be entered in order to reenter the session. Prolonged idling would trigger an automatic logging out, in which case the PEX token must be reentered to get back in. Note that PIN code is for improving the usability of the method and not absolutely required.

Once the Stage 1 completes, the Primary Seal is ready to receive transaction-signing requests from the Front-End Interface 305. The requests are delivered to the back-end Seals through 306, which may be on wired or wireless connectivity, with TLS enforced optionally, or air-gapped. This step involves a signature generation function. The input of each party or Seal will be its own secret share, created as output of the distributed key generation in the previous Key Generation stage and safely stored away in the PEX token. There is also public input known to all, which is the message to be signed. The output will be a digital signature, and the property of privacy ensures that no leakage of secret shares occurred during the computation. After all required participating Seals on the back-end service the signing request, it is returned to the Front-End Interface for verification and submittal to the blockchain network 302.

Stage 1 may be conducted periodically to recreate secret shares in order to eliminate the possibility of leaking overused secret shares. Each time the Key Generation is restaged, all involved PEX tokes are updated as well. To evaluate the threat exposure of all the backend Seals, assuming they are built up as "live" systems, those involved PEX tokens are the only exploitable vectors susceptible only to brute force attacks, which are protected by PKE key pairs of configurable entropy strength. The re-stage frequency only needs to be frequent enough before any possible success of brute force attacks, which are considered a very hard attack to pull off, considering that even just with the passphrases themselves have around 100-bit entropy.

Required Presence of Secret Possessor/Owner

The Front-End Interface is responsible for all the complexity in interfacing with the external blockchain networks and many different crypto exchanges. Due to its functional complexity and calculation demand, it usually runs on generic computing platforms such as MICROSOFT WINDOWS, or smartphones of APPLE or ANDROID variety. The exploitable vulnerabilities of those platforms are considered substantial and not to be trusted.

On the other hand, even with the large variety of possible threat vectors, the size and complexity of the function set running on those Seals are usually limited and manageable and can be hosted on dedicated hardware or be bootstrapped from a predictable environment. For instance, a streamlined "live" Seal package based on a live Linux release is recommended when the reliability and "cleanness" of the platform is a concern.

Due to the substantial fortune potentially at stake, as an option, the possessor of secrets protected by the method of this specification is frequently and persistently required to identify himself or herself personally and distinguishes their input as the result of human interaction and not from machine input or any kind of "bots." The following are the most important enforced interactions:

The data entry of the passphrase as part of the PEX token.

The most basic transaction data such as the crypto coin sender and recipient addresses (IDs), the transaction amount in the case of crypto wallet applications, which are to be displayed reliably on the Primary Seal and confirmed manually.

The PIN counter of unsuccessful attempts and trials remaining displayed on the Primary Seal.

These are actually operation auditing actions. Regardless of the many tricks of phishing attempts, those data listed above are user understandable and difficult to fake. When in doubt, that operation auditing data should be displayed and read from the Primary Seal which is deemed as structurally more trustworthy in the complete assembly of method components. This is to eliminate any doubts on the reliable functioning of the underlying computing platform. Otherwise, all critical user interface data display, listed above as examples, is to be confirmed and displayed in the more trustworthy component such as the Primary Seal. This is an important application of the principle of redundancy for eliminating risks of SPOF (of the display variety) when operation data are generated and displayed on components of questionable trustworthiness.

Configuration Environment

This specification describes a method where secrets can be preserved securely and used in a distributed manner in any embodiments without inherent single points of failure, assisted by an entropy enhancing secret storage method known as PEX Token for constructing one or many secret vaults protected by token keys of arbitrary entropy strength. There are two phases of this method: the keys and rules generation phase, where the secret vault and interfaces are configured and stored, and the second operational phase where the secret vault accepts requests and offers defined services under configured constraints. In the second phase, all protection mechanisms are activated and policies enforced without any single points of failure. However, in the first phase or the "production" phase, none of the designed protections are presumed in place. A separate "production" environment needs to be provided to make sure the secure vault created has not been inflicted with any virus, worms, or any other infestation. The recommendation for the production environment is a commonsensical one. Keep it off the Internet or any external networks. Construct it from the minimalistic operating system. For instance, starting from the live Linux Tail, carefully configure the firewall to block any traffic not related to the production; eliminate all applications not needed, such as the browser, search engine, social networks, office tools, etc. Detach all peripherals not to be used. Run virus scanners for maximal coverage if they are available to the selected production environment before the production.

One of the co-signing pairs is preferred to be made into a "live" signer, the logic on which stays immutable between start-ups driven by the dynamic data such as configuration and policies to be retrieved from the entropy enhancing storage scheme. This "live" signer has a fixed code checksum which may be checked rather straightforwardly, e.g. on any independent computing devices if the system is built around a USB thumb drive. This code checksum verification is to be carried out before its plugging into a boot-from computing device for which the "live" system is built.

EXAMPLES

Equipped with the PEX tokens and the capability of building up as a "live" system/Seal, the collection of Seals 308 in FIG. 3 may involve only a single "live" Seal, assuming the construction of the "live" system has acceptable reliability free from malware. Even 305 and 306 may be integrated if the Front-End Interface 305 has acceptable reliability. The single back-end Seal 308 starts up through the login procedure where the associated PEX token is entered. However, once started and successfully logged in, this only Seal becomes a single point of failure, albeit its threat exposure is rather limited and its susceptibility to attacks is mostly bound to the hardware platform where the Seal plugs in (e.g. the onboard BIOS and other booting hardware/software). The single back-end Seal 308 may be hosted on a dedicated hardware device, similar to the configuration depicted in FIG. 2 where the Front-End Interface runs on 201 and the Seal on the dedicated 203, with 206 air-gapped if opted for. Clearly 203 and the PEX token associated with it both become a SPOF.

Another embodiment is to build up the Seal Collection 308 on two separate devices, with the Primary Seal preferably on a "live" system. This eliminates the single point of failure of the previous embodiment of a single Seal. The preferred embodiment is to construct the Seal Collection 308 completely on "live" Seals. A less secure embodiment is to install the Primary Seal on a "live" system and the second Seal on a mobile device or smartphone, which typically runs on a different set of base software from the Primary Seal and is highly portable and pretty much always at hand, such that its physical security is largely guaranteed.

The above 2 out of 2 (in the context of TSS) embodiment may be extended to a 2 out of 3 embodiment where the third Seal is prepared for recovery purposes.

The application supports multiple hierarchical deterministic wallets, each having its own generating/recovering seed and corresponding seed phrase.

Per individual wallet constructed through a primary/secondary signer pair, an integrity constraint placed on transactions to be conducted over the addresses in the wallet is negotiated during the key generation phase for a particular wallet. The following is a list of example policies:
Transaction speed
Transfer limits: per day; per "session"
Receiver account/address ACL; Sender account/address ACL The PEX Tokens described in this specification is branded as "Krypton Tokens" in the Counterseal Wallet product. Appendix I describes the Krypton Tokens in more detail. Appendix II describes the Counterseal Wallet, in the 2 out 2 Threshold Signature configuration. Appendix III documents a "bug bounty" program inviting the public to try and break the PEX Tokens, which is attached here to further elucidate the strength of the token construct of this specification. All three appendices are records of implementation history. Any deviation of logic in the appendices from the main part of this specification should be considered historical and interpreted as additional exemplary embodiments. Appendix IV describes security and safeguards with regards to a crypto wallet.

Appendix I: Secrets in Plain Sight

The Ai-Fi Incognito Cloud

Among all its no-nonsense advice and lines of thought, brax.me advocates the adoption of the public Cloud Services for convenience and, most importantly, safety. It agrees with all IT experts in the recognition that the advent of cloud computing will continue to march forward and take over the bulk of our computing needs. There is a strong parallel between our money management relying on the banks and financial institutions, and the management of our digital assets outsourced to cloud services. However, although we don't hide our monies under our mattress any more, taking advantage of their "fungibility," cloud services still offer no counterpart to the anonymous safe deposit boxes in a bank vault. Without exception, all cloud services are account based and heavily regulated to KYC, which pretty much rules out the offering of anonymous services.

Our Ai-Fi Incognito Cloud is the implementation of a secret hiding scheme, laying the first stone in advancing the cloud services to include privacy protection by taking advantage of our "account-less" architecture in combination with a decentralized digital asset registry based on the latest blockchain technology. It is not a general-purpose cloud service. Its only focus is to offer a privacy-preserving, pseudonymous, and warrant-proof vault/safe facility for storing your highly private data or secret.

The Ai-Fi Incognito Cloud and Blockchain

The world-famous 69,370 BITCOINs stored at the address "1HQ3Go3ggs8pFnXuHVHRytPCq5fGG8Hbh" has been known since 2013. It is allegedly linked to Silk Road and easily seen by hackers all over the world for a full 7 years without being broken or stolen. Million other BITCOIN addresses on the BITCOIN blockchain are equally in view and out in the open without being considered vulnerable as long as the private keys are safely stored. The current value for this single "1HQ3Go3ggs8pFnXuHVHRytPCq5fGG8Hbh" address alone is close to $1B. If we consider the asset value of all the crypto coins safely stored behind all those BITCOIN addresses on the BITCOIN blockchain at the current market cap of $280B, the proven strength of the BITCOIN public key cryptographic technology is truly impressive.

This example demonstrates that storing assets or secrets in the cloud can be anonymous and secure as long as:

For anonymity, it must be account-less, hence password-free, without any linkage to owners' PII (Personally Identifiable Information).

It must have at least 128 bits of entropy for cryptographic security guarantee.

It must be immutable, based on a proven data redundancy and consensus protocol involving a substantial number of server nodes.

Ai-Fi Incognito Cloud for storing secret shares, packaged as individual "tokens", has comparable attributes listed above, with the following improvements:

Unlike BITCOIN blockchain, Ai-Fi Incognito Cloud offers no means to enumerate all the tokens (accounts). This reduces the attack surface.

For ease of retrieval from the Ai-Fi Incognito Cloud, tokens are generated through a memorable passphrase of around 100 bits of entropy, which, when coupled with a client-side salt, can achieve entropy higher than 128 bits. The password stretching KDF (Key Derivation Function) achieves the biggest gain, maximizing the ratio of crack time from 1 to 100,000 with Argon2 the preferred algorithm. This is battle-tested based on collected BITCOIN cracking data, further proving the successful exploitation of the entropy in a data stream by applying hash functions. The KDF is a cryptographic algorithm that can derive one or more secret keys from a secret value such as a main key, a password, or a passphrase, using a pseudorandom function, which typically relies on a cryptographic hash function or block cipher, to name a few examples. One such algorithm of the KDF, as mentioned above, is the Argon 2 algorithm.

One such hash algorithm is the BLAKE2 algorithm. BLAKE2 is a cryptographic hash function based on the BLAKE algorithm, created by Jean-Philippe Aumasson, Samuel Neves, Zooko Wilcox-O'Hearn, and Christian Winnerlein. The design goal of the BLAKE2 was to replace the widely used, but broken, MD5 and SHA-1 algorithms that require high performance in software. In one such example, the process for performing the KDF function is as follows. The server or client device performs the hash function to mask the original passphrase, such as with the example "pass_hash=blake2s(passphrase)". Then, the KDF is performed with an extract-then-expand, with additional password hashing—"seed=KDF(pass_hash, entropy_salt, iterations). Lastly, a keypair is created using the following—"keypair-ed25519_create_keypair(seed)". The entropy_salt is independently generated based on a specific Extract-then-Expand paradigm. Other examples for creating the keypair are also possible.

Ai-Fi Incognito Cloud offers a simple redundancy scheme by replicating tokens over multiple storage sites without relying on an internal blockchain, which is sufficient for its dedicated secret-preserving purpose with redundancy. Since there are no transactions involving multiple tokens, its auditability may be assigned to individual token owners, much like Google's "Certificate Transparency" technology for protecting SSL certificates.

Ai-Fi Krypton Token Types

Ai-Fi Krypton Tokens are a file storage type supported by the Ai-Fi Incognito Cloud. They take advantage of the account-less pseudonymity afforded by Ai-Fi.net. They facilitate a novel cloud storage technology wherein the content, ownership, and all metadata pertaining to the tokenized data are shielded and untraceable.

Cloud Storage and Metadata

Files stored in a public "cloud" are typically envisioned with a filing cabinet in the cloud, traditionally. We first sign up to a service provider (AWS, Azure, Dropbox, etc.) for a subscriber account and then we submit our data and files to the service provider for varied levels of services under our account. We may also encrypt the content in order to prevent other unsavory characters, including even the service providers themselves, from peeking into our files. We typically share with the cloud providers our "metadata," namely the ownership, account identity, and time-stamped operations applied to those files, etc.

Invariably, files in the cloud are labeled and attributed to identifiable parties. Data theft in many cloud services are common occurrences. Many data breaches, including Dropbox concerning encrypted passwords and details of around two-thirds of cloud providers' customers, have been reported frequently. In addition to the threat of exposing one's file content, oftentimes the metadata associated with cloud storages may also be subject to attacks. The risk of losing office files in the cloud or leaking file content is sometimes manageable, especially when business owners by and large follow reasonably stringent data protection practices, oftentimes mandated by regulations, and backs up them periodically as a matter of course. However, in the case of high-value personal assets, the loss event or even the exposure of owners' identity may not be acceptable. Such is the case for BITCOIN assets, even the metadata of which is highly guarded in order to maintain the anonymity of BITCOIN transactions. Unfortunately, this protection of metadata for personal digital assets is not always guaranteed.

The Account-less Ai-Fi Challenges

Traditional service providers require your signing up for an account for the purpose of either collecting payments or conducting surveillance on private data to feed its business model.

In the case of Ai-Fi.net, since there is no "account" required for a user to interface with Ai-Fi services, it is difficult for hackers (or even the provider itself) to target any one individual. Even in the unlikely event that a file stored with the Ai-Fi Incognito Cloud is cracked, there is nothing in the encrypted content that would lead back to the originating owner. This is why the attack on Ai-Fi facilities involves the most arduous of conditions without any specific targets to aim at.

To further take advantage of this hallmark feature of account-less services, Ai-Fi.net serves any file storage requests without knowing the people behind them. This is a much stricter requirement than any other popular cloud storage services. By design, Ai-Fi eliminates even the services itself from being a suspect when compromises are discovered. Ai-Fi.net simply is not capable of recognizing any owners behind those files and data stored in its cloud. With strong encryption, enforced with crypto key pairs of high entropy, all files in Ai-Fi Incognito Cloud look alike without specific registered accounts to attribute to.

The Ai-Fi Krypton Tokens

Krypton (from Ancient Greek: κρυπτός, romanized kryptos "the hidden one") is a chemical element . . . a colorless, odorless, tasteless noble gas that occurs in trace amounts in the atmosphere.

Figure 5:
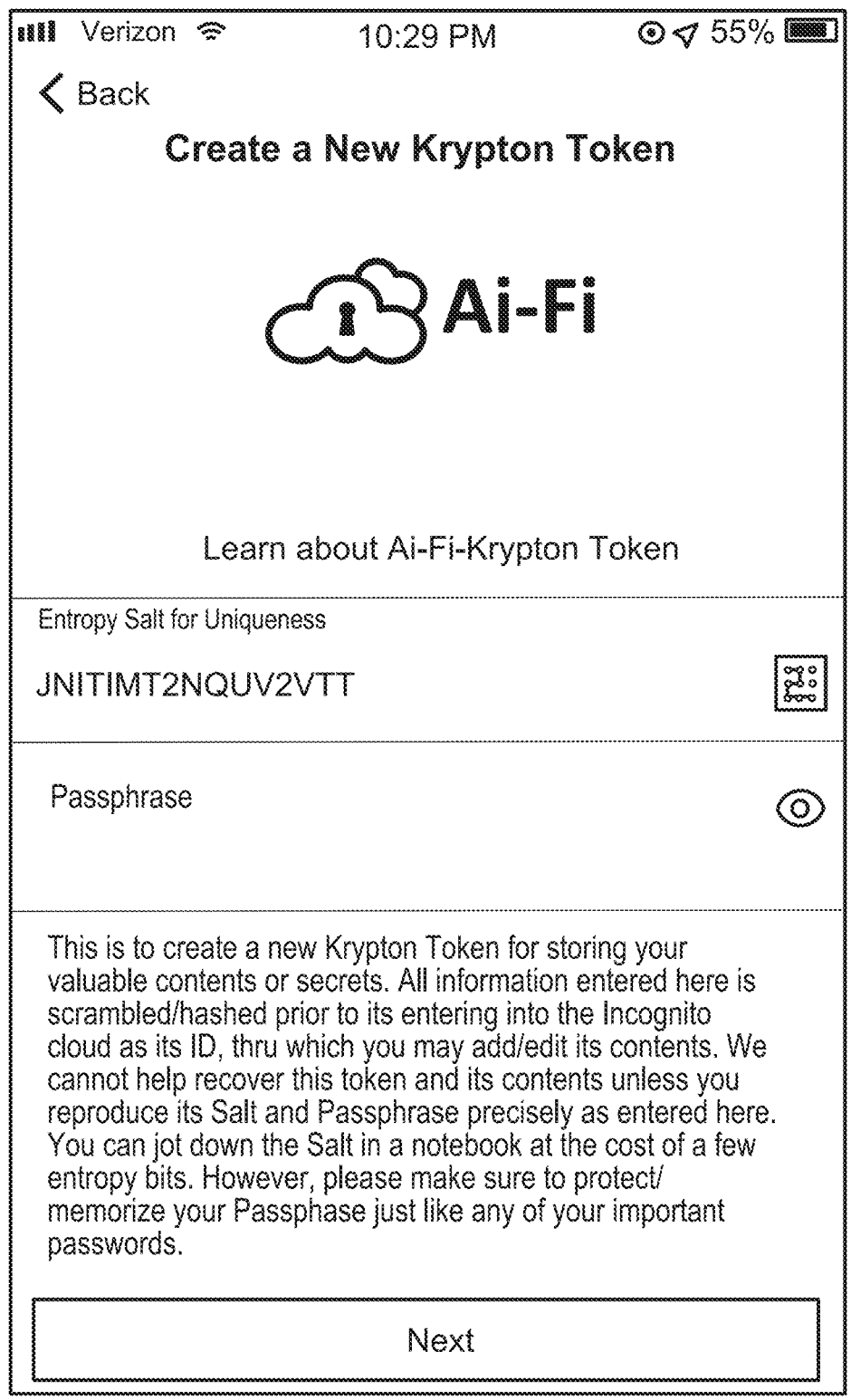

The Krypton Token, as illustrated in FIG. 5, represents an Ai-Fi storage type, taking advantage of the pseudonymity offered by the account-less Ai-Fi storage services. (There are many other Ai-Fi Cloud applications in the works, all tempting to take advantage of the same pseudonymity built into the Ai-Fi Incognito Cloud.) Behind the Krypton Token is a text file (currently supported file type), which are typically segmented by labels for different sub-contents.

A Portable Krypton Token has only 2 fields that determine how it is stored:

Quite a bit of flexibility is given to the setting of Entropy Salt. Our users may adopt a simple email address to thwart the dictionary attacks, or opt for a set of random bits to increase the entropy, in which case the salt may need to be written down. Some users apply for a brand new email address for this express purpose of secrecy without resorting to their usual primary email address used daily. The selection of Entropy Salt should be commensurate with usability consideration and the value of the contents to be protected.

The production of tokens is simply designed for storing an encrypted file in the Ai-Fi Incognito Cloud. Although it uses the technology of PBKDF (Password-Based KDF) incorporating a salt and a slow hash function, the generated key is not for communicating between two separate parties or between the token owner and the service provider. Otherwise put, the "key" is used only by the token owners to send encryption token to the cloud and later on retrieve it themselves. The salt is not exactly public and conveniently becomes the recipe for more entropy bit, with the key stretching KDF "extracts-then-expands" the password into a pseudo-random key adding a tremendous amount of difficulty for password cracking (by incurring 100,000 times more cost).

The addition of salt prevents the passphrase from becoming a single point of failure or directly attackable surface of disastrous consequence if breached. If the threat is outside one's homestead or primarily from the network, the salt may be copied onto a piece of paper or notebook and placed in a drawer. Since it does not constitute a single point of failure, the copy may be placed in multiple locations of negligible risk.

The public key of a cryptographic key pair represents a Krypton Token. To the storage server, the public key or token appears as a random sequence of 256 bits (with some housekeeping characters), which has similar, and optionally higher, cryptographic strength as the BITCOIN addresses. Users submit the token (with payment as per situation) in order to store or retrieve the associated content, which is decryptable only by having the private key of the originating key pair. The Krypton Tokens are usually submitted through the Tor anonymity network along with their associated files to further obscure their original sources and make it difficult to guess their owner based on any kind of heuristics.

To take an example, say your file or data is packaged and encrypted with a key pair, of which the public key becomes the token ID: "GA5WNW6RGHQNNXICILLYDMEYO6NLATJP2C7W AHTGQFVGYQXLSL SAF46C." The challenge to any adversary trying to hack the content of this token is to render the matching private key, which is proven mathematically intractable. The Ai-Fi Krypton Tokens have the added advantage of not requiring the publication of the public key (or the token ID). This may be contrasted with the privacy issues of BITCOIN addresses, which are inherently public as they are designed to conduct transactions involving multiple parties, whereas the Ai-Fi Krypton Tokens are private and stay stealth. Short of obtaining the list of all existing token IDs, the entropy for the combination of the key pairs and the hidden ID space of all the tokens afford us at least 120 bits of entropy. For this reason, Ai-Fi Incognito Cloud takes pains not to reveal the list of token IDs under its care. This protection of the token IDs through obscurity, built as an independent architectural layer above the public key infrastructure, enhances the resilience and security of the Ai-Fi cloud services for Krypton Tokens.

Krypton Token Types

There are primarily two types of Ai-Fi Krypton Tokens:

Hosted Tokens: This is the token type based on the public key of ED25519 keypairs. A token name is mapped and hashed from a public key of around 160 bits of entropy (similar to the "unspent" BITCOIN account). The original keypairs for this class of hosted tokens are dedicated for this purpose and maintained in the Ai-Fi Wallet without involving in any other cryptocurrency transactions (unspent). The DigiVault offered in Ai-Fi Central, if opted to "Auto-Sync," will be entered into the Incognito Cloud as a Hosted Token. The collection of SecureEmail keys is also stored as a hosted token if opt-in is enabled. Hosted Tokens live and die with their associated wallet.

Portable Tokens: Unlike the hosted tokens described above, which can be deleted or become inaccessible, Portable Tokens are based on passphrases, which are to be memorized, with optionally the (client-side) Entropy Salt for both thwarting the rainbow-table/dictionary attack and increasing the entropy. This Entropy Salt may be set as weak as the email address, cell #, ssn #, etc. for creating trivial variability or as something fully random and unique, to be automatically generated by the app. The portable token is independent from your wallet and retrievable outside of your Ai-Fi Central App as long as the passphrase and salt are precisely tendered. This concept of token is originally inspired by the MiniLock scheme and has at least 100 bits of entropy without counting the extra randomness injected into the salt. The user is not expected to memorize the salt, which may be jotted down on a piece of paper or in a notebook and rely on the physical security to attain a reasonable degree of protection.

The Ai-Fi Incognito Cloud of Krypton Tokens may be visualized as a herd of anonymous animals, each individually camouflaged and indistinguishable to the hackers. Most animals are seemingly wild, nameless and owner-less with mysterious origination. There is a large number of Krypton Tokens randomly distributed in the Ai-Fi Incognito Cloud like those inscrutable animals in the herd:

In order to open a lock, even in possession of the correct key (through theft, hacking or other means), one needs to first locate the target lock, which appears as inconspicuous as any others amongst all those openly displayed on the Love Lock bridge. Absent any metadata, the only option left for attackers is to brute-force through the complete "search space."

As a comparison, BITCOIN blockchain, all BITCOIN addresses may be enumerated by traversing through the Blockchain. They are interrelated by various transactions. These two pieces of background information about the BITCOIN addresses leak a tremendous amount of information about those BITCOIN accounts, which is completely impenetrable in the case of tokens supported through the Ai-Fi Incognito Cloud.

The Ai-Fi Incognito Cloud is implemented through a key-value store with configurable redundancy options behind a dedicated firewall.

The Ai-Fi.net Incognito Cloud only sees the token ID submitted as a storage request for entering into the Ai-Fi Cloud. It sees neither the "salt" nor any ties to any identifiable users or email addresses. Untargeted attacks are hard given sufficient entropy. Targeted attacks are thwarted by the incapability of relating the target with their tokens without the assistance of accounts and the initial Tor based storage request. This is why the portable Krypton Tokens are popular among Ai-Fi users for safekeeping their seed passphrases for various types of crypto wallets. It is customizable to the desired level of security (entropy) and made stronger than any BITCOIN addresses but with elevated anonymity guarantee.

Managing Portable Tokens

Each portable token generated based on a unique passphrase. With 100 bits of entropy, it is practically untraceable and untrackable.

Specifically, an anonymous Ai-Fi user submits a request for storing a token file in Ai-Fi's cloud with the following information:

A passphrase for controlling the access of the submitted file: A minimal strength of 100-bit entropy is measured and enforced. Insufficient level of strength is not allowed.

An Entropy Salt is used for "salting" the generation of key pairs for protecting your files as a partial measure against dictionary attacks. It is scrambled/hashed prior to becoming part of the file identifier, on the client side, without leaking it to even Ai-Fi.net. The salt may be a simple string, something unique to your identity (email, SSN, cell #, etc.); the individual nature of this salt strengthens Ai-Fi protection against offline dictionary/rainbow-table attacks. You can also ask for an automatically generated random string that purposely injects a sufficient number of bits of entropy per user request for specific cryptographic strength. As the name, "salt" implies, unlike the highly confidential nature of the passphrase, it can be written down without much concern for its loss if the entropy of the passphrase is sufficiently strong to handle any perceived attack vectors. As mentioned, if the perceived attack vectors require more strength in terms of entropy, the salt may be automatically filled with randomly generated key strings to enhance the required strength. Additionally, the salt may be offered as a mnemonic with checksum based on a wordlist (such as BIP39) if requested.

Label: This is a reminder for yourself and is part of the file content, which is not visible externally.

The file content is encrypted securely by taking advantage of the availability of your public/private key pairs, which is the composite of your passphrase with the email address as the salt.

The information provided will be combined and scrambled through a rigorous key derivation function (including but not limited to Script or Argon2d, with a large number of hash rounds) to generate a PKI key pair, which in turns mapped to a file name and a content encryption key. Take a look of the following examples:

john.smith@gmail.com, with passphrase "My cat's name is Womba", generates the following token file name: "GA5WNW6RGHQNNXICILLYDMEYO6NLATJP2C7W AHTGQFVGYQXLSL SAF46C"

jane.smith@gmail.com, with the same passphrase "My cat's name is Womba", generates the following token file name:
"GCZV4NNTSL5MEJEYIMLESFV2NC2JFT4LHAIXIBH DGLXJVH63RW5DEGUZ"

These two tokens appear totally different even with the same passphrase but different salts (email addresses). It is nearly impossible to uncover the original passphrases and email addresses of around 100 bits of entropy. It is even more difficult to track down the owner of the file.

The request is submitted to the Ai-Fi Cloud through an end-to-end TLS session. The service charges are paid through one of the pseudonymous accounts from the requester's wallet. The stored files will be kept securely and anonymously in the Ai-Fi cloud as long as the payments are kept up (from anyone able to identify the file and authenticate themselves by submitting the correct passphrase hash).

The only way to retrieve the file is to render a proof of your possession of the corresponding private key through your passphrase and salt, which is not stored anywhere and generated every time when needed through your passphrase.

Ai-Fi Cloud Privacy Guarantee

To answer the challenges of inbuilt anonymity, Ai-Fi Incognito Cloud as a storage service reinvents the cloud as a tokenized file access facility, which has a lot of similarity in its pseudonymity handling to that of BITCOIN. BITCOIN adopts the scheme of cryptographic key pairs for conducting BITCOIN transactions on the BITCOIN Blockchain. Only the public key is made public and the demonstrated possession of the private key is the only proof of ownership. To conduct any BITCOIN transactions, the public key as a token is first presented to identify the BITCOIN "account" (which is not tied to any PII, or the Personally Identifiable Information), followed by the demonstration of ownership of the private key, which authenticates the BITCOIN account and authorizes the transactions. The cost of service is charged to the involved BITCOIN accounts (addresses) directly or indirectly without involving any real person (or PII).

In the case of Krypton Tokens, Ai-Fi Cloud elevates the privacy protection a step further. Any token storage operations are between the owner of the tokens and the Ai-Fi Incognito Cloud, without the need for a publicly viewable blockchain for recording transactions involving multiple parties.

Summary of Security Properties

No need to publish the file name (or "public" key), as tokens are not designed to be shared or transacted (which may change under different application scenarios). Unlike the "spent BITCOIN accounts" that cost 32 bits reduction of entropy for conducting BITCOIN transactions, Krypton tokens may utilize the whole 100 bits of entropy.

Since Krypton Tokens are designed primarily as keys to high-value file contents and seldom needed in real time, they may be reinforced by additional entropy through "client salt," which is a string of random bits that may be copied and stored offline. The secret passphrase is the last line of defense and therefore needs to be memorized, whereas its accompanying "client salt" needs not be. It is suggested to write it down in a notebook or lock it away in a drawer and rely on the physical security of their premises to prevent its theft. In other words, the protection of the random salt is to be traded off against the threat of compromising physical security.

The Ai-Fi Incognito Cloud only provides storage space for submitted Krypton Tokens and not a publication service for file exchange. A token is retrievable from the collection of all tokens only if the correct key pair is presented. Even if the Ai-Fi Incognito Cloud is compromised, losing all the token files as a consequence, there is no way to tie a specific file to any individuals. This further increases the entropy of the Krypton Token scheme based on the number of token files as the control parameter. For around 1 million files, we increase the entropy 20 bits.

The entropy of the Krypton Token scheme may be summed up by 100+ entropy(salt)+entropy(file collection), or 248 bits with 16 bytes of random salt and 1 million token files, stronger even than the unspent BITCOIN addresses (160), with both the random salt and the number of token files tunable to manage the entropy. The users may adjust their selection of salt to strike a balance between the convenience and high entropy, calibrated based on the security requirement of the contents to be protected.

All the entropy calculations above presume the feasibility of offline attack, which is not a hurdle for hacking BITCOIN accounts, as all materials for hacking (brute force) are publicly available on the blockchain. In contrast, for conducting offline attacks on any Krypton token, the hacker must first obtain or steal the catalog of all token files from the Ai-Fi Incognito Cloud. Since the logic for managing Krypton tokens is extremely simple, the Ai-Fi Incognito Cloud is not likely to be compromised easily. Even if the Krypton token database is compromised, there will still be 164 bits of entropy to contend with, tougher than attacking any BITCOIN accounts. Furthermore, for targeted attack, if the hacker successfully invaded the home of a high value individual and got hold of their salt, he will still be struggling with 100 bits of entropy, on a par with the effort required to crack a miniLock. I hope you are convinced that Ai-Fi Krypton Tokens are the opposite of low-hanging fruits.

BIP38 is a standard process to encrypt BITCOIN and crypto currency private keys that is less susceptible to brute force attacks thus protecting the user. There are a few issues with this scheme:

The entropy of the private key is reduced to that of the password if there is any chance in memorizing it. The minimum strength of the password is not suggested or enforced. It may be prone to dictionary/rainbow-table attacks.

It is a hassle to figure out where to store the encrypted private key. If it were written down on a sheet of paper, the physical damage to the paper would be a likely hazard. If it is kept on a PC, then the issue of backup and redundancy must be considered.

The Portable Krypton Tokens may be considered an improvement over BIP-38; especially for issue 2 above if users opt for Filecoin decentralized storage as the repository. For issue 1, users may determine their own acceptable risk exposure and customize their parameters accordingly. The Ai-Fi Superlock mechanism offers additional options in protecting your password or private keys.

Although a token operation is paid via a specific cryptocurrency, the token transaction itself is not recorded on its associated payment blockchain to ensure the anonymity of the service request. The integrity of the token operations and the service guarantee is provided by getting a transaction receipt from the Ai-Fi cloud service per submitted request and a private auditing mechanism to be conducted by users themselves.

Ai-Fi Incognito Cloud Service maintains an append-only log file containing all the request/response status logs. When a user requests for a token service, at the completion of fulfilling the request a receipt is returned to indicate the successful operation of the request and prove the Ai-Fi's possession of the submitted token file if the operation is a Create or Write. The receipt describes the corresponding entry created in the log in response to the request. The append-only log file can also be used for monitoring access to a token ID, such that requesters are allowed or denied access if the comparison of the data provided in their request does not match to data, e.g., multi-factor authentication data, in the append-only log file.

Although there are some metadata embedded in the receipt or the descriptor of the Krypton transaction, they are not stored anywhere within the Ai-Fi Incognito Cloud as part of the Terms of Service for Krypton Token Storage Services, explicitly committed to by Ai-Fi as a service provider. In substitution for a publicly viewable blockchain, the Krypton Token Root Log is open for inquiry by anyone when the log serial #(or the "Next" after the cursor) and a nominal payment for the service charges are presented. This allows the owner of the token to conduct auditing on the integrity of the log. For non-owners, the descriptor on the log is not penetrable without the background and transaction details which are privy only to their original owners once committed to the log.

The private token log does not store any Token IDs, only their hashes, which reduces the entropy of the protection scheme if leaked out.

The receipt or the descriptor of a token transaction is the contractual claim to a token file. If it is not found, Ai-Fi cloud service must render a different receipt with a newer timestamp to counter the claim, or be responsible for the loss of the token file. The owner of the token may also discover any illicit activities launched against the token.

To help evaluate the security quality of various Ai-Fi Krypton Tokens, we list a few of their characteristics below, incorporating the BITCOIN in the comparison:

The BITCOIN addresses, hash of the BITCOIN account public keys, are visible on the blockchain with much less entropy than the keys themselves, whereas the Ai-Fi tokens are completely hidden. The Tor Onion Routing is also available for anonymizing the communication with the Ai-Fi Incognito Cloud, making the owner of Krypton Token untraceable.

The loss of one's wallet would render both the BITCOIN accounts and the Ai-Fi hosted tokens inaccessible, unless the wallet's recovery passphrase is backed up and recoverable; whereas the Ai-Fi portable tokens are not tied to any external apparatus.

The contents of all Ai-Fi Krypton Tokens are encrypted based on their original key pairs. Only the Ai-Fi portable tokens are vulnerable to dictionary attacks if the passphrase is not properly selected.

Due to their anonymity, Ai-Fi.net is not able to attribute ownership of tokens to their originating parties or serve notification of any kind of activities or events occurring. To guarantee the highest level of recoverability of their posted tokens, an Ai-Fi users may adopt a combination of the following strategies:

Sign up for Ai-Fi cold storage service with a back-up schedule determined by the payment class.

Store the tokens at a private site (e.g. the Home Servers, personal computers, mobile phones, etc.)

Employ the Ai-Fi SuperLock mechanism and commit one of the secret shares to the Ai-Fi Incognito Cloud. The SuperLock-styled redundancy will protect your original secret texts.

Ai-Fi Krypton Tokens are a novel idea. Although the implementation is straightforward, Ai-Fi users need a bit of push to start adopting them. For encouraging their adoption and convincing their reliability, a bug bounty program is launched.

Dictionary or Rainbow Table Attacks

Once the files or their metadata are stolen, offline dictionary attacks and Rainbow Table (pre-computed hash table) attacks are effective means of hacking for passwords in order to steal their content. Password hackings are based on the observation that people are experiencing difficulties in choosing their passwords or file names and tend to select texts easy to memorize. Oftentimes passwords are simply words straight out of a dictionary or some variations of those from the dictionary. As most of the cloud storages are indexed under account identifiers, the loss of passwords or their equivalents can be disastrous. Successful password hacking attacks are commonplace and we are increasingly concerned about the potential compromises on password-based account access to our cloud resources.

A typical safeguard against dictionary attacks is to incorporate a random salt into the password hashes. The randomness and uniqueness of the salt is critical to ward off some parallel schemes of offline hacking into a large collection of passwords. Random salts are effective means to multiplex a standard hashing scheme into a large hash mapping space, which makes pre-computation of hashes impractical.

Online vs. Offline Attacks

Online password attacks are difficult to pull off, as the number of tries is limited. Offline attacks are much more effective when the hackers manage to get access to a large collection of passwords by hacking into the authentication servers where the passwords or their hashes are kept. This kind of attack is becoming more prevalent as many of the established service providers (LinkedIn, Dropbox, Facebook, Twitter, etc.) have been compromised in many situations.

The attack scenarios in password or credential cracking are usually aimed at identifiable accounts, which are easily reconstructed based on simple triangulation scheme (DOB+Zip+Sex, typically). A successful password cracking would spell disaster for the account after opening up a target account with access to any information or funds stored within under the account identifier.

The SuperLock

All your cloud storages and other valuable Ai-Fi assets are protected based on the many key pairs in your Ai-Fi Wallet. To guard against the possible loss of your mobile phone where your wallet resides, we suggest the setup of an Ai-Fi SuperLock, which splits any text string that requires the strictest protection into multiple parts or shares. To unlock the original secret string requires a majority of parts or shares working jointly. It is fail-safe against any single-point failure. The property of anonymity of Ai-Fi Incognito Cloud described here is a handy option for storing one of the key shares without the concern of losing or exposing the key. Once entered into the Ai-Fi Incognito Cloud as a protected token, no one is able to relate the stored key share with the owner.

A SuperLock involves at least 3 key shares, some of which may require your memorization. For your protection against accidental memory lapses, there is an option to schedule a periodic reminder for "rehearsing" your SuperLock recovery process on the phone where the SuperLock is hosted.

During the scheduled SuperLock recovery rehearsing, if any one of the shares failed to respond correctly, the entire SuperLock must be reset in order to recover from that unexpected failure Wallet Protection Mechanisms General There is a lot of misinformation around regarding the protection of crypto wallets. Most of the hardware wallets are only feel-good solutions if we examine their security issues carefully and logically:

To achieve ideal protection, the wallet software and the destination crypto-transaction server must be secured end to end. In the case that the wallet software runs on a mobile phone (ANDROID or iPhone), the following must all function correctly:

the application sandboxing mechanism on the phone the hardware protection or secure enclave of the cryptographic keys the end-to-end network transport secrecy All hardware or cold wallets (Ledger/Trezor and the like) add one extra network hop to the end-to-end connectivity without necessarily enhancing any of the required functions listed above. Worst yet, it adds extra durability to hacking.

As most hardware wallets are difficult and prone to errors in their upgrades, and their wallets generally are not in lockstep with the latest cryptocurrency technologies, oftentimes they rely on a secondary software "client" running on separate and more popular platforms such as iPhone or ANDROID. In that case, all security and reliability considerations are weakened due to the extra network hops and additional endpoints that may fail. An extra piece of hardware is not necessarily a plus, and worse yet, it may turn out to be a liability. One of the well-documented vulnerabilities is reported here. This is not to mention the counterfeit problem, or the hardware equivalent of Trojan horse or virus:

When it comes to hardware supremacy and accumulated experience against attacks, I'd place my bet on APPLE's secure enclave or Google's equivalent.

Any standalone hardware is vulnerable to so-called "Evil Maid Attack" by getting stolen, or simply losing it. Once the hardware is lost to a hacker, there is no shortage of offline attacks available to exploit the wallet. Even a-TPM fortified device is vulnerable.

Figure 6:

Some of the "air gap" implementations use visual aids to handle the inevitable passing of transaction information, such as QR code or other cut/paste variety, as shown in FIG. 6. This sneakernet in the 21st century doesn't accomplish much as the proxy software on the receiving end of the communication path is vulnerable to all the attacks with or without the "air gap."

To follow the "end-to-end secrecy" doctrine, it is actually more lucrative to strengthen a reliable end point on the server side of the connectivity, namely the acquisition and administration of a BITCOIN Core node without relying on any other third party or BITCOIN exchanges. Ai-Fi's HomeCloud may actually serve as the BITCOIN Core node (see the Ai-Fi Roadmap).

The cardinal rule of Internet security dictates simplicity, which encourages shorter communication paths or network hops, and fortification of the weakest link. All those hardware wallets on the market violate a few of those common-sensical practices. The primitive nature of their UI is also less than helpful in carrying out straightforward data entry on a miniature device.

Figure 7:
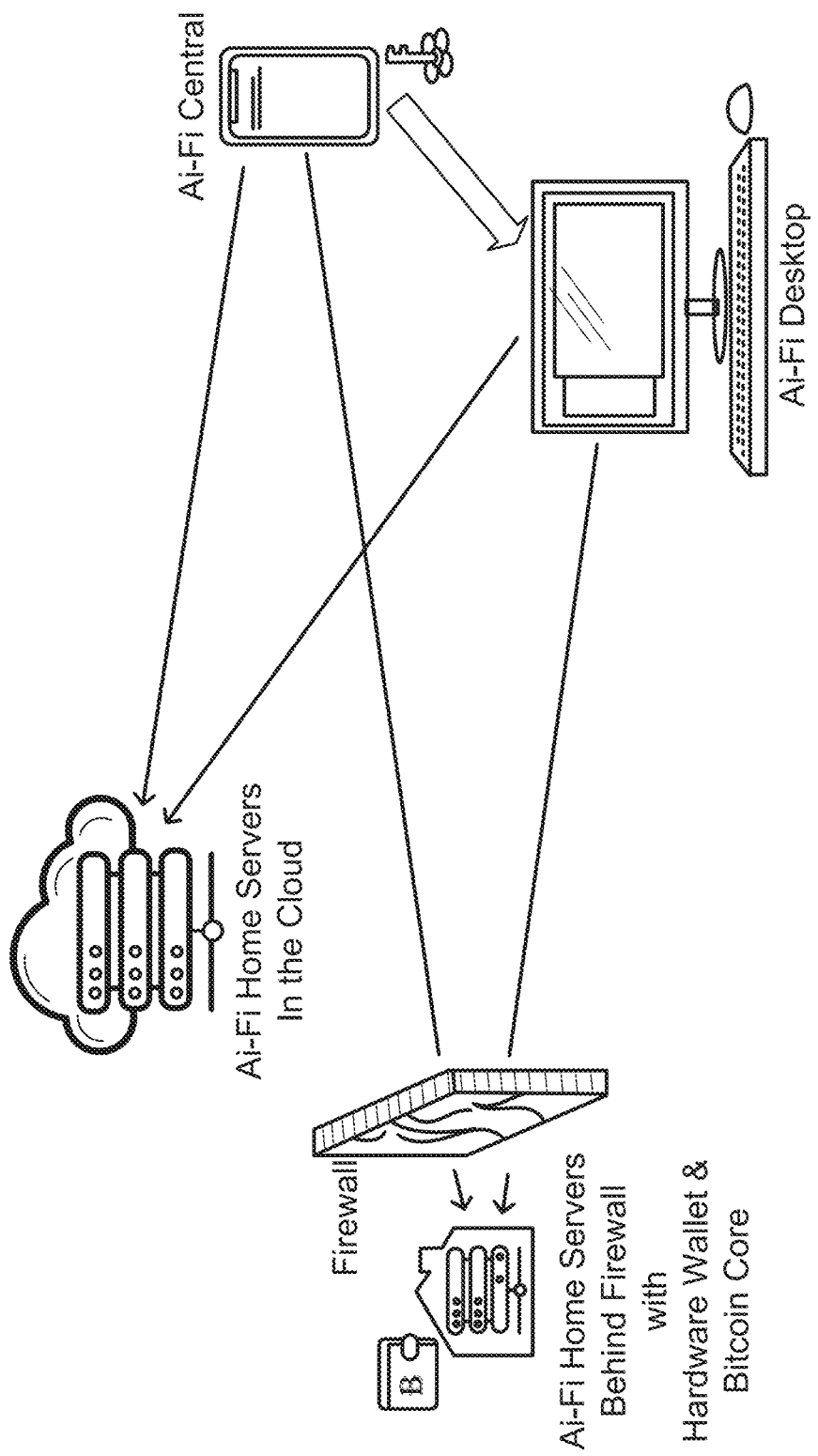

Granted, the "Secure Enclave" hardware in the iPhone has not been fully utilized for the moment. The mobile wallets taking full advantage of the Secure Enclave should appear on the market soon. Ai-Fi.net has also laid out on its roadmap an Ai-Fi hardware wallet on the same device as its private BITCOIN Core server (on a closed device, but running open-source software, residing on the Home Server behind the firewall as depicted below) without involving any network hops. It has all the advantages of a hardware wallet and eliminates all the MITM (Man in the Middle) attack surfaces with the added convenience of graphical UI and input devices we all have grown used to. FIG. 7 illustrates one such example.

Online Wallets

| Solutions vs Attacks | Software Wallets | Ledger/Trezor | Sandboxed Wallets | Ai-Fi Wallet |
|---|---|---|---|---|
| browser extension - hacks | X | V | V | V |
| mobile app hacks | X | V | V | V |
| Theft, detectable | X | X *1 | V | V |
| Hacking, online | X | V *2 | X | X |

-continued

| Solutions vs Attacks | Software Wallets | Ledger/Trezor | Sandboxed Wallets | Ai-Fi Wallet |
|---|---|---|---|---|
| Theft, shoulder surfing | X | X | X | X |
| Fire/Flood/Shock | X | X | X | X |

*1 Those hardware wallets like Legers and Trezors reduce substantially their online exposure. However, as any physical devices, they've created a new complication in their physical protection. Not all their owners would carry them in their pockets at all times. Like hot potatoes, the self- inflicted issues of safekeeping and speedy detection of any loss event are troublesome to say the least. In the event of a loss, the GPS tracking and "remote wipe" options are not available either.
*2 As long as it must be hooked up, regardless how brief it is, in theory the exposure to online hacking, including their proxies, is unavoidable.

Offline Wallets

A popular practice of cryptocurrency protection is to employ multiple wallets and keep most of the assets offline until the need arises. As all the public/private key pairs of a wallet are recoverable from its seed passphrase, with the content of individual account addresses publicly recorded on various blockchains, the offline wallets are functionally equivalent to their seed passphrases. Hence, managing and protecting the offline wallets is equivalent to the task of safekeeping those seed passphrases.

Regardless how well the wallets are protected, there is always the "cryptographic hot potato" issue to grapple with, namely how the seed passphrase is to be protected. On this issue of passphrase protection, the general tendency is to safekeep it offline, on a sheet of paper, in a notebook, with the above Billfold, and many other options away from any linkage with the Internet. The general mindset is to rely on (offline) the physical security for safety when a large amount of money is at stake. This preference is almost visceral in its appeal. However, regarding the daily trading volume of BITCOIN, around $10B, all of the transactions rely solely on the cryptographic strength of the BITCOIN key pairs. It is not logical to avoid any online solutions for maintaining your own seed passphrases.

Mobile App Hacks

Assuming the installation of a mobile application is sound, any attempt of hacking into the app must penetrate the sandbox built into the hardware platforms. The sandboxing for mobile devices on APPLE iOS or Google ANDROID platforms is the most technologically sophisticated around, much stronger than, say, WINDOWS or other PCs. Those dedicated hardware wallets such as Ledger Nano, Trezor, and the like, only substitute physical security for online soft protections and often lose critical usability in the process, albeit exposing a smaller attack surface. Those hardware wallets offer no protection to the recovery/seed passphrases and their conspicuous presence attracts unwanted attention.

Appendix II: Counterseal Wallet & Threshold Signature Technology

Wallet Securities

Cryptocurrencies are digital assets that use encryption techniques to publicly regulate the generation of units of currency and verify the transfer of funds in a decentralized and trustless manner. The crypto investors have total control over their own transactions, the flip side of which is the lack of support from any regulatory authorities for risk mitigation. This market exposes individual investors to much graver financial perils without providing any safety net for them to rely on. As a consequence, BITCOIN hacking has grown into a daunting criminal enterprise because if the private keys of your BITCOIN coins are compromised, the attackers can steal all your coins without leaving much trace. As the famous expression goes, Not your Keys, Not your Coins.

The following crypto-related entities are considered vulnerable to criminal attacks:

All the private keys of your crypto coins in your crypto wallets: Hardware wallets or key vaults are considered better options than keeping them on soft wallets running on a PC or portable device of questionable safety.

The recovery seeds of your wallets: This hot potato is almost always written down and placed in a hopefully inconspicuous drawer or bank vault.

Confidentiality and privacy regarding the transactions of your crypto coins

The first 2 entities are straightforward to understand the criticality of their protection as their compromise would spell the total loss of your valuable assets. Most hardware wallets aim to solve the protection of the first, while the second is getting less attention, quite odd considering its devastating consequence if it happened. The entity 3 is less obvious but has increasingly become a concern. For some people entity 3 is the all-consuming issue at the top of their priority list.

Due to their critical importance, there has been a wealth of hardware products addressing various aspects of the crypto coins and their associated wallets.

Our Counterseal technology focuses primarily on the attacks on the first 2 critical secrets. We provide protection that is much more flexible to your crypto assets than hardware wallets and solve the second hot potato issue as well. For the protection of the third intangibles, we will touch upon it only briefly. For a complete privacy and security infrastructure, you will find interesting those technologies and tools offered at our ai-fi.net web site.

Counterseal

A seal is traditionally used to close records by any type of fastening that must be broken before access can be obtained, producing an impression upon wax, wafer, or some other substance capable of being impressed. It is not a secret preserving (encryption) method but a tamper resistant mechanism employed during the delivery of sensitive information, against which there are many known attacks. The invention of the "counterseal" scheme in the 18th century provides a robust improvement over the single wax seal method by adopting redundant pairs working together to ward off the "hot knife" attack. You may be interested in taking a read of a brief historical background of the counterseal in the Appendix.

The nomenclature "counterseal" used here simply indicates the arrangement that two independent "signers" are required to create a single BITCOIN transaction signature. It is not based on the popular multi-signature scheme producing multiple signatures, but an application of the latest Threshold Signature technology to the Ai-Fi Counterseal Wallet. It is the modern software realization of the old counterseal method with the added advantage of placing those two logical seals separately and independently in order to avoid single points of failure. In the context of cryptography, the individual "seal" is implemented by a pair of crypto key "shares" each consisting of private and public components. The components of all linked seals jointly produce the public key for a single wallet account, whereas the private key shares remain physically distributed over multiple devices without ever needing to be joined for producing the private key. Those private keys or key components are therefore never exposed simultaneously and used only for producing "signature shares," which are pieced together at the end of signing rounds to create the transaction signatures for the wallet. Otherwise, the private keys in a Counterseal Wallet are nowhere to be retrieved or stolen and signatures are rendered without the need to explicitly reproduce the private keys. The initial key shares generation is described in the appendix.

On the other hand, the Hardware Wallet may be considered as the ancient single seal solution prior t33o the invention of the "counterseal" with all the perils in trusting a single piece of hardware. Among all the risks in relying on a single implement for secret hiding, the possible loss event of the hardware is the most severe. Additionally, although the recovery seed of the complete hardware wallet may be exported for recovery purposes, it is still also embedded in the wallet which may be exploited when the attacker manages to get their hands on the hardware wallet. As an answer to those issues, the counterseal scheme splits the key vault into multiple implements to avoid the potentially catastrophic event when the only hardware is compromised.

In the following we will describe how the Counterseal Wallet is configured at "unboxing" and how the signatures are obtained by applying both seals.

At the end, we offer a threat model for comparing the hardware wallet with our counterseal scheme.

Hardware Wallet

Wired

Most popular hardware wallets are simple hardware devices designed for storing the secrets or signature keying materials required for signing cryptocurrency transactions. It typically works with a "front-end" wallet (e.g. Exodus, Electrum and other crypto wallets supporting back-end hardware wallet) that interacts over the network with the blockchain directly such that the hardware wallet runs in the back-end in a streamlined design to reduce the attack surface and the front-end wallet is kept passive without maintaining any signature-related key materials. Some low cost hardware wallets require a USB wire or some other types of wired/wireless connectivity connecting to the host where the front-end wallet runs on. A device driver (e.g. Trezor Bridge) on the host mediates the traffic between the hardware wallet and the front-end wallet.

Air-Gapped

Figure 8:
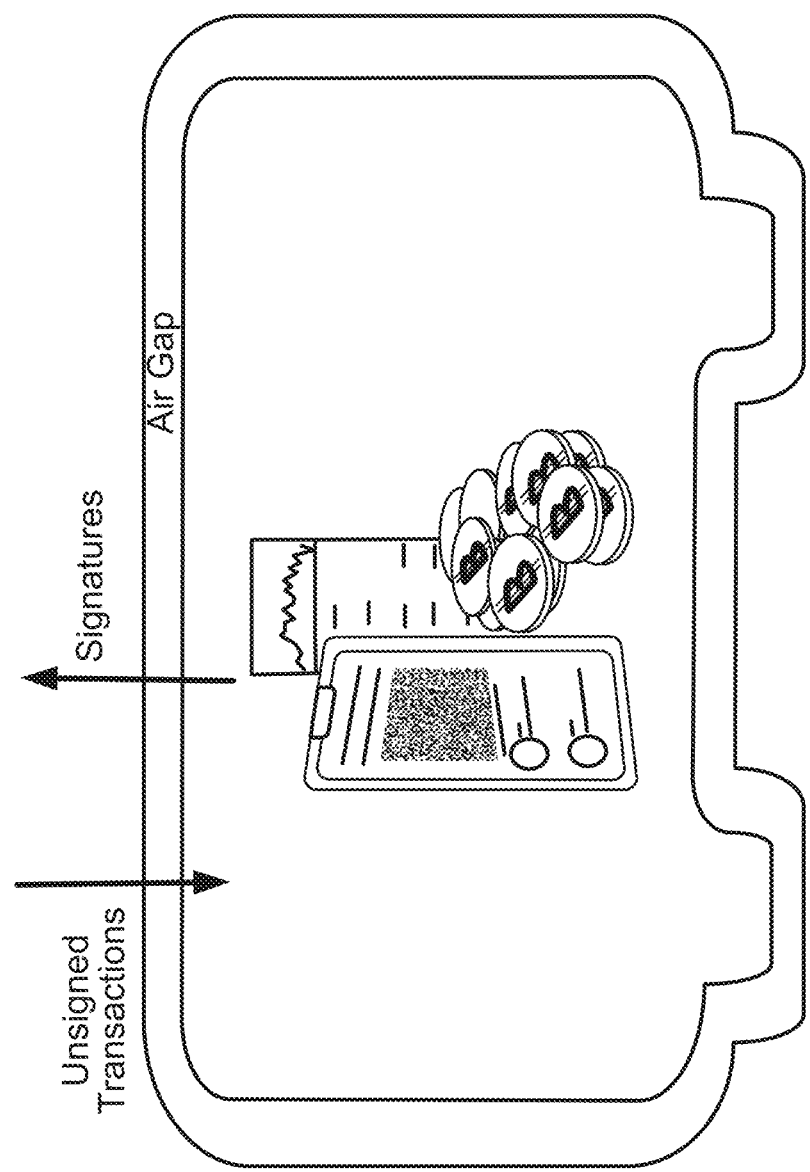

As illustrated in FIG. 8, an air-gapped hardware wallet/vault is more sophisticated in its association with the blockchain-facing front-end wallet without needing any wires or network connectivity. It stores the seeds and all the private keys (hence all the coins) in an air-gapped arrangement that reads in the intended transactions manually, usually assisted by the displayed QR code or other facilities for easy copy/paste. It is naturally "cold" in the sense that it won't trigger its functions until receiving the correct PIN code and manual entry of the transactions to sign. It involves at least one button press or other actions involving human operators. It may still be operated remotely if the QR code images or imported/exported transaction-containing files are allowed to be interacted remotely.

Ai-Fi Counterseal

Counterseal Construction

Figure 9:
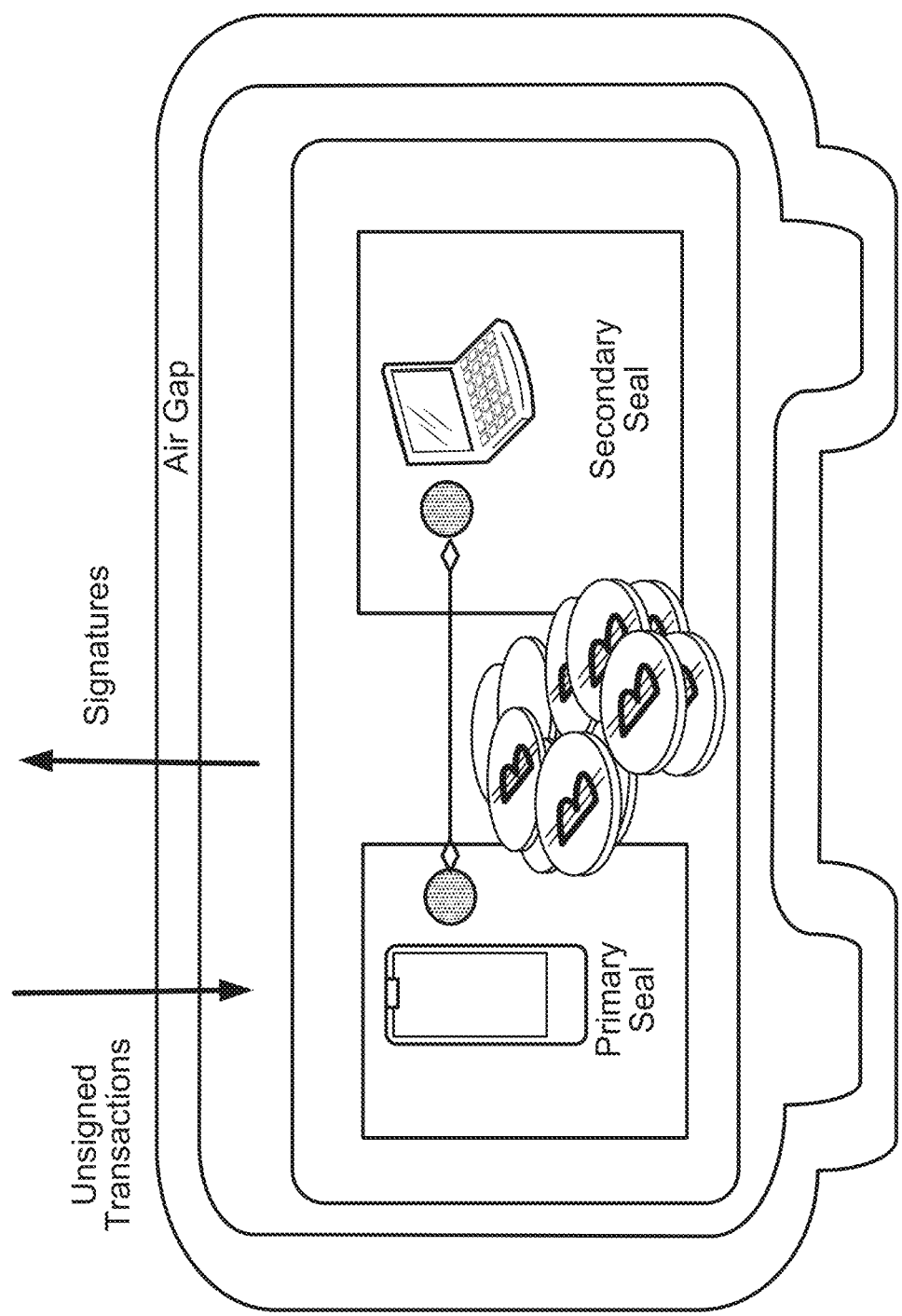

As illustrated in FIG. 9, the Ai-Fi Counterseal is also a key vault like those air-gapped hardware wallets, except that it splits the hardware key store into 2 independent parts. It is composed of two independent components, usually in software, running on separate devices, which, when working together, supports a variety of front-end watch-only crypto wallets and offers up an unparalleled set of protection and usability through built-in redundancy.

For interfacing with BITCOIN wallets, it follows the BITCOIN HWI (Hardware Wallet Interface) with the Primary Signer responsible for interfacing externally with those BITCOIN wallets, which is based on an air-gapped design relying primarily through manual QR code scanning in both directions across the air gap.

The Counterseal vault is to store the key information of your crypto coins and to conduct transaction signings under the counterseal scheme or joint signing involving multiple redundant signers (2 of 2 for now). The key information in the vault does not include any of your private keys as such, only distributed bits and pieces ("shares") sufficient to conduct the signing when combined.

The operations of Ai-Fi Counterseal Wallet are diagrammed above, with the Primary Seal working with the wallet and the Secondary Seal the cooperating partner on a separate device. The word "seal" adopted here indicates the protection afforded by the secret shares kept by two separate signing parties, which is not to be confused with the crypto key pairs. Both seals must be presented and online in order to successfully assemble the signatures for blockchain transactions. We sometimes use "seal" and "signer" interchangeably.

In the current implementation, we designate our mobile phones as the "leading" partner, or primary, in the Threshold Signature logic. The Secondary Seal is to run on a separate device, "signature only," without the means to affect the terms of any transactions such as the transfer values or the "inputs/outputs." Even if the secondary seal were compromised, the worst damage inflicted would be the denial of service without the possibility of producing incorrect transactions or losing crypto coins.

We support the open source Electrum Wallet and BlueWallet in the first release with many more to come.

Downloading Counterseal Software

Go to https://www.counterseal.net and press the "Get Started" button on the top right.

Pairing of 2 Counterseal Signers/Seals

The Primary and Secondary Seals work together to generate the full set of Counterseal functions.

Figure 10:
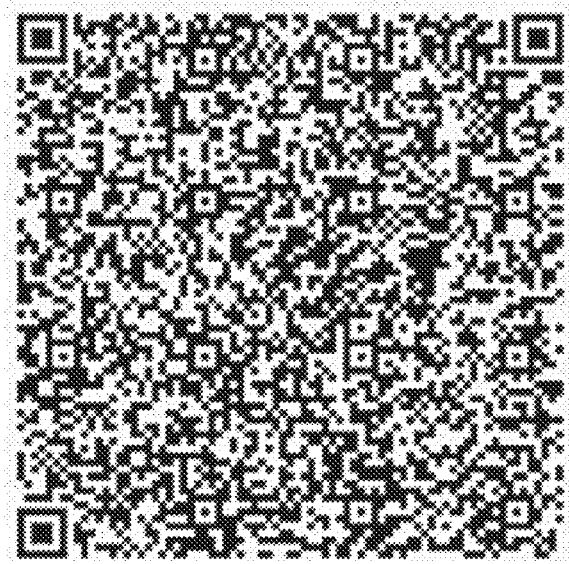

As illustrated in FIG. 10, since the Secondary Seal must be securely bound to the Primary, there is a Pairing process at the outset, during which the Secondary Seal displays a QR code for the Primary to scan, if it is not yet bound to it to establish the trust relationship manually through the TOFU (Trust On First Use) authentication. Once paired and bound, the Primary and the Secondary will be mutually recognized with each other through two ID key pairs, which are used later for establishing a TLS-strength secure connectivity needed for Threshold Signing. The Primary may be required to re-connect and re-authenticate itself if either of the network addresses changes, by repeating the process of the Primary scanning the QR code displayed on the Secondary.

If the Secondary Seal is installed on a WINDOWS 10 platform (as a service), its management panel may be found in the WINDOWS system tray. Uninitialized Secondary Seal will display the following pairing QR code to kick off the initialization:

Note that in the management panel of the Secondary Seal the "Display Transaction Details" option is turned on by default. More on this option will be described later.

Figure 11:
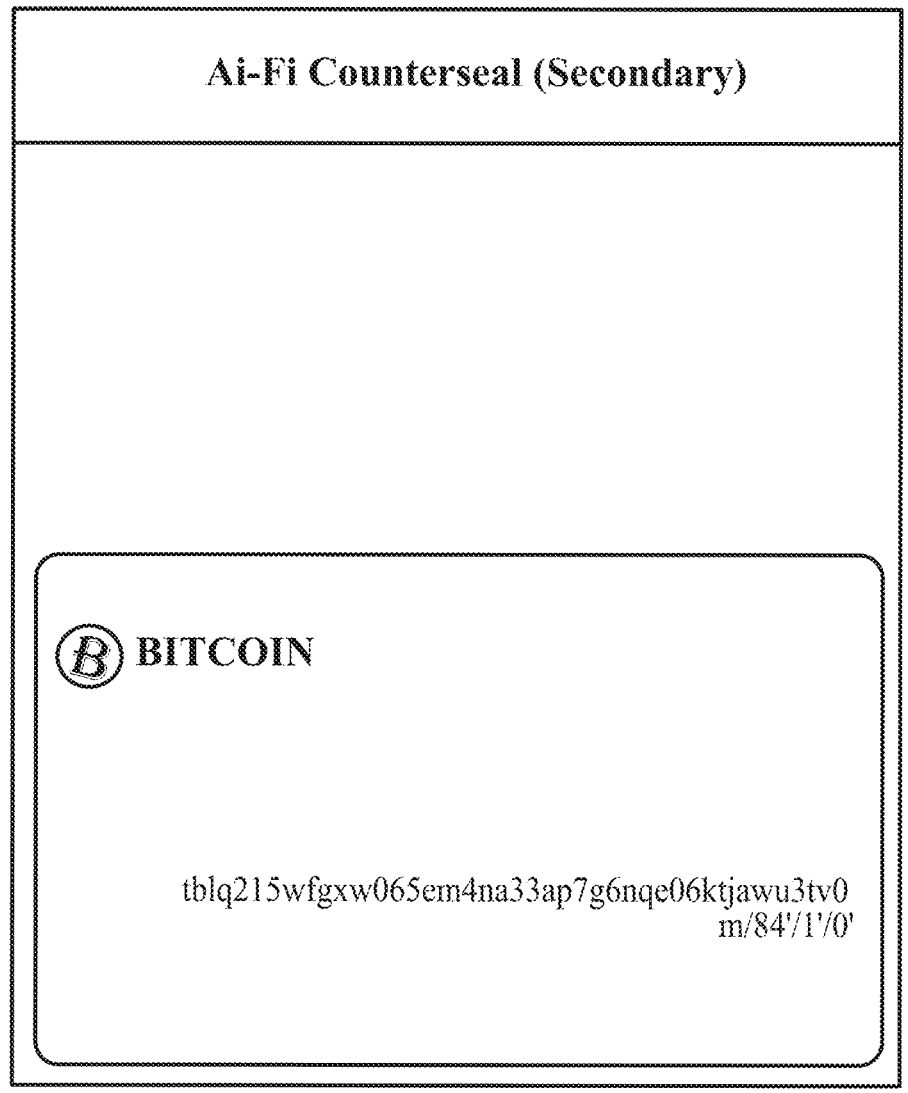

Once the pairing completes, the vault of the supported crypto coins is represented as shown in FIG. 11.

The "Master Public Key" is displayed on the face of the "wallet card." Before the transaction signature can be carried, the primary and secondary must be "in sync" in order to be ready, under which condition the public keys on both signers are identical. The upper right icon is for displaying in QR code the public seed address for the key store of the supported coin type to be used in the binding process, which binds a crypto wallet (Electrum, BlueWallet) to the vault. The "QR scan" icon on the lower left is for importing the transactions from a supported wallet in an air-gapped fashion.

More details on the actual internal steps or the Key Generation of the Threshold Signature Technology, conducted during pairing are provided here.

BIP32 Compatibility and Backup of Seeds

Ai-Fi Counterseal Wallet is BIP32 conformant and follows the BIP32 convention on the account level and supports multiple "accounts" through Extended Key, each of which is composed of a single external keypair chain. The top 4 levels supported are m/84'/0/0.

Internally the Ai-Fi Counterseal Wallet/Vault does not store any private keys and therefore provides no counterpart of standard BIP 32 Master Seed and Master Node in the counterseal scheme. Therefore, an Ai-Fi Counterseal Wallet may not be exported to traditional wallets and vice versa.

Figure 12:

Although not a standard deterministic wallets, Ai-Fi has a customized backup procedure for storing the counterseal "seeds," based on which the Counterseal Vault may be fully recovered. As shown in FIG. 12, both the Primary Seal and the Secondary Seal have their own seed for recovery purposes. Due to the complexity of the Threshold Signature scheme that dictates many rounds of cryptographic steps to guarantee its security, the backup data is much more involved and difficult to be condensed into straightforward mnemonic passphrase. For their safekeeping, it is recommended to store them (or one of them) as Ai-Fi Krypton Tokens in the Ai-Fi Incognito Cloud, which are based on the Ai-Fi pseudonymous cloud storage design, wherein your files are protected by a cryptographic key pair of similar or stronger strength than that of your BITCOIN accounts recorded in the BITCOIN blockchain. Since your dealings with Ai-Fi.net is account-less and keyless, the Ai-Fi Incognito Cloud is completely pseudonymous like your BITCOIN coins. Please refer to its documentation for more in-depth discussion of this scheme.

The backup scheme takes advantage of the inbuilt counterseal redundancy and generates two separate backup "tokens", one of which may be written down on paper (the "paper vault"), which you may rely on the safety of your home or a bank safe deposit box for its protection if so chosen. The other backup seed recovery file may be either maintained privately (in your local storages) or sent to the Ai-Fi Incognito Cloud as an Ai-Fi Krypton Token protected by a strong passphrase. Under this backup arrangement, there are no single points of failure and is completely trustless, eliminating even the possible concern about the involvement of Ai-Fi as a service provider in its management of the Ai-Fi Incognito Cloud.

Ai-Fi Counterseal Operations

Architecture

Figure 13:
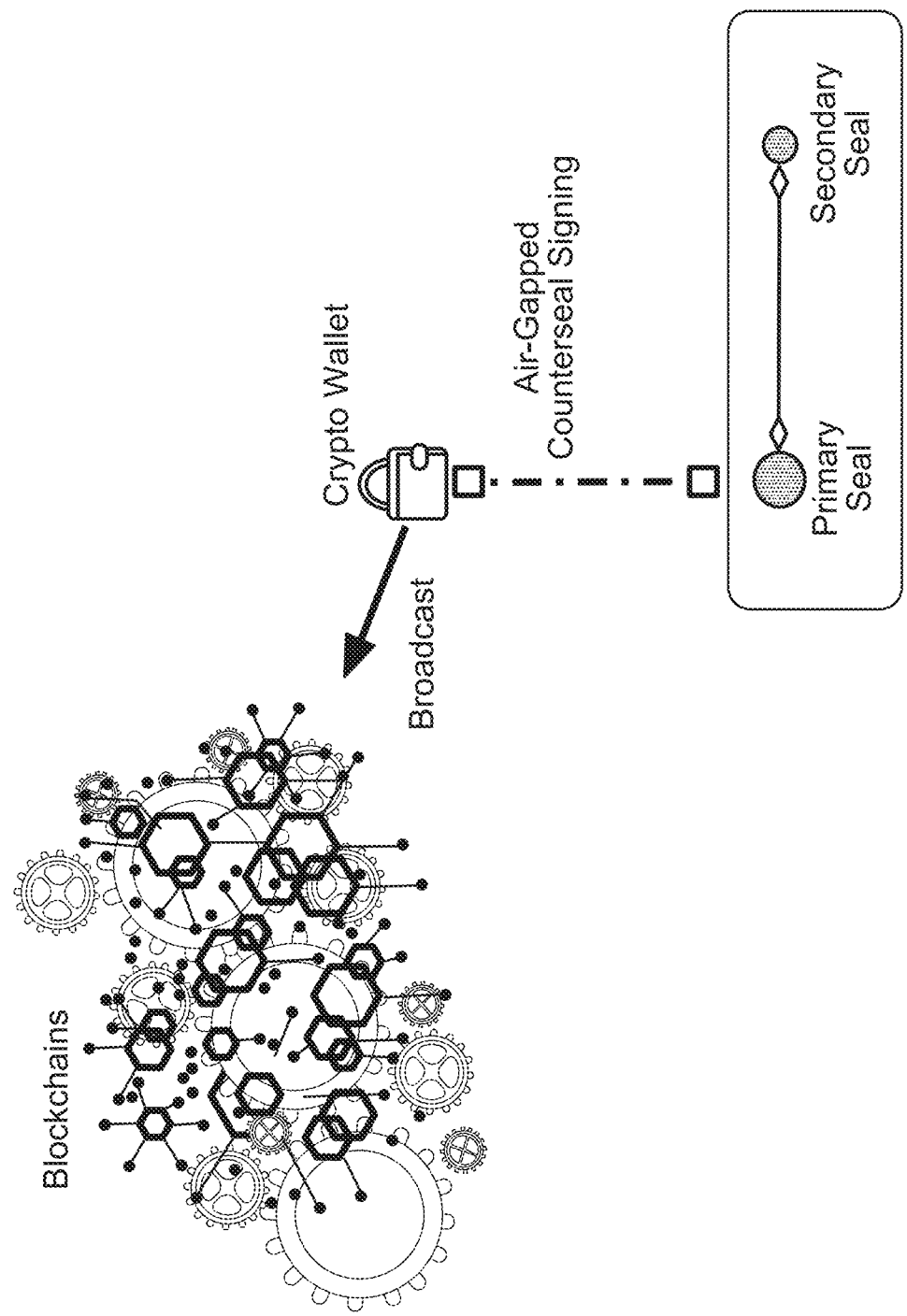

As shown in FIG. 13, architecturally the interfaces between the crypto wallet and the counterseal parties (Primary and Secondary Signers) are air-gapped without relying on any network connectivity. There is no network connection required between the wallet and the signers, which allows both of the signers/seals to function offline in order to ward off possible remote online attacks to the greatest extent. This also affords the flexible binding between the crypto wallets and the signers. Use Electrum as an example: the Electrum generates a transaction, which is represented either as a QR code or in a file format. The Primary Seal/Signer collects the transaction by scanning the QR code or accepting the transaction file from Electrum as an "export." After the primary and secondary signers successfully render the signature, the resulting signed transaction is imported back to the wallet in the reverse direction through either a QR code or a file via the same channel, which is then broadcasted to the BITCOIN blockchain by Electrum.

Note that the example wallets documented here (Electrum and BlueWallet in the first release) is "watch only," which is not able to conduct transactions without the participation of both signing seals in generating the required signatures.

Counterseal Vault as the Last Line of Defense

Since the front-end wallet (e.g. Electrum or 9 BlueWallet) is where the user typically gets their visual feedback and is subject to phishing or malware attacks, the actual transactions passed on to the Counterseal Vault may not match what is being displayed on the wallet. Be sure to carefully examine the transfer amount and the transfer input/output addresses and satisfy yourself that there are no discrepancies between what is displayed on the front-end wallet and the Counterseal app on your mobile phone. Any defects would indicate a phishing attack with disastrous consequences.

Counterseal Supporting Electrum Wallet

Electrum/Counterseal Configuration

Figure 14:
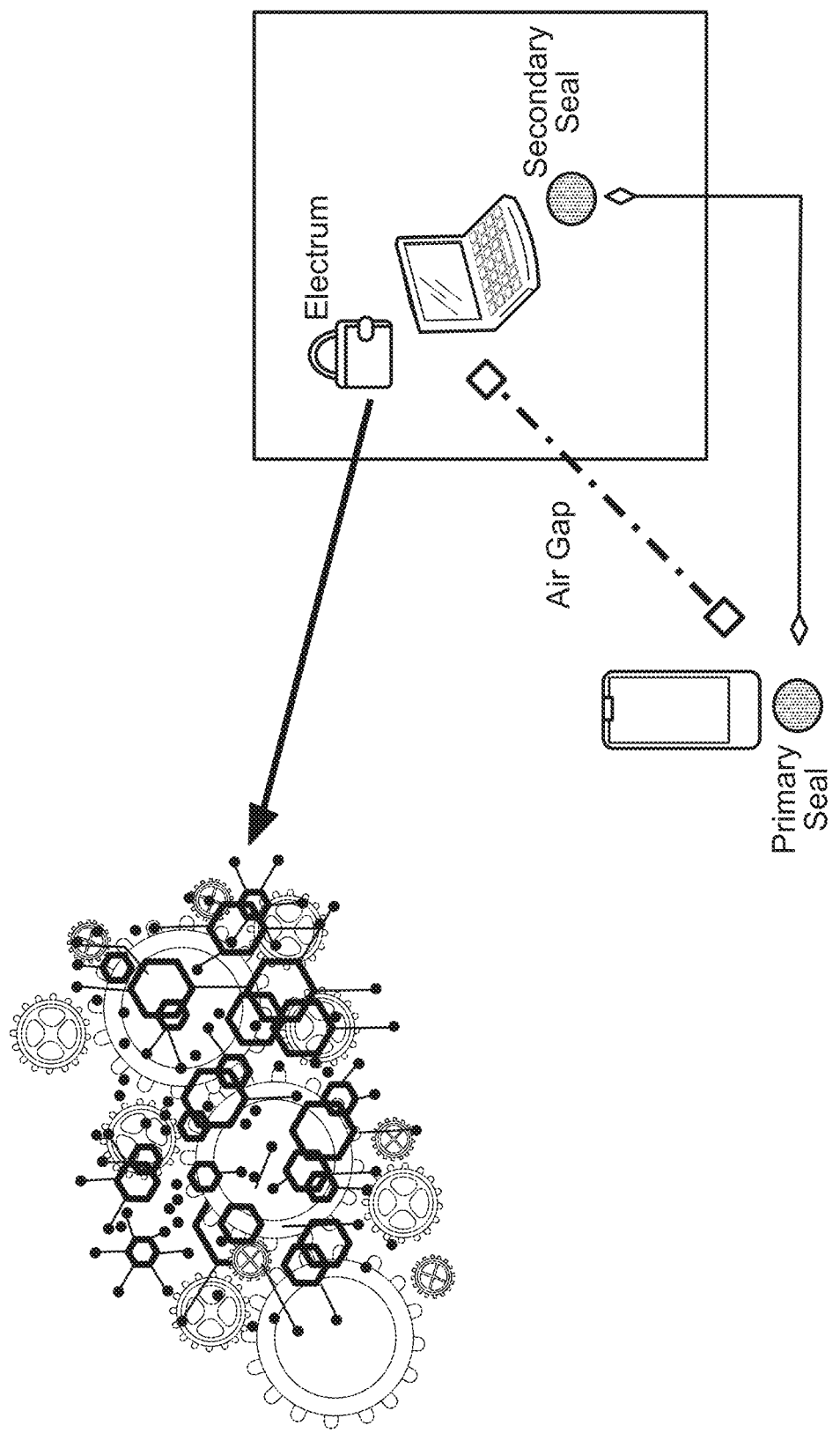

As shown in FIG. 14, for the popular BITCOIN wallet Electrum, the standard counterseal configuration is diagrammed above with both the Electrum and the Secondary Seal hosted on the same WINDOWS PC. The Secondary Seal may be placed on another device of yours to create yet more redundancy.

Figure 15:
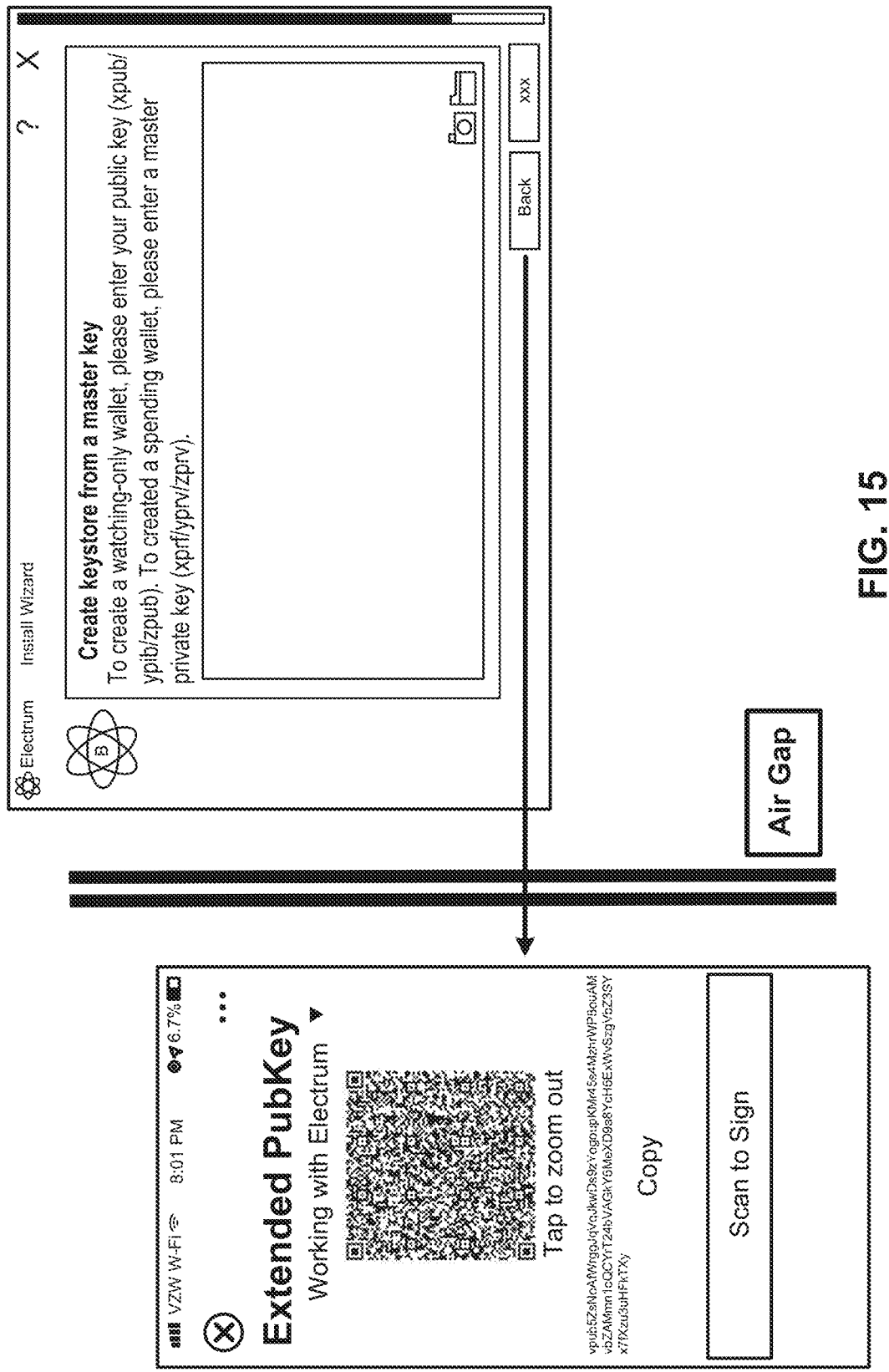

In the Electrum application, when first creating a wallet, select "Standard wallet" and then "Use a master key" in the Keystore selection screen to indicate that the keys are from an external key vault. On the "Create keystore from a master key" screen, scan the QR code displayed on the Counterseal Primary Signer (by tapping the "wallet card" on the counterseal app on your mobile phone) in order to initialize the Electrum key store from the air-gapped Counterseal vault, as illustrated in FIG. 15.

Electrum/Counterseal Transaction Validation

Figure 16:
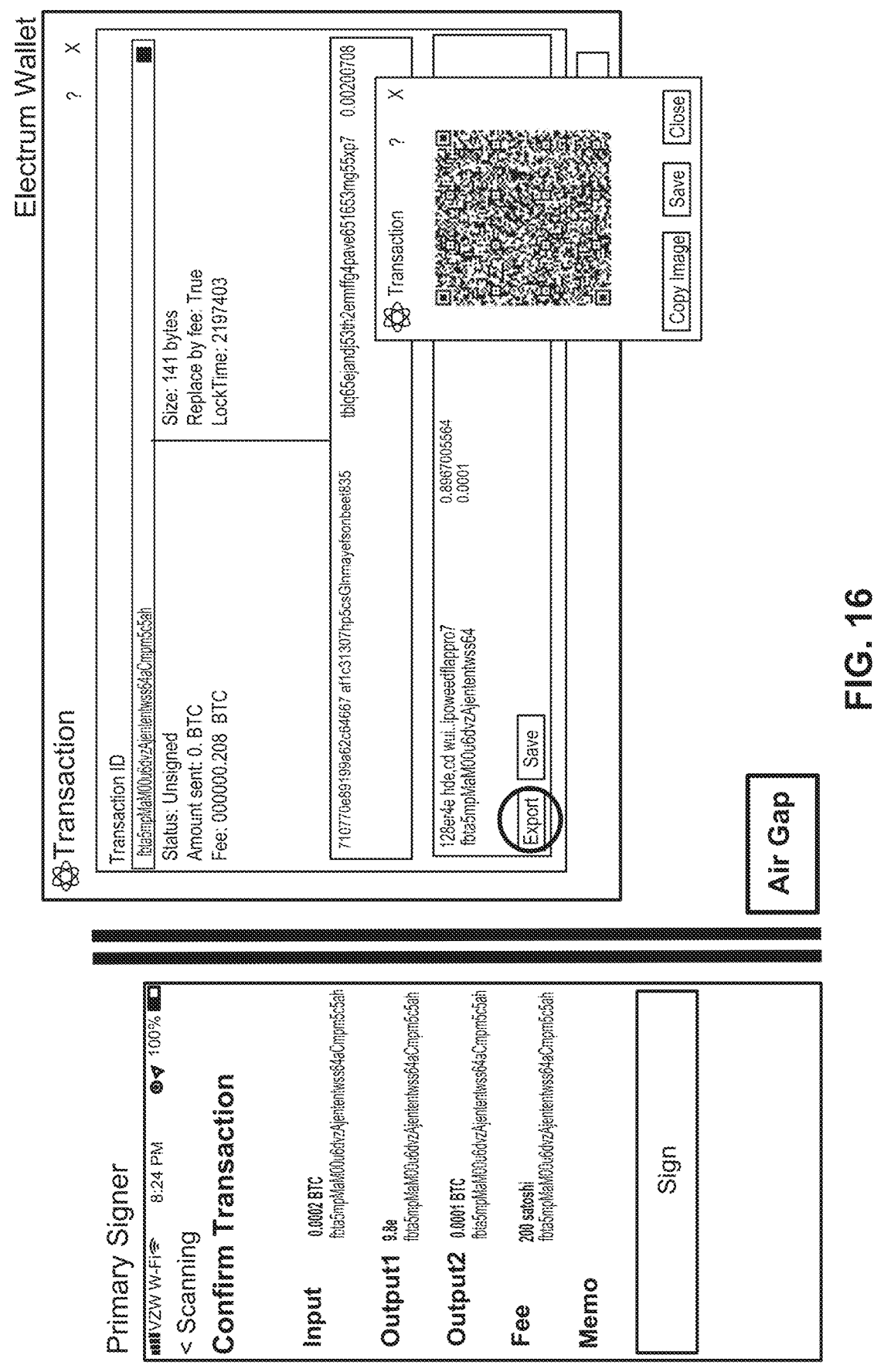

After the keystore is initialized, the normal flow of BITCOIN transactions may commence. For instance, the example "Send" transaction is formulated and "exported" (red circle below) to the Primary Signer through the QR code as illustrated below with the Electrum screen on the right and Primary Signer left, as illustrated in FIG. 16.

The transaction signature request received by the Counterseal app will display its transaction outline (left) for your confirmation. Make sure the highlighted Electrum data (Inputs, Outputs and associated amounts) are identical to those in the confirmation screen of the Counterseal app. be sure to verify every single digit displayed on both sides of the air-gap. This is one of the most important steps in the counterseal process. If successfully validated (visually), all three components (Electrum, Primary Signer, Secondary Signer) must all be compromised for our Counterseal application to be defeated, an extremely unlikely scenario. This is the strongest defense obtainable among all the wallet applications on the market.

Figure 17:
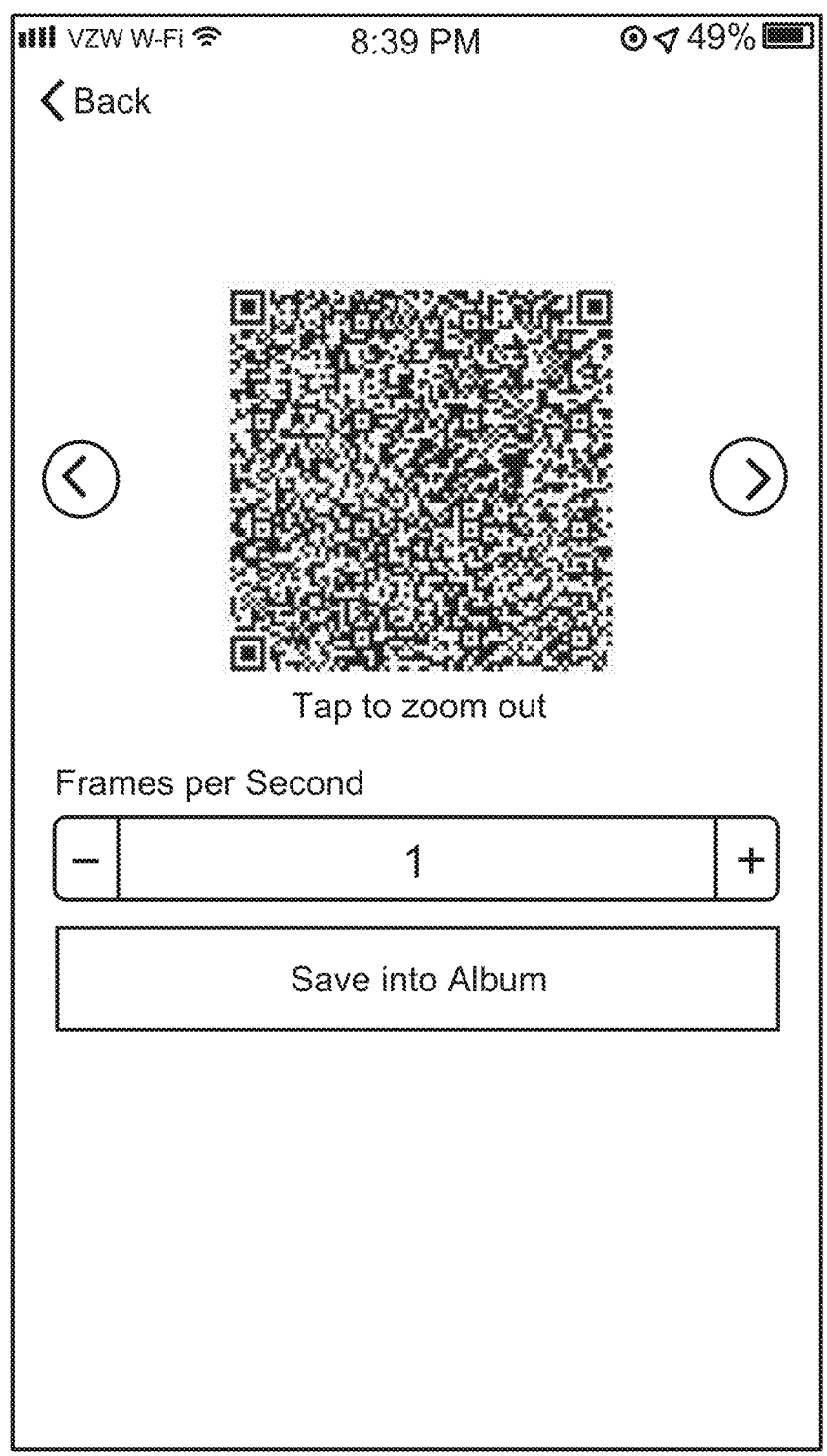

The Primary Signer then requests the counterseal signature from the Secondary Signer and displays the QR code when the counterseal signature is successfully constructed, as shown in FIG. 17.

Depending on the complexity of the transaction, the counterseal signing may require several steps and trigger multiple frames of QR codes. After the successful signing of the transaction, Electrum collects this signed transaction (in QR code format) by going to the "Tools"==>"Load transaction"==>"From QR code" to read the transaction back. Once imported, the transaction is ready to be broadcasted to the BITCOIN Blockchain.

Note that in terms of interfacing with the Electrum wallet this Counterseal scheme is quite similar to how the "offline paper wallet" is handled. Although involving more components due to inbuilt redundancy, the Counterseal signature scheme works similarly as those popular hardware wallets for interfacing with the BITCOIN wallets. Look up the documentation for the Electrum wallet for other relevant information.

Counterseal on Tails

Figure 18:
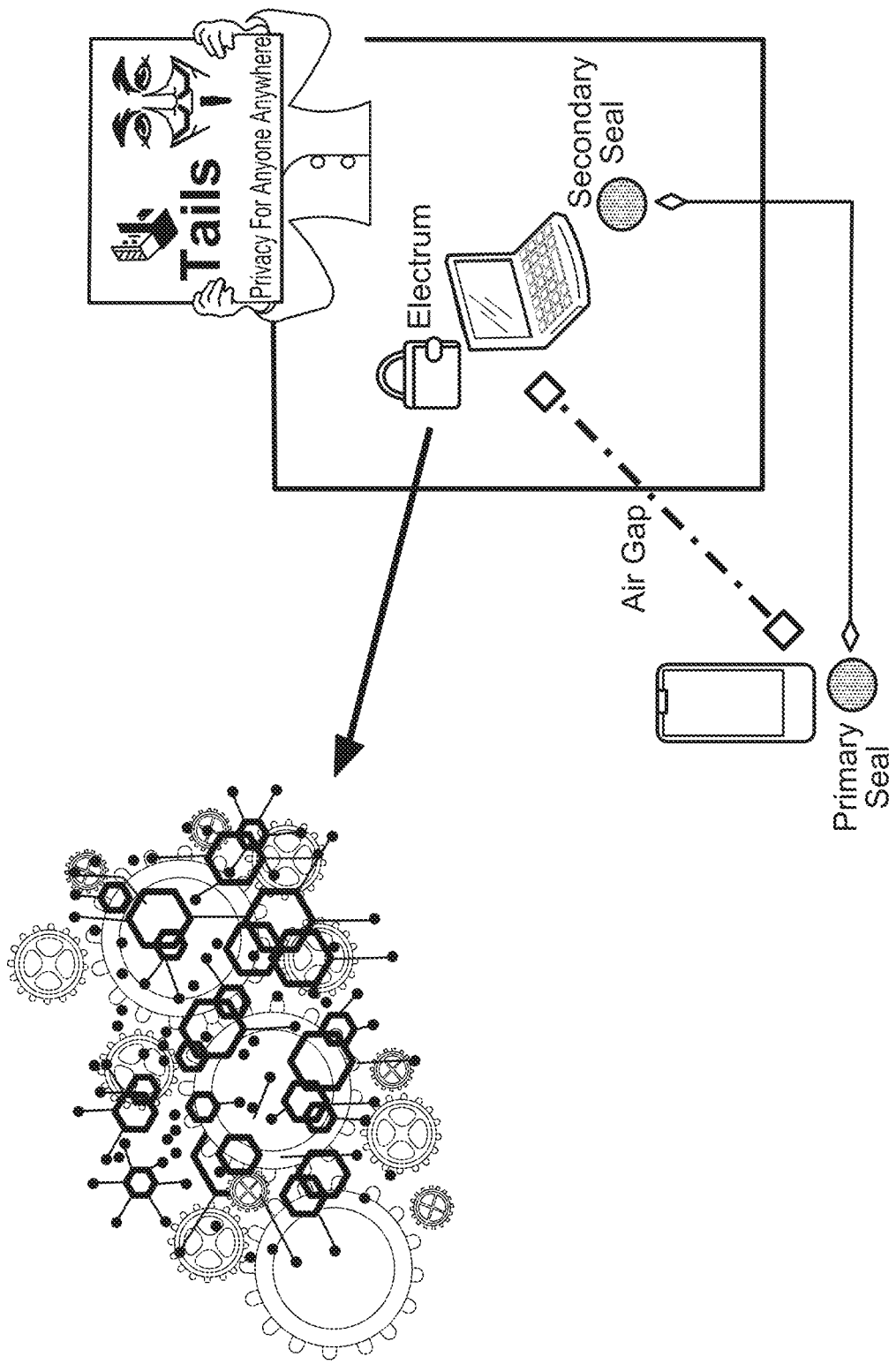

The software for the Secondary Seal typically runs on standard PCs or desktops. For peace of mind, we also offer a highly secured "live Linux" TAILS-based system on a USB stick for running the secondary seal in order to avoid possible tampering of the secondary device. This multi-factor secure setup is highly resistant to tampering (both hardware and software) due to the built-in redundancy and the live nature of the underlying highly defensive malware-free Linux. The link between the primary and the secondary is securely protected by TLS once the two signers are successfully paired. This can be illustrated in FIG. 18.

Counterseal Supporting BlueWallet

Figure 19:
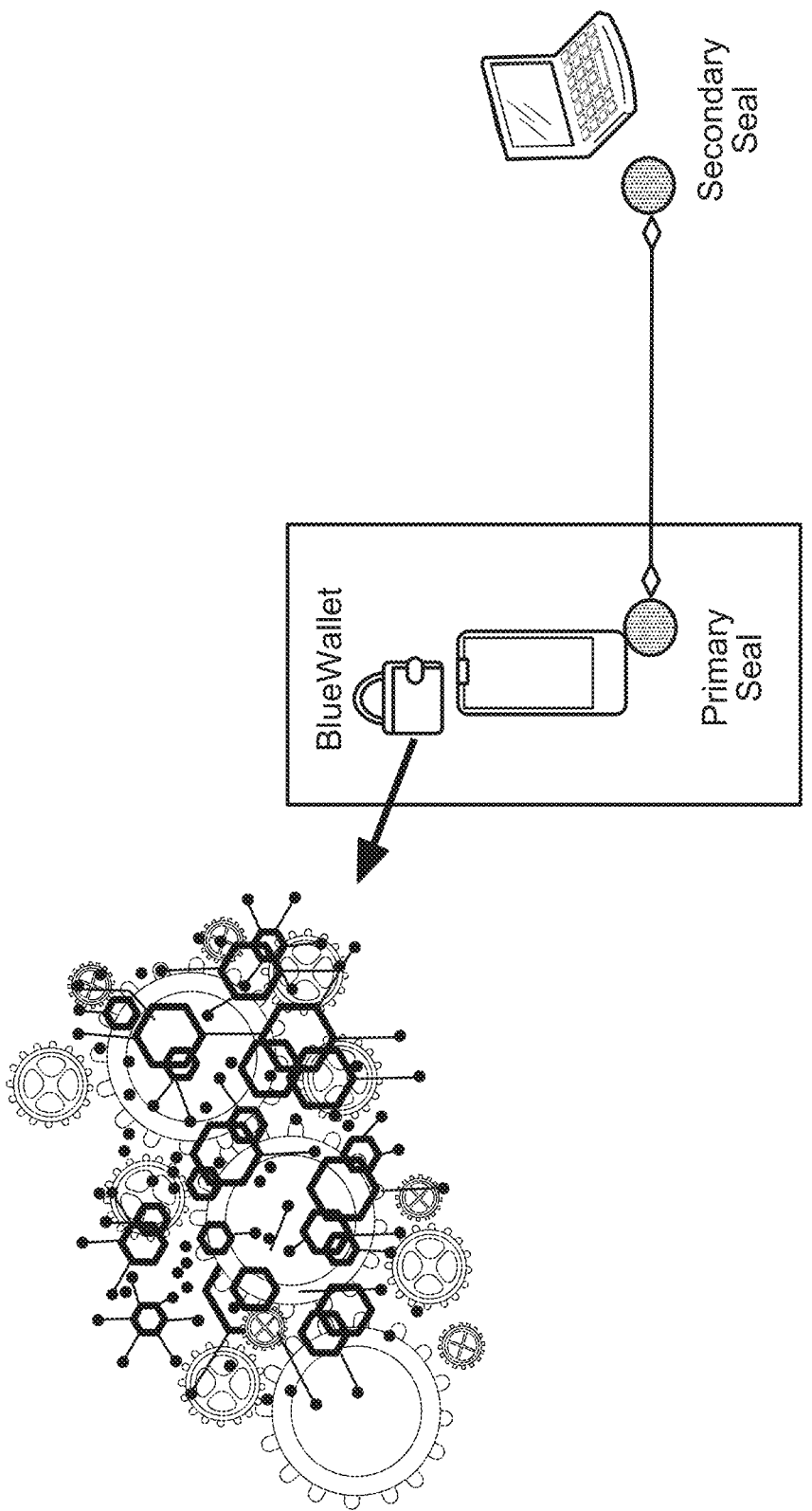

As shown in FIG. 19, the built-in air-gap between the wallet and the primary seal is not being utilized in this configuration. To adopt this configuration the user ought to rule out any concerns of malware or possible compromises on the mobile phone. The "Display Transaction Details" option is turned on by default on the Secondary Seal. You must apply the same validation of transaction details to both the BlueWallet and the Secondary Seal for similar reasons as described previously.

Counterseal under Ai-Fi Domain Security

Secondary Signer on Ai-Fi HomeServer

TBD.

The Primary and Secondary Signer/Seal

For comparison with the hardware wallets, you may jump to the threat model sections for a discussion.

There are several advantages in adopting the Ai-Fi Counterseal Wallet:

No single points of failure

Non-custodial, trustless and provable security based on open source software

The protection of the configuration data, if adopting the Ai-Fi Krypton Token mechanism, is of higher strength than the discrete logarithm problem in public-key cryptography while maintaining the usability of the proven MiniLock software ("File encryption software that does more with less.")

The secondary signer may be reached remotely through a dedicated TLS tunnel provided by the Ai-Fi environment.

Having one's own BITCOIN Full Node if the Ai-Fi HomeServer is adopted. The actual deployment of the counterseal scheme involves some tradeoffs:

The Primary Seal is hosted on your mobile phone. The APPLE iPhone is our top choice, with ANDROID from reputable vendors a close second. We believe the carefully implemented Sandboxing, the iOS and iPadOS keychain in the Secure Enclave, the system level key entry, and the approval process of the APPLE App Store are sufficiently strong to ward off almost all the malware on iPhone that are relevant to our wallet (even Norton, the security company, states " . . . thanks to APPLE's safety precautions, it is extremely rare . . . "). APPLE's attention to its security hardware is also fairly well recognized once its Secure Enclave Processor is "demystified." Some elementary precautions on owning the iPhone must be duly observed. A general understanding on the hacking risk on various device types may be found here.

Make sure the platform where the Primary Seal runs on is not "jailbroken" and is not managed through an Enterprise App Program that bypasses the rigorous APPLE App Store review.

The Secondary Seal is given the following options, each requiring specific software implementation:

Secondary seal on generic PC platforms

Secondary seal installed on a USB stick running live Linux TAILS

Secondary seal installed on a standalone Raspberry Pi 4 in the Ai-Fi environment, aka the HomeServer in the context of Ai-Fi Central.

Secondary seal installed on a tiny, portable, low-cost, dedicated device with LCD display that supports the secondary signer. There are many such DIY devices to choose from. The Raspberry Pi Zero W and the Orange Pi Zero LTS look attractive to us. (This is to avoid us becoming a suspect in the "Supply Chain Attack." We only offer the open source software that runs on it.)

These are examples of implementation platforms for the secondary signer, each having its specific vulnerabilities with malware being the primary concern. Clearly, the live Linux on a USB stick (TAILS) and the Raspberry Pi hardware (Ai-Fi HomeServer) are much less likely to contract malware. However, the built-in redundancy has substantially enhanced the secondary signer's tolerance for faults or attacks. Unless both the primary and secondary components are thoroughly compromised, the Zero Knowledge proof built into the Threshold Signature scheme would discover any attack incident and report/log accordingly.

For those secondary signers that have no attached display, a web server is typically built in so the secondary signer may be contacted through a browser interface, which helps in the initial pairing process (primarily the discovery of the secondary signer) and the connectivity reestablishment later on after pairing. All subsequent transactions between the primary and the secondary seals are conducted directly (authenticated and encrypted) and end-to-end.

We believe that the DIY route is the only way to bring you peace of mind. We recommend to all users of Ai-Fi Counterseal Wallet to create their own wallet in order to eliminate our reliance on any third parties. The production is not complicated once they understand the architecture diagrammed in the previous section. "In Open Source Software We Trust."

Note that both the primary and secondary seals may still be independently compromised regardless of how carefully they are managed. Nevertheless, the chance of success in hacking both seals individually at one time is extremely low, and less likely still where some attacks of physical nature are required if mobile devices are chosen to host both seals. We are in the opinion that this risk is lower than any other wallets on the market, be it software or hardware.

Connecting to a Full Node

TBD (Ai-Fi Central required)

Threat Model for the Rich and Paranoid

The Low Hanging Fruits

The biggest physical bank robbery, which took place in Brazil in 2005, was worth "only" $69.8 million. On the other hand, in 2019 alone criminals got away with $4.26 billion worth of digital coins, according to one report. None of the hacks have taken place on the blockchain itself. As far as thieves are concerned, exchanges are where the money is. Most low hanging fruits for hacking settle within popular exchanges and other commercial enterprises offering cryptocurrency services. Protecting one's crypto assets is an exercise of how not to trust or rely unnecessarily on any institutions. Incidentally, trusting no one is what motivated the original invention of Blockchain after all.

Adopting blockchain technology requires taking control of our own finances, which comes with specific responsibility and pitfalls. If we decide not to entangle ourselves with any custodial services, we must face the task of safekeeping our keys stored in our crypto wallets and their recovery seeds. Since seed recovery is less frequently applied, it has not been given sufficient attention by the blockchain industry, whereas the hardware wallets have gained a large following. It doesn't take much to recognize that hardware wallet manufactures are low hanging fruits for hacking. On the personal level, targeting individual hardware wallet devices, the "Evil Maid Attack" and "Supply Chain Attack" are well-known attacks. This is not to mention that the manufacturers need to be trusted not to attempt the "Supply Chain Attack" themselves, countering the "Trustless Principle" of the blockchain movement.

Tamper-Evident Hardware & Software

Some hardware wallets on the market tout Tamper Resistance or Tamper Proof guarantee. The detection of tampering would sometimes even trigger the self-destruction of the wallet.

Unfortunately, unlike open source software, most of that tamper-resistance design is not publicly disclosed. The track record of "tamper-evident technology" is nowhere close to perfection, which is well documented here, here, here and here. The title of the last and latest article on hardware vulnerability is titled "Intel SGX defeated yet again." Some would even go so far as to say that the risk of tampering is self-inflicted due to the reliance on a piece of hardware. This dependency on hardware is further aggravated by the fact that the cryptographic seed resides physically on the device itself. It is game over and all your crypto assets are forever lost if this single point of failure is compromised. A YouTuber "LiveOverflow" has dedicated a series of videos titled "Hardware Wallet Research" investigating this particular issue which we found illuminating and quite enjoyable to watch.

The never-ending news about Intel SGX hacking just had a new report: "Stick a fork in SGX, it's done: Intel's cloud-server security defeated by $30 chip and electrical shenanigans". One tends to believe that those relatively inexpensive hardware wallets on the market are based on much less rigorous designs than SGX.

Obviously, a software implementation does not remove the risk of hardware tampering, especially when the software is designed to run on public platforms (WINDOWS, Mac, Linux, iOS, ANDROID).

However, the vulnerability to hardware/software tampering in our Counterseal scheme is greatly reduced by requiring joint actions from multiple devices (at least two "factors," or multiple points of services) based on the tried and true redundancy principle. Most notably, the Threshold Signature scheme adopts the "zero knowledge" proof in verifying critical exchanged messages, which actually proves that a maliciously broken party will not gain any useful information for launching subsequent attacks past compromise or be able to evade detection for any failed attempts. The Threshold Signature scheme is one of those glorious achievements of technology such that adding additional components to a system actually enhances its overall reliability and fault tolerance. This is not even to mention that Ai-Fi Counterseal Wallet does not store its seed within the wallet itself, which is the weakest link in the hardware wallet operations.

Anatomy of an Electrum Wallet Attack

Aug. 31, 2020: "BITCOIN Holder Loses $16 Million in BTC to Well-Known Scam" Nov. 13, 2020: "Electrum Malware Scam Scalps $32,000 in BITCOIN"

It is hard to believe that the above two BITCOIN holders are victims of the same Malware scam. You can find out the details on their respective hacking reports. We just want to outline the defense mechanisms built into our Counterseal signature scheme. The attack scenario is fairly straightforward:

This documented attack involves a phishing exploit that injects malware to the platform where the soft Electrum wallet runs on under pretense of software upgrade. Once compromised, the Electrum wallet may be remotely controlled to generate BITCOIN transactions delivering coins to an attacker address.

The configured BITCOIN core nodes are modified and redirected to a malicious node, which eases the creation of the bogus transactions.

How is the Counterseal supposed to work in defending this effective attack?

The Electrum wallet in the context of Counterseal scheme is only able to "watch" the transactions initiated by users without possessing any private keys. All signatures must be provided in a separate Counterseal construct involving two components, the primary and secondary signers. The malware attacking the Electrum wallet is not able to independently initiate BITCOIN transactions.

There is an air gap between the Electrum wallet and the primary signer. The signature may not be procured without human intervention manually bridging the Electrum wallet and the signers.

The Counterseal primary signer is only a piece of software running on the mobile phone, which is hackable in theory. The same applies to the Counterseal secondary signer. However, it is astronomically harder in compromising all three components without being detected.

Optionally, the wall of Ai-Fi Krypton Token in the Ai-Fi Incognito Cloud may protect the Counterseal primary and secondary signer, which is nearly impossible to breach if all precautions are taken (once during its initialization).

It is worth mentioning that one crucial aspect of the attack requires the hackers being able to subvert victims from legitimate nodes to bad nodes controlled directly by the hackers themselves. The Counterseal users may adopt the HomeServer as the BITCOIN core node under the Ai-Fi Domain Security infrastructure, which effectively blocks this attack surface.

Notes

Counterseal: Historical Notes

A seal is traditionally used to close records by any type of fastening that must be broken before access can be obtained, producing an impression upon wax, wafer, or some other substance capable of being impressed. The "hot knife" attack is common, by cleanly delaminating the wax seal for mold casting and illegal reproduction. The use of the counterseal, displayed above, involving two separate stamps where a second stamp is imposed upon the reverse of a main or usually larger seal, is an effective means to prevent the obvious "hot knife" attack. Removal or incorrect application of any one of the two seals would invalidate the sealed record altogether.

The Ai-Fi Counterseal Wallet is a special "2 of 2" realization of the threshold signature technology, with the primary seal (signer) and the secondary seal belonging to the same owner or under the same administrative domain. The secondary signer is equipped with a screen to display the QR code for various interactions with the primary, which is a mobile app running on either the iOS or ANDROID phones. Both signing parties are on the same LAN (at least during the initial pairing rounds). The "pairing" of those two signers is established according to the principle of TOFU (Trust on First Use) by the primary scanning the pairing QR code displayed on the secondary signer if not already bound. After the successful completion of the pairing process the identities of both parties are mutually established, based on which a secure TLS channel may be constructed on demand between those two parties.

There are three steps involved in setting up a counterseal wallet (after the parties successfully bound to each other):

Secret Share Generation: Each signer independently generates its own sub-share (not private key) or segment for the aggregate counterseal assembly without revealing them to each other. All necessary data required for transaction signing are negotiated and synchronized during this phase.

All parties will know the resulting public keys but the private keys are never fully constructed or even required for signing. Only signature-related information is exchanged among the parties during subsequent rounds.

Secondary Signer Deployment: Once the involved parties are securely bound to each other and all key shares are integrated and synchronized, those two signing parties don't need to be online or connected until the signatures are required. We will discuss more on the placement of secondary signers.

Distributed Threshold Signing: Before the transaction initiation, the primary and the secondary signers need to reestablish their encrypted and authenticated counterseal channel. The crypto wallet (BlueWallet for the first release) would initiate the crypto transactions, which are formulated and passed around for partial signatures that are pieced together at the primary signer at the last stage of the signature round. Under normal network conditions, any incorrect move by either party would generate an alert/incident-report. The primary and secondary signers are only allowed to perform the signature without the ability to alter the transactions.

The crypto wallet (BlueWallet), the front end of the wallet, typically resides with the primary seal and operates effectively in watch-only mode, which relies on the backend Ai-Fi Counterseal Wallet (vault) for signatures exclusively. The interface between the crypto wallet and the primary signer follows the HWI standard.

Appendix III: A Bounty Program for PEX Tokens

General Program

If you have read the below mumble jumble previously and are only looking for the bounty program to try your luck again, go directly to the webpage here.

Introduction

Ai-Fi.net, as a service provider, offers a treasure trove of privacy-centric secure tools and solutions for its users. The demo/prototype release V. 2.0 includes some popular applications, the value of which is immediately recognizable, such as secure emails, password/notes manager, HomeCloud on your "personal" servers at home, remote desktop, photo upload/sync/backup, IoT device "deadbolt," etc. . . . The follow-on releases will offer many more useful functions that mobilize your private devices and already-paid-for on-ramp bandwidth in order for you to maximize self-sufficiency and to survive in the increasingly treacherous Internet environment. It helps you utilize the following defenses, some of which are often overlooked:

Portability: mobile devices, pads and PCs running personalized app

Ownership: home PCs, desktops, and intelligent devices, IoT appliances, personal servers, NAS server, etc., deployed at home behind the home NAT router Physical security and perimeter security In addition to take, full advantage of your network assets above, it also includes a few foundational utilities that are so revolutionary that some users consider them unproven and hesitate to adopt. The Ai-Fi Incognito Cloud is one of those offerings which are counter-intuitive at first, to say the least. How could a data file stored out in the open in the public cloud be private and secure?

We are here to offer a bug bounty program to demonstrate our confidence that the Ai-Fi Incognito Cloud is indeed private, secure, and much more protective than any BIT-COIN accounts on the public blockchain.

Functionality and UI

To indicate their singular characteristic as a protective and yet private file storage in the public cloud, we've coined the term "Krypton Tokens" in referring to them. They are no ordinary files in the cloud traditionally registered under a specific user account. They are "hidden in plain sight" and unidentifiable, by staying visible in a setting that masks their ownership without obvious ties to any user account. Actually, Ai-Fi is totally account-less, for that matter. It renders its services "over the counter" through on-the-spot cash/cryptocurrency payments without requiring accounts or tying to any PII (personally identifiable Information).

The actual function and user interface for Krypton Tokens are documented here. Simply put, a Krypton Tokens represents a blob of bits identifiable and decryptable only through their originating passphrase and the accompanying randomizing salt. It is so anonymized and fortified, Ai-Fi.net recommends applying it even in protecting the seed passphrases for your cryptocurrency wallets. That wallet "seeds" are the crypto equivalents of hot potatoes that can put a large sum of cryptocurrencies in jeopardy if not well cared for.

The Bug Bounty Program

The Program

This bug bounty program is quite straightforward. Discover the Portable Krypton Token we've placed into the Ai-Fi Incognito Cloud and decrypt its content to find the bug bounty of 10K Stellar Lumens. Within the offered Krypton Token file are the first 4 words of the 24-word passphrase for the stellar account containing that 10K XLMs.

Any individual successfully found and hacked the token can contact Ai-Fi, describe the hacking approach, render the Token ID from the original set of tokens, prove the possession of the corresponding private key, and claim the bug bounty. Ai-Fi.net will supply the rest of the 20 words so the bounty Stellar account can be accessed and awarded to the winner.

(Please see the fine print of caveats.)

The Proof of Existence

However, due to the inbuilt stealth nature of Krypton Tokens, there is no easy way for us to prove that we have actually created the token in the Ai-Fi Cloud, as the feedback for any attempt to discover the token ID is a simple yes or no, with the "no" response also including the case that there is no such file existing in the Ai-Fi Cloud.

To prove that Ai-Fi.net actually created the said file containing the keys for the bug bounty, we concocted a rather simple scheme (which actually weakens the strength of our Krypton Token, in the competitors' favor though.)

A list of Krypton Token IDs is published at the onset of the Bounty Program (Jun. 26, 2020) on the Ai-Fi.net web site. This list is signed and time-stamped to guarantee its authenticity. The number of this set of published tokens is about 65,536, or 16 bits of entropy, a lot less than the actual Ai-Fi Incognito Cloud. One of those tokens is the "solution token." The aim of the program is to be the first in discovering this solution token and decrypting its content. At the end of the competition or on reception of the "solution token," the successfully identified token will be published to prove its existence. It must have appeared in the originally published collection of token IDs. Anyone who has collected a copy of the original list may attest the existence of this solution toke before this bounty program is launched.

Note that some file names published in the initial list of the bug bounty program may not actually exist in the Ai-Fi Incognito Cloud. This actually works out in favor of the participants for the bug bounty program if taken as a helpful hint.

The bounty program runs continuously until someone wins the reward by discovering and cracking the "solution token." After the termination of the program, which hopefully leads to the repair of bugs or weaknesses discovered in the then current version of software, a new bounty program will be launched again in lockstep with a bigger reward as the effort required to crack the newer and stronger system also grows hopefully.

For a Limited Time Only

To further incentivize your participation, for a limited time only, we will generously chop off a few more entropy bits to ease the hacking effort of your participating in the Ai-Fi Bug Bounty program. We hereby publish the Krypton Token ID for the file that contains the bounty:

"GCTOCZYDJCQ5X5HNDUWLN5Y2YCEZEXRMST PFKMZMFYE56DDBY3ROJ3 04"

Hack, while we are at it, we will throw in the Token file content itself as well:

"LCJULTXEROPBNMZT5GKB35IGGE2H3SUL34DW S2UGLQSAJGPLI3GRZF2E7 ZANB6NCEWVUR4G2S AAQPWMQKUV322QCT7NLVJJMBTZAVG673YA43YF BF22GOLYNKPBKO2DAWN7E D2VVM76FFQTAS WXMCWJ5PYZZZGSRDVMPAXUPMC3BBTY24C EA===="

This token file contains the contact information and a PIN code for claiming your bounty if it is successfully cracked. It is what we store in our database in the Incognito Cloud verbatim. So don't bother to launch an attack on us. You already have all you need to do offline hacking.

A simple browser-based program is offered for your enjoyment of hacking for our bounty. The source code is published as well. Note that ordinarily the recommended access to the Ai-Fi Incognito Cloud is through the mobile app Ai-Fi Central, not through other platforms, especially not through the browsers that are just too public to secure. For winning the bounty, however, you actually do not need to do it online. It is much more efficient to just use the open source and launch the offline "attack" for discovering the private key to match the token ID as published above. Also, note that the final version of Krypton Token function will require a small fee to access, which is to ward off spamming or DDoS attacks.

The Design of the Bug Bounty Program

The Uncrackability of Krypton Tokens

There are two hurdles to overcome if a hacker is to crack a Krypton Token:

Discovering the name of the Krypton Token, which is generated from a passphrase plus the accompanied Entropy Salt, and hashed in a large number of iterations requiring tremendous memory resources.

Decrypt the content of the token, which requires the hacker to crack the corresponding private key and the encryption key.

In fact, if a hacker were capable of unraveling the challenge of item 2 above algorithmically, it would have shaken the technological foundation of all cryptocurrencies and exposed all BITCOIN accounts on the BITCOIN blockchain. The Ai-Fi Incognito Cloud manages to uplift the protection strength an extra-notch higher by hiding the file name, unlike BITCOINs of which their public IDs are on the blockchain. for example, a To target a user of Ai-Fi Incognito Cloud and to steal their token content, the hacker must first infiltrate the cloud firewall in order to obtain the list of all token files so offline attack can be conducted. To boost the interest in this bounty program, we have watered down the defense mechanism of Ai-Fi Krypton Tokens by voluntarily publishing the list of token IDs, which not only make offline attacks possible but also effectively reduces the entropy by a large amount, and more importantly, dismantles the network protection so the hacking can be launched offline in favor of the participants.

On top of our concession in giving up the online firewall protection, which enlarges the attack surface tremendously, the original entropy of the Portable Krypton Token scheme is still substantial and computationally infeasible to break (or the current foundation of all Blockchains crumbles into dust):

entropy(Passphrase)+entropy(salt)+entropy(file collection), at 248 bits with 100 bits of enforced entropy strength of the passphrase, 16 bytes of random salt and 1 million token files; or 244 bits of entropy with 64K token files as published for this bounty program.

Otherwise put, Ai-Fi Incognito Cloud is not going to be an attractive target for hacking. Considering its super simple function set, with the clients carrying all the heavy lifting, even DDoS is less of an issue with Ai-Fi Incognito Cloud. Collecting service payment when users request for Krypton services is another effective approach to ward off DDoS.

Caveats

The following conditions would disqualify the offending participant:

Although DDOS would not help anyone win the bug bounty, we will disqualify any participants purposely engaging in any DDOS attacks. After all, we have already published the list of most of the Token IDs at the outset.

Any actions based on "inside" information from people affiliated with Ai-Fi.net bug bounty program, professionally, privately or through unauthorized access, will immediately disqualify the perpetrator.

Appendix IV—Crypto Wallet

Many people think of BITCOIN wallets as the repository of BITCOINs. This mental image is inaccurate on many levels. In fact, there are no coins to be found in the wallet, only the "private keys" of coins are maintained within. More precisely, your BITCOIN wallet is merely a repository of copies of your "private keys," or "a wallet of private key copies". The BITCOINs themselves actually "live" on the blockchain, much as if those account balances in bank ledgers.

Any other copies of them, even existing outside of your wallet, would work just the same in accessing "your" BITCOINs when presented to the blockchain in BITCOIN "transactions." As the guardian of your own crypto assets, you are better off considering it as a "wallet of secrets" which you want to keep hidden from other people.

Blockchain technology is a powerful game-changer for the storage and transfer of value. The new economy enabled by this revolutionary technology could eliminate a large number of intermediaries and usher in fair, ethical, and more efficient organizations. However, before we are able to reach those lofty goals promised by this new technology, we are confronted with the mundane task of managing our cryptocurrencies and shopping for crypto wallets. We quickly discover that our notion about value, secret, coins, vault, wallet, transactions, privacy, etc. all need to be readjusted to cope with the challenges posed by this brave new world of cryptocurrencies.

Part II: Preserving Secrets
Part III: Ai-Fi Counterseal Wallet
Keeping Secrets
Safeguarding Safe Combination A secret is any piece of information that's intentionally hidden from others. Secret keeping is often built as a hierarchy. If a secret, such as your bank account password, is locked away in a safe, the safe combination becomes the "master secret" that is considered "stronger" and situated higher up on the pyramid for the purpose of protecting lesser secrets. As such, the combination to a safe is the best example of how the "top" personal secret is safeguarded.

Safeguarding Cryptocurrencies
The 2-Minute Learning Curve

Cryptocurrencies, such as BITCOIN, Ethereum, Tether, and XRP, are digital assets that apply strong cryptography to regulate the creation of crypto coins, to verify the transfer of coin ownership and to secure transaction records in a decentralized and trustless manner based on community consensus. The crypto investors have total control over their own transactions, which brings the cost savings and conveniences never before afforded to us in managing our financial assets. One of the bold visions of BITCOIN is a world where everyone could be their own bank. However, this pseudonymous, near instant and low-cost way of transacting one's assets comes at a huge personal cost.

The advantage of complete control over one's crypto affairs must be traded off against the lack of protection and little oversight from any governmental institutions. Our newly discovered financial freedom must be evaluated in its proper context:

Unbeknownst to the average crypto investors, this decentralized blockchain-based market exposes individuals to unprecedented financial perils without any safety net to mitigate the risk. In one fell swoop all the regulations and protection we've been paying taxes for are stripped away, replaced by those crypto wallets that we can educate ourselves in 2 minutes allegedly. A point of contrast on how much risk we expose ourselves To the liability for your consumer accounts at the banks or credit unions is capped at $50, provided the fraud is detected and reported in time, thanks to Regulation E, whereas the aftermath of a crypto attack could be catastrophic and total. There is no wonder why hacking of crypto assets has exploded into a crime syndicate of late.

Losses from cryptocurrency crime surged to $4.52 billion in 2019 alone. In the unfortunate event that the private keys of your BITCOINs are leaked or exposed, the attacker can steal all your coins remotely and tracelessly without much backlash. Managing one's cryptocurrencies is not for the faint of heart. It all boils down to the protection of your private keys for your crypto holdings. The ghastly imagery below is no longer the no. 1 nightmare that keeps us up at night, having been replaced by the nagging anxiety about the traceless, borderless, vague, but striking-at-any-time attacks on our crypto holdings.

The Custodian Options

Unsure about our ability in safeguarding our crypto assets, some of us fall back to the traditional approach and outsource the protection of their cryptocurrencies to some third-party custodian services like Coinbase, BitGo, Robinhood, Anchorage, Kingdom Trust, etc., by surrendering their private keys to their chosen custodians.

Unfortunately, setting aside the circular argument of entrusting one's trustless cryptocurrencies to third parties, we are not surprised that those custodian services quickly become the low hanging fruits for the swarm of hackers highly motivated to exploit this novelty in want of applicable defensive strategies in a regulatory vacuum. There is no shortage of usable attacks once those custodian services are marked as highly lucrative targets. They may leak your account data. They may be hacked themselves with collateral damages spilling over to their customers. Hackers hijacking your email account or even your text messages may steal your custodian accounts. Although the attempted "scary good" heist at Coinbase was detected and blocked in time before any funds were stolen, details of the attack reflect capabilities on par with those of nation-state-sponsored attackers costing between half a million and a million dollars to launch. Those reported cryptocurrency hackings on custodian services further confirm the adage, not your Keys, Not your Coins.

Some of the newer services, equipped with the latest technology such as Threshold Signature, may fare a bit better. In order to hack a user account protected by Threshold Signature technology, both the user and the service provider must be compromised in a coordinated way. However, most of the attacks listed above are exploits on vulnerabilities created exactly by this artificial need of keeping a relationship between the user and their service provider. There is no escape that some trust mechanism must be maintained between a user and those new third-party "financial services," which creates attack surfaces. (We will revisit this Threshold Signature technology later to see how it can be properly deployed for personal protection.) Dare Questions This report surveys the lay of the land and attempts to understand why there has been so little progress made in safeguarding our non-tangible digital secrets.

The newcomers in the Blockchain space must face the following "poof" challenges:

Your crypto wallet does not work the same as your bank passbook: The account balance of our crypto holdings is not maintained in our wallet or any bank ledger, but actually on the blockchain. Crypto wallet only stores copies of your private keys for retrieving the assets from the blockchain, not the actual "currencies." Even with the hardware wallet firmly held in your hand, you will never be sure of its net worth by staring at it.

Your crypto balance may go "poof" on you at any time: A casual peep or a single camera click over our private keys or recovery seed, either in text strings or mnemonics format, allows immediate access to our accounts on the blockchain. The assets guarded by the secrets can go poof on you instantly without a trace. How often should we check if it is "still there" on the blockchain? What is the modern counterpart of wax seal for forestalling silent attacks on coins?

There is no alarm substructure to counter the "Poof Effect": Currently the mechanism to forewarn the pending attacks on your crypto wallets is sorely missing. It is unclear how this need for early warning can be answered under the present public blockchain framework and the ad hoc nature of owning our cryptocurrencies through "wallets."

This "Poof Effect" has been exacerbated by the fact that the recovery seed is kept separately from its wallet, creating two attack vectors and doubling the "Poof Effect" as a result. All players in this space appear to have accepted this eventuality as part of the bargain for their newly acquired crypto independence. Hardware wallets have become the go-to solution that seemingly offers more comfort in this situation of total lack of physical access to our crypto holdings that exist only on the no-man's-land we call blockchain.

The Ai-Fi Counterseal Wallet, as will be detailed in Part II and III of this series, attempts to address these new challenges.

Threat Model

To figure out how our crypto holdings ought to be protected, we must first understand the nature of the beast. Although we are dealing with "digital assets" in the cryptocurrency market, similar to the digital fiat assets or the non-cash money, our exposure to risks and the crime prevention apparatus are radically different. We no longer deal with financial institutions through heavily regulated banking or investment accounts, but are confronted with the task of managing our private "ledgers" in terms of blockchain transactions and crypto trading accounts.

Minimally, we must understand how our crypto accounts may be maintained and protected without involving any third-party financial institutions. No amount of cryptographic power on one's computing devices or ability in publishing transactions on immutable ledgers would automatically offer an alternative safety net. Under the PKI (Public Key Infrastructure), the secrets mostly involve private keys of the PKI key pairs, which are the basic construct for conducting cryptographic key exchange or negotiation, producing crypto transaction signatures, authenticating the identity of the owner of the private keys, etc. Those private keys may be randomly generated, or derived through some algorithms based on the originating passwords. For ease of key derivation or administration in the crypto wallet application scenarios, a single "seed" secret or key may be utilized to derive a large number of the rest of the keys in the wallet through an algorithm. BIP 0032 is one such hierarchical key generation standard.

It is apparent that we are entering a brave new world of self-managed and decentralized markets of digital assets without the protective umbrella offered by various financial institutions we have been relying on traditionally. Regardless of how promising it may sound, for most of us this new reality is outside of our comfort zone. To find our way around it, we tend to relate those new crypto products and concepts to something we are accustomed to. However, this attempt so far seems to have only misled rather than illuminated. When we first ventured into this field, as an introduction, we are told to acquire a "wallet," which can be "soft" running on standard PCs or mobile devices, or "hard" if we want to safeguard it with some "stronger" purposely-designed hardware to fend off "attacks." Then there is the notion of "Recovery Seeds," which would save you from ruin if your crypto wallet was lost, stolen, or "compromised" by a plethora of devastating possibilities.

The description and naming of the concept of wallet and the recovery seed are largely inaccurate and problematic. Let's clarify. Crypto assets are intangible. They operate under the PKI (Public Key Infrastructure) framework. A crypto account for storing cryptocurrencies is protected by a key pair.

Although we use the word "key" to describe them, they are not to be confused with the hardware objects we often refer to in the context of locks and keys in the real world. A casual glimpse of the private keys will confer the ownership upon the viewer if they choose to act on it. They are best described as "secrets," the mere sighting or viewing of which steals or cancels them with the "Poof Effect" mentioned previously. We tend to use words like "wallet," "safe," "vault" to describe how we store our private keys or valuables, which forms the wrong mental imagery for our non-tangible secrets. Consequently, as will become increasingly clear, misinformed concepts beget incorrect actions.

However, unlike traditional pocket wallets for holding paper money, credit/debit cards, driver's license, etc., a crypto wallet holds nothing tangible but those private keys and interface code for you to interact with the external blockchain. On the other hand, the "Hardware Wallet" is not a crypto wallet as just described, but a separate storage on dedicated hardware that pries off private keys and other limited function sets from a regular crypto wallet for signing blockchain transactions. The hardware wallet is rarely stand-alone and almost always requires an external "soft wallet" or "bridge" (Trezor) for dealing with the blockchain and its consensus network, in which case that external "wallet" or bridge is described as "watch-only" (but not necessarily harmless). For fear of losing the secrets, they further create a "Recovery Seed," which is the passphrase/mnemonics based on which all secrets in the wallet may be reconstructed. So in addition to the need to secure your private keys in the wallet, you must also protect the recovery seeds as a necessary but separate task, which are usually "strongly suggested" to be kept in an unspecified safe place. This recovery seed effectively doubles the attack surface of the original wallet. It would be game over if either the hardware wallet was lost or the Recovery Seed compromised.

Protection of Secrets

A secret protection method is to preserve and protect certain undisclosed information, which is valuable only while not being revealed to unintended parties. The leaking of a secret will turn the secret into a non-secret and lead to irreparable damages which the secrecy is originally intended to prevent. Leaking a safe combination may cause the loss of the safe's content. Leaking one's password to a web service or computing device may lead to the loss of the digital content hidden behind the various application lock screens. Leaking the private keys within a BITCOIN wallet would potentially result in the theft of the BITCOINs.

Secrets and Lies

The concept behind crypto wallets is more akin to the magical Aladdin lamps, the "rubbing" of which with a PIN code or password would touch off the appearance of the Genie inside. A casual glimpse of the released secrets may cause them to lose their magic power (or internal crypto values) without altering the bits and bytes of your wallet contents. There is no way to tell whether a wallet retains its asset value or not by staring at its digital contents. The Genie might have gone while the lamp looks the same as always.

With this more accurate imagery of the magic Aladdin lamp and the fragile PIN code, it allows us to evaluate our protection strategies in a new light. The hardware wallets are preferably portable and kept around like our smartphones, given that the PIN is usually inadequate to ward off persistent offline attacks, especially when the throttling logic for PIN code fails. The owner is best not to leave the hardware wallet out of sight. The "Recovery Seed," when stored separately, needs the same tender care. To do it right, for those risk-averse individuals or those with substantial crypto holdings, the correct practice is to carry their hardware wallets in their pockets alongside with their recovery seeds.

To store those Recovery Seeds in offline cold storage is fundamentally flawed. To convince yourself of this point of concern, just picture your leaving behind your Aladdin lamp at home with feeble rubbing tricks (PIN) that would allow the flighty Genie to appear before its new master unfettered. To top it off, some users leave two lamps (the wallet and the Recovery Seed) both in the "secure" confines of their home, with the "Recovery Seed" usually recorded on a suggested "acid-free" paper or notebook barely protected. Worst of all, even with your hardware wallets in your pocket and the only copy of your Recovery Seeds on hand, there is no guarantee that your crypto assets remain where you have left them. The "Poof Effect" may set in at any time.

Attack Targeting

There are two types of attack: untargeted and targeted. Untargeted attacks are generally online-only, lacking specificity and costing little to launch. Targeted attacks are specific to identified targets or individuals, potentially involving special background investigation and even offline spy operations (theft, home invasion, etc.) on high-value marks. Targeted attacks naturally entail higher cost, to be justified by the higher potential return on investment. Untargeted attacks may be launched to discover vulnerable or high-value targets before progressing into a targeted one in the follow-on stages. Phishing attacks and password guessing have a much higher chance of success if the crosshair is squarely locked on the target, albeit at a higher cost.

Single Points of Failure

A single point of failure (SPOF) is a part of a system that, if failed, would endanger the entire system. SPOFs jeopardize the availability and reliability of any system, be it a business practice, software application, or other industrial system. It is a well-understood concept in reliability engineering.

Under the crypto wallet application scenarios, those keys in the wallet are protected by one of the following methods:

Software Wallet: This is the software that combines the PKI key materials with the crypto transaction signing functions into a single software package, which may run independently as an "app," or be embedded in a web page (web wallet).

Hardware Wallet: A crypto wallet may be separated into two parts: the software "front-end" wallet, which interfaces directly with the blockchain network, and a separate back-end "key vault," a custom hardware which hosts all the private keys and signs all the crypto transactions. Sometimes a hardware wallet may be built on a simple bootable device of USB or CD ROM with similar or weaker protection if incorrectly implemented.

Front-End Wallet: As mentioned above, due to the complexity of blockchain interfaces and crypto transactions, the Front-End wallet is the assembly of functions that deal with the blockchain networks. The open-sourced Electrum is one such wallet that supports BITCOIN. It may be made into a "watch only" wallet as a conduit for passing crypto transactions to external hardware wallets containing keys and operating independently.

In some cases, the Front-End wallet runs on the smartphone. The hardware wallet is embodied in a dedicated device (Trezor One shown here). The interface between the Front-End wallet and its hardware back-end may be through some wired (USB as shown) or wireless (e.g. Wi-Fi, Bluetooth) means, in which case a "pairing" step needs to take place before both wallets may interoperate with each other. It may also be "air-gapped", in which case the hardware wallet may be off the network altogether and the communication are conducted through some manual means such as copy-and-paste across devices, 2D barcodes or QR codes, etc., which reduces the attack surface but is by no means attack proof.

Presently all popular crypto wallets suffer a good many SPOF of one kind or another, defined as a vulnerability in a method which can be exploited to defeat the complete assembly of protection by focusing on attacking a single component, usually running on a single device. Once the targeted attackable component is breached, some or all secrets held and protected by the method may be revealed to the perpetrator in totality. After a SPOF of a crypto wallet was successfully exploited and some or all of the private keys are revealed, valuable cryptocurrencies stored inside the wallet could be instantly stolen. Some attacks don't result in the loss of secrets but inflicting a denial of service attack designed to hijack some resources (e.g. private keys) or make them unusable (e.g. by encrypting them) in order to effect a follow-on ransom demand.

The typical targets of attacks on crypto wallets are:

The password of the software wallet.

The PIN code of the software/hardware wallet.

The private keys stored in the wallet but exposed during transmission and/or during the operations for effecting a certain function set (transaction signing, status listing, outstanding balance display, etc.)

The recovery seed or passphrase, which is recorded outside of the wallet for recovery purposes. A successful attack on this recovery seed would spell the loss of all the private keys, hence the complete loss of the coins in the wallet. Although the recovery seed or passphrase may adopt certain external scheme to eliminate its single point of failure, such as the SSS (Shamir' Secret Sharing scheme) allowing splitting the seed into multiple "shares," it requires many more secrets to be hidden and substantially reduces the reliability of the whole method (combing the wallet with the SSS). Besides, storing a secret offline or offsite is inherently problematic, as there is generally no monitoring or auditing apparatus/method to guarantee its safety, as the loss event of a secret is usually not accompanied with a physically discernable symptom.

The wallet software or storage targeted by malware on infected platforms.

Attacks and Exploits

The following is a list of example attacks or exploit vectors on various components of a secret preserving method:

Invasion of malware (virus, worms, etc.) on the devices which host the software wallet.

Supply Chain Attack: If the wallet or part of it is acquired through a third, party, or even Amazon, the acquisition and/or delivery process may be compromised such that the authenticity of the wallet may be in doubt. Although this is mostly aimed at hardware wallets, this risk may be generalized to include any scenarios where a third-party provider is entrusted to supply or service the wallet. The question is how to confirm that the received hardware wallet is genuine and has not been tampered with. This turns out to be a rather difficult question to answer, as the holographic tamper evident labels are not even resistant to hair dryers and the firmware verification "directly" with the vendor is not as straightforward as it sounds. This is the hardware equivalent of "phishing attack." It is difficult to reliably establish a trust relationship with the vendors. This is again, where the circular practice of relying on third-party trust under a trustless infrastructure brings us trouble. Both Ledger and Trezor have their share of the attacks.

Attacks on the hardware wallet: This typically requires the physical possession of the device lasting for a period. It is a particularly dangerous vulnerability because it allows for consumer-grade attacks that theoretically anyone without any experience can perform simply by following a tutorial. Stories abound about easy hacking of the cold crypto wallets.

"Shoulder Surfing" attack: This is usually effected by spying on the user when they are entering the password of a software wallet (through) or the PIN code of a hardware wallet.

"Evil Maid" attacks, which is the attack by physically breaking into the storage where the hardware wallet is stored. This is usually coupled with the ensuing side channel attack and other hardware exploitation after getting hold of the hardware device.

"PIN code attack": This can be as simple as the "shoulder surfing" attack or through "evil maid attack" followed by a side channel attack, which is usually required to defeat the time constraints (e.g. number of retries) when entering the PIN. Note that the strength of PIN code is grossly weaker than the private keys even taking into consideration possible hardware support and needs to be strengthened in commensurate with what it is designed to protect.

"Man in the Middle" attacks aimed at the communication channel between the front-end wallet and the back-end hardware wallet: This may result in the loss of private keys or transaction signatures. It may also operate as ransomware.

The above is just a rough collection of possible attacks on computing devices and on those methods running over them. All methods are vulnerable to attacks. As are well recognized, methods running on dedicated hardware are not immune to attacks and exploits either. Architecturally, those methods with certain inherent SPOFs are most vulnerable, as attacks; concentrating on those, critical "single points of failure" can take down the entire assembly of the method by compromising just a single identified weakness. The cyber world has become an intense battlefield and "a scene of constant chaos" not unlike that of conventional warfare keenly observed by Napoleon 200 years ago. "The winner will be the one who controls that chaos." Any secret preserving methods must be judged based on how well they help bring resilience and adaptation into the unavoidable chaos in cyber warfare. By eliminating single points of failure, your standing on the chaotic scale is tremendously improved.

Note that an attack may take multiple steps, starting from attacking a single specific vulnerability. For instance, an attack may initially swap out the software or firmware in a device to an infected one that appears behaviorally identical as before but contains hidden reconnaissance logic so that follow-on attack may be launched based on the information newly and illegally collected. Any method running on a platform, perhaps based on popular operating systems, is easily attackable, regardless if it is on dedicated hardware or not. Any single point of failure quickly becomes the weakest link.

A method with no obvious single points of failure requires the attackers to compromise multiple vulnerabilities and to painstakingly synchronize those multiple attacks to break through the integrated defense, often across multiple computing platforms of different lineage, which is considerably more difficult to accomplish.

Scaling Out or Up

As cryptocurrency type multiples and users' crypto holdings grow, there is a need to expand the size and variety of their wallets. Many users purchase multiple hardware wallets for this reason. Unfortunately, this "scale out" approach of owning many hardware devices increases the complexity of protecting their crypto assets. Each hardware wallet has its own recovery seed and embedded secrets, not mentioning the numerous physical devices to be stored and maintained. People may prefer a "scale up" approach, hopefully with enough built-in redundancy to eliminate all SPOFs. A "scale up" and integrated approach would open up other possibilities, such as adopting different wallets for different crypto applications or integrity constraints such as maximal spending limit, white recipient list, account classification, etc. Due to the portability requirement, it is difficult to picture how this need to scale can be addressed by hardware. The approach suggested by Ai-Fi Counterseal Wallet is exactly one such software scale-out solution.

The Loss Event

A crypto wallet may be lost or become inaccessible due to theft, physical damage, malfunction, misplacement, and a sleuth of other reasons. Once becoming inaccessible, all crypto assets managed through the wallet are at risk. Although a PIN code is usually required to open the wallet, it is no secret that offline attacks are readily available and inexpensive in breaking it. Unless the wallet is hosted on a smartphone, hardware wallet vendors don't have the infrastructure for the "remote wipe" function. Once the loss event occurs and is somehow discovered, the only option is to fetch the recovery seed, rebuild the wallet from scratch, and transfer all your crypto assets to a new location. Recoverability is not an issue, except that it must be carried out before the lost wallet is breached if malfeasance is suspected, in which case it turns into a race in time. This is why the recovery seed looms large in the mind of wallet designers.

Although necessary, this curious design of placing the same set of secrets (private keys and recovery seed) in two separate and independent places has an unforeseen repercussion. It makes the hardware wallet design incompatible with the Secure Enclave or Secure Element architecture, at least conceptually. The SEP (Secure Enclave/Element Processor) design is grounded on the principle that the protected secrets are stored inside the SEP and isolated with a hardware filter so external applications cannot access them. They may be applied to perform various functions according to a rigid protocol or rules (e.g. thru "mailbox") but must not be retrieved or revealed. In the hardware wallet design, the need to create, maintain, and recover from an externally readable recovery seed renders the SEP architecture largely ineffective.

Audit Trails

As have been pointed out previously, your crypto assets in your wallets may disappear for any number of reasons. This is particularly insidious if your wallet design suffers some SPOF (Single Points of Failure). Any breaches on one of those SPOFs leave you absolutely no recourse.

On the other hand, a design exposing no SPOF would force the attackers to compromise at least two unrelated weaknesses before scoring any gains, which buys you valuable early warning time. This is why elimination of SPOF is all-critical to the protection of your crypto assets. This is also why a single hardware wallet by itself is by definition SPOF and therefore inherently risky. Besides eliminating all the SPOFs is only half of the story. There ought to be notifications or alarms in the first instance when your wallet was suspected of being under attack. Unfortunately, this second half of the defense after eradicating SPOF is sorely missing. In Part III of this series we will introduce the Counterseal Wallet audit trail which monitors all activities conducted on the wallets as an alarm mechanism.

Cryptocurrency Wallets
Software Wallets

Let's review why we feel so uneasy about storing our private keys in a "software" wallet, even when the software running on some platforms is much more up to date with the latest hardware technology.

A hardware wallet has its own dedicated environment, which is more difficult to exploit aside from the risk of "supply chain attack." A software wallet, on the other hand, running on a generic platform such as iPhone, ANDROID, MICROSOFT WINDOWS or APPLE Mac must share its operating environment with other applications that may be infected or malicious. The desktop or laptop is quite complicated and prone to exploits as the applications may be introduced to the platform without much quality assurance or safety guarantee. The smartphones such as iPhone or ANDROID phones and many tablets all have their own digital App Store as the distribution channels, developed and maintained by their respective platform vendors, which improves this situation considerably.

Assuming the wallet is implemented in software, there are two popular attack vectors where the wallet software is most vulnerable. Although they come in a variety of capabilities, capacities and form factors, their security models can be similarly outlined based on their respective architectures.

Applications run individually but share a well-defined set of functions with other applications (screen, GPS, phone, camera, sound, accelerometer, VPN, keypads, notification, etc.). The "Function Sharing" arrow indicates the interface between the applications and their intended functions. Sandbox, permission, capabilities, intents, etc. are all constructs on this layer for this sharing of application functions. On the lower half of the layered design, all applications, shared functions, and libraries access the foundational kernel services at the arrow of "Kernel Resource Sharing," notably for sharing virtual memory, caches, network buffers, files, and disks. Under typical threat models, most of the attack surfaces situate at these two layers. For instance, keylogger takes advantage of Function Sharing (through the accessibility suite on ANDROID, not so common on iOS). Stealing data and private keys across virtual memory is possible over the Kernel Resource Sharing layer. The usable data need not be raw data from the virtual memory; it may take the form of shared-memory side channel attack directly accessible from certain proc files. The reported ingenious "UI State Inference" attack combining a sneak peek at the shared memory with a follow-up phishing display is well explained by its discoverers. Fortunately, this attack requires the display of a fake screen and immediately transmits the stolen keystrokes to an external accomplice. The attack is often obvious to spot, as the fake phishing screen would cause the screen to glitch when the real application displays the real and largely same screen. This forces the attacker to hasten the use of the stolen keys immediately before the user notices the unusual glitches and launches counter actions. The attack surface would be greatly reduced if an audit trail were available to trigger the generation of a new set of key materials.

The protection for this architectural sharing of the system functions is rigorously enforced by the platform itself, not unlike the situation of a jail where all prisons are monitored and controlled by the enforcer, namely the operating system. There are ways to break the rules of the operating system by "jailbreaking" it. Once broken, all rules and regulations are no longer faithfully enforced.

There are two other means of violating the enforcement of the resource sharing segregation rules:

MDM

Parental Control by installing various kinds of applications with severe influence on all running applications.

A software wallet needs to run independently and securely on a shared platform without undue influence by other elements sharing the same platform. To protect one's crypto assets, the software wallet must depend on the platform for reliability and predictability, and the users themselves must make sure it is not jailbroken, not under MDM, and not allowing unrecognized applications sharing the same function set. Unfortunately, this privacy and security guarantee oftentimes is beyond the grasp of many crypto owners. Consciously keeping up with all the software updates on the involved platform takes a bit of effort.

The recent head butting between Facebook and APPLE over the ATT (App Tracking Transparency) issues is welcome news for those who want the built-in sandboxing more forcibly administered. In theory, there is little difference between a hardware wallet and a signed mobile wallet application running in a leak-proof sandbox under the App Tracking Transparency framework.

Hardware Wallets
Secure Enclave

Protection schemes based on Secure Element/enclave are old technology. They typically involve a secure crypto processor, which is a dedicated SOC (System on a Chip) for carrying out cryptographic operations, embedded in a packaging with multiple built-in isolation measures. The keys or secrets required by the defined cryptographic functions are physically implanted or locked within the device, usable through carefully designed interfaces or protocols but not retrievable or copyable from the device.

The interfaces for entering into the SEP are meticulously guarded on the input side but allow liberal access on the output side for reaching the main processor resources. The most critical aspect of this design is to rigorously guard those keys or secrets stored within the SEP, typically enclosed in a tamper resistant packaging.

The STM32/ST31 (Ledger Nano S) design is a cost-reduction design, in contrast with the sophisticated APPLE SEP, with STM32 as the main processor and ST31 the low cost "SEP" which relies on STM32 for many crucial functions such as keypad input, output display and shared access to off-chip ROM/RAM. This "proxy" design has many serious defects. For instance, what is displayed on the device through STM32 is not necessarily what is produced or recognized by the SEP. The SEP may sign a crypto transaction of 100 BITCOINs, which is being displayed only as 2 for instance, an easy and standard phishing trick. The newer STM32/ST33 (Ledger Nano X) design has corrected a few defects of its predecessor, such as the IO of the ST33 which is now controlled directly by the secure element.

As it turns out, the adoption of a secure element in the hardware wallet design is also ill conceived. The most problematic requirement assumed by all hardware wallet designs is the common belief that any crypto wallet must provide the Recovery Seed to users explicitly in order to salvage the wallet when it is lost, damaged, or stolen. Unfortunately, once the device allows the Recovery Seed to be retrieved and fed back to the wallet holder, the SEP design falls apart. If the secret or private keys are retrievable or directly reproducible from the device itself, there seems to be no reason to invoke the complexity of the SEP design at all. Recoverable SEP design is an oxymoron without gaining many functions. All the documented offline hackings on SEP-based hardware wallets stem from this design defect directly or indirectly. This is probably why the newer designs from popular vendors no longer rely on those SEP elements.

Since those SEPs on iPhone and ANDROID, phones are correctly designed and, therefore, the retrieval of recovery seed is not part of the bargain. This is probably why there hasn't been a decent wallet design using those correctly implemented SEPs on iPhone and ANDROID phones, due to this lack of retrievability of the Recovery Seed.

Passphrases
Protection thru Passphrases

By now the uneasy thought niggling at the back of your mind all along might have taken root. Secrets are virtual, intangible, and inherently precarious when committing them to any hardware or software, be it cloud storage, encrypted files or those fancy secure enclaves. They are intensely individualistic and ought to remain as something best not to be outsourced. They are fundamentally cerebral or psychical. Forcing them onto any software or hardware apparatus is usually a compromise or dicey preposition.

Attacks on hardware and software wallets are remarkably commonplace. There is no reason to expect them to stop anytime soon. The original excitement around Secure Element/Enclave has all but dissipated, mostly due to the fundamental incompatibility between keeping all private keys in the Enclave and the unavoidable requirement to export the Recovery Seed from the Enclave that unfortunately violates the central tenet of the Secure Element/Enclave.

The dominating hardware wallet vendors Trezor and Ledger both recognize the fact "no hardware is 100% safe", not to mention other critical benefits obtainable only through software means such as flexibility, deployability, redundancy, consensus building and elimination of SPOF (Single Points Of Failure). The suggested remedy is to introduce the concept of passphrase as quoted above. Instead of blindly trusting the hardware, with or without involving the instrumentation of Secure Element/Enclave, the passphrases allow the users to protect their secrets by creating, remembering, and filling in a phrase privately and secretly to lock in their private keys. Once stripped of the illusion of Secure Element/Enclave, there is no reason to run the wallet on a piece of dedicated hardware at all. The construct of passphrases appears to match the concept of secret more cogently.

The hardware vendors suggest combining user passphrases with the base Recovery Seed in order to add an additional factor in protecting the new improved Recovery Seed. This scheme pretty much makes the SEP irrelevant. A clean environment (such as a "live" Linux) coupled with passphrases, sans SEP, would suffice.

The second part of this series describes a highly effective secret preserving construct, the Ai-Fi Crypton, which challenges the simplistic concept of wallets, recovery seeds, and issues regarding their protection. It appears that there is no escape from maintaining our own critical secrets ourselves. This conclusion is comically tautological. Some people have unrealistic expectations on the possibility of biometrics in safekeeping our secrets, which is applicable only to the outsourcing arrangement. Fortunately, it doesn't take much to strengthen our memorization skill, which is a lost art and some simple mental exercise will quickly recover it.

Appendix V—Ai-Fi Security Practices

Ai-Fi.net is designed to protect your cyber identity and digital assets. The tools and utilities under the Ai-Fi security architecture implements the following:

Various on-device "safes", including:

The DigiVault within the app, with similar functions as those popular password managers.

The synced data stores on the HomeServer, including your photos and videos uploaded to it All the data and devices to support the Ai-Fi Domain Security for safeguarding the domain perimeter and various IoT devices housed within it, including the ACLs (Access Control Lists) maintained on various devices.

Digital safes containing secrets protected by the Super-Locks, either through the Multi-Share Secret Distribution (Shamir's Secret Sharing) or the Cryptons in the Ai-Fi Incognito Cloud. They provide Ai-Fi Domain security taking advantage of your private devices and resources, and accessing the anonymous/pseudonymous storages in the Ai-Fi Incognito Cloud, which are popularly adopted to protect many different kinds of recovery seeds for a variety of cryptocurrencies.

The Ai-Fi Wallet in Ai-Fi Central, containing:

All the DiD (Decentralized Identifiers) for pseudonymity guarantee in various use cases, protected by the proven Public Key Cryptography.

All your Ai-Fi SecureEmail and their decryption keys, and importantly the ownership of your email addresses, a critical digital asset, through a blockchain based Ai-Fi Root Registry.

3 above is the foundational privacy and protection implements built into Ai-Fi, based on which those "safes" in 2 are constructed. The functions provided in 2, the SuperLocks, offer the linkage between the Ai-Fi Central and the Ai-Fi Incognito Cloud, which allows anonymous access to independent safes hosted in the cloud, accessible only through strong cryptographic keys.

The centerpiece of the Ai-Fi protection architecture is the mobile app Ai-Fi Central that provides the interface to the Ai-Fi security infrastructure. Three things guard its safety: the smartphone's inbuilt passcode/touch-id, an additional second passcode required when entering into the app, and the physical security through your possession of the phone. This protection through Ai-Fi Central is foolproof for all intents and purposes as long as you are in possession of your smartphone. In the unfortunate event of losing your phone, your Ai-Fi data may be "wiped" along with all other mobile data on your phone. Your data won't end up in the wrong hands as long as the "wipe" is triggered in time. After the wipe, all your Ai-Fi assets are still recoverable by fetching and applying your Ai-Fi recovery passphrase for your Ai-Fi Wallet saved at the initial installation of Ai-Fi Central. (APPLE iCloud would take care of the rest if you were on an iPhone, in which case you need to submit your iCloud password to enter.)

There obviously exists a window of vulnerability between the time of losing your phone and the time it is wiped and later on its content recovered, depending heavily on the strength of your Touch ID, Face ID, passcodes, or passwords. This window may be unacceptably long, especially when the loss event is the consequence of a "targeted" attack that swiftly turns off the power before taking the phone to an attack lab for offline analysis. Your Ai-Fi Central app remains vulnerable until the app is "recovered" by the original recovery passphrase and then "rekeyed" to disable or invalidate previous DigiVault and key stores.

For the rich and paranoid who are not comfortable with putting all eggs in one device, Ai-Fi offers another protection mechanism based on the latest Threshold Signature technology that fights off this "Single Basket Attack" by making use of redundant components, which involves two independent crypto transaction signers.

Passcodes and Private Keys

Not many of us are fans of the classic login/password scheme. Fortunately, underlying all the Ai-Fi protection mechanisms is the application of PKI (Public Key Infrastructure) at a strength level comparable or stronger than that protecting all the cryptocurrencies and BITCOINs in particular, achieving the pseudonymity at the same time. This lifts us out of the stone age of passwords. It also works smoothly with and in complement to any multi-factor authentication schemes.

Modem protection scheme of one's digital assets based on Public Key Cryptography is considered foolproof. The success of BITCOIN and other cryptocurrencies are directly accredited to this technology. Clearly, its effectiveness hinges on the practice of safeguarding our private keys. Even though considered stronger than passwords, private keys must be physically recorded since they are too long to memorize.

In the case of cryptocurrency wallet, the ingenious scheme of condensing all the keys under a deterministic hierarchy (BIP-0032) compresses all the private keys to a single "mnemonic seed", with or without additional passphrase, for recovery, which is usually in 12 or 24 words and is still beyond the grasp of our memory. This mnemonic seed, therefore, also creates a "hot potato" issue, outside the wallet protection schemes. Most of the apparatus on the market for "saving" them are not much more than a "paper vault." (Shamir's Secret Sharing is adopted sometimes if its complexity is considered tolerable relative to the asset values to be protected.)

For those critical "hot potato" long private keys or seed phrases, Ai-Fi.net offers a user-friendly secret locking scheme of comparable (or stronger) cryptographic strength as those private keys. This secret locking "Crypton" scheme is based on the combination of strong "passphrases" of sufficient entropy and client-side "Entropy Extender," mechanically similar to the traditional "salt."

The Crypton names don't need to conform to Bitcoin or Stellar addresses. If SHA26 (like in Bitcoin) is employed, it generates 256-bit or 64-byte hash, sufficient to contain any key space of less than 64 bytes. This is more than sufficient for PEX, in various embodiments.

Password Management

Self-Reliance

As practitioners of various Ai-Fi Security tools, some of us at Ai-Fi.net have gradually developed a personal approach towards the protection of a large number of passwords collected during the long stretch of time as we surf the web, connect to various Internet services, and deal in various crypto currencies. Instead of relying on some third-party password management services, we are of the opinion that for privacy protection and warrant-proof guarantees self-reliance is the best policy by taking advantage of the Ai-Fi protection without involving account-based third-party service providers. We believe that Ai-Fi has developed a solid foundation for achieving the goal of self-sufficiency. However, this is not to preclude the adoption of those password management cloud services if we are clear on what we are getting into. The application of Ai-Fi password protection requires slightly more care, as privacy and security often do and demand more on our part.

Passwords as Digital Assets

The objective is to protect the following common categories of digital assets:

All the websites we've visited and signed up for an account.

Other non-browsing sites or software packages requiring login, such as Ssh, skype, IM, various mobile apps, etc.

The recovery seeds of various crypto wallets we own, including the Ai-Fi Wallet in which we store our diD (Decentralized Identifiers). We could always write them down and figure out a place to safekeep them. Alternatively, we recommend storing them as the Cryptons.

The PIN codes of our smartphones or hardware wallets.

The first category is where most of the password managers focus on with the Autofill option. Since one's passwords are stored and automatically filled when needed, it is a good idea to also delegate to those password managers to suggest strong passwords to avoid trivial weaknesses.

For applications in category 2, most password managers don't offer much since there is no standard to go by in identifying the password data entry in order to automatically enter the appropriate passwords. The best those utilities can offer is just a repository for password record keeping. Our Ai-Fi Central has DigiVault embedded in our mobile app as a handy repository for this category.

Category 3 is important if one dabbles in cryptocurrencies. The recovery seeds described above are highly critical to our financial security, especially those of us who don't want to outsource the care of our cryptocurrencies to third-party escrow services. This is one of those "hot potato" issues when "paper vault" is simply too risky and outsourcing them to some third-party password manager services is unacceptable. Otherwise put, this category helps protect all those items in the "paper vault", such as the master password for your password managers. This write-up is to document our strategy in safekeeping all these four categories of digital assets by applying those foundational services we have built into Ai-Fi Central and leveraging a few public and free password managers:

Cryptons offered by the Ai-Fi Incognito Cloud. This safekeeping tool has the comparable strength as the private keys of your BITCOIN account.

SuperLock, especially the multi-share secret distribution based on the classical Shamir's Secret Sharing.

"Autofill" utilities such as those built into Google Chrome or iOS, with comparable and competitive features with most of the password managers.

Non-web account passwords.

1 and 2 above are supported primarily through the Ai-Fi Central mobile app.

Please follow their respective documentation for details on Ai-Fi Cryptons and SuperLock.

Hierarchy of Passwords

Organizing Passwords

Lacking a methodology and giving enough rope, we inevitably hang ourselves with the self-inflicted chaos owing to the undisciplined hoarding of large amounts of passwords.

To get out of this mess, we'd recommend keeping around only a couple of strong "master" passwords and derive the rest by combining them or leveraging other utilities such as Ai-Fi DigiVault. We'd suggest the use of those "master" passwords to unlock the recovery seed for your Ai-Fi Wallet in your Ai-Fi Central app or your Cryptons in the Incognito Cloud managed independently from your Ai-Fi Central app, and derive other secondary passwords from those primary repositories.

This is an effective scheme to organize our passwords and made popular by many password managers on the market. We simply push this method one-step further so our users don't need to rely on any third-party service providers (and the hazards entailed) with all the conveniences to boot. The Ai-Fi framework is itself a self-managed password manager.

Most of us are comfortable in outsourcing those secondary ones to some "Autofill" utilities offered by Google or APPLE and just make sure we maintain safely the password for logging into those services. They are effective password managers if the risk of exposing your passwords to the providers is manageable. Keep in mind that it is probably unlikely for Google or APPLE to engage in any active attacks on individual accounts unless they are compelled to do so by state actors. This is especially true for Google after its embarrassing account breach in 2018. For banking or financial websites, this leverage of the "Autofill" tool is recommended only if those banks and financial institutions offer 2-factor authentication so your accounts may be tied to your other email accounts or mobile phones, in addition to the auto-filled password protection. Obviously, this second factor must not be part of the same "Autofill provider" in order to rule out the providers as a potential threat/vulnerability. This applies to all other non-financial sites deemed critical enough to warrant multi-factor protection.

For those adopting Google Chrome browser as the "password manager", make sure your Google account password is changed to a new password of proven strength and embrace all the security mechanisms offered by Google, including all their security schemes involving your cell, additional email address, Google Authenticator, etc. for multi-factor protection, regardless if your email address showing up in the famous "; —have i been pwned?" site or not. In the case of your email previously "pwned," you may want to sign up for a new email account in order to be severed from all the possible PII and metadata exposures due to previous breaches. With the Autofill feature, there is no reason not to adopt a very strong password.

If one takes advantage of those "Autofill" utilities or password managers built into a computing platform (e.g. APPLE iOS) or embedded within the browser, there is little need to sign up for any cloud services to manage your passwords.

Composition of Passwords

One common issue of utilizing passwords is the memory lapse frequently inflicted upon us in the effort of memorizing our passwords. There should only be a small number of passwords to commit to memory. Keeping those passwords organized could go a long way. Our suggestion is to organize them hierarchically.

Sometimes we forget some passwords due to their infrequent use. This issue may be alleviated by taking advantage of the fact that the longer the password, if created intelligently, the stronger the protection. There is no reason to create all kinds of long ones just to make them stronger, at the risk of memory lapse. We could create password subcomponents of sufficient strength for their use cases, and create a long one for more crucial applications by piecing several together.

For ease of recall, structure our passwords as phrases of multiple words that are easy to remember. Most decent websites now allow the entering of blanks for structuring your password as phrases.

This will become clear in the examples below.

Example

The most frequently used password (P1): For most of us IT guys, we enter passwords into our PC platforms or handheld devices numerous times a day. Make sure you use a strong but short and sweet one for this purpose. Instead of adopting characters of uniform cases, try something like "Wi-Fi.net" with upper/lower cases, "-" and.", which beef up the strength significantly. Use a password strength meter. Make sure you take advantage of phrases or sentences, not just character sequences. When the password field doesn't accept blanks, relegate it to lower tiers. A service site doesn't accept blanks in its password entry field; it's not a security-conscious site. If you are the mobile phone types, make sure to strengthen your passcode to more than 4 to 6 numbers. Search this "Passcode Option" under iOS for instance.

A good percentage of us rely on their smartphones almost exclusively without signing into a desktop or notebook anymore. In this case, there aren't many opportunities for us to practice the memorization of our passphrase. One suggestion is to make sure we turn on a longer password (Custom Alphanumeric Code in iPhone). Instead of just using 4-digit or 6-digit code, adopt the "Custom Alphanumeric Code" and make it stronger enough to implement what has been suggested in 1 above. Make sure you fully understand the risk entailed if this practice is not followed.

The second most frequently used password (P2): This is required for those "Autofill" utilities such as Google Chrome or iOS as part of the account set up. Unfortunately, Google for one frequently offers the "Auto Sign-in" convenience allowing automatic login on the same platform and application without forcing the password entry every time. This is OK for Google apps, as those passwords are usually resettable to a new password when lost (but the original password is not recoverable). This is something we don't usually need to memorize as long as there is a remedy as part of the 2-factor (and other security questionnaires). The consequence is that we don't get to practice our password memorization. However, at least in the case of Gmail, even when one is unable to recall their Sign-in password, one can log out of the gmail, get back in again by selecting the Google account email (the one for the "website" myaccount-.google.com, and allow the gmail Autofill the password so we can get back our original password.

Use the concatenation of P1 and P2, optionally adding a salt as passphrases, for your most crucial password application. The salt can be written down, as long as P1 and P2 combined are sufficiently strong and not easily forgotten.

P1 is something we are all very familiar with and entered into our desktop or laptop multiple times a day if the screen timeout is configured for power and security.

P2 is easily retrieved, especially when the "Autofill" and the "Auto Sign-in" utilities offer a sync option over multiple devices through the network. Many of us take advantage of what Google offers through Chrome browser.

The "salt" adds additional entropy against online hacking if not exposed. It may also be comfortably written down and kept in a drawer. For this reason, we call it "Entropy Extender."

A Password Strategy for Practitioners

The following is an example strategy for safekeeping your passwords:

Create the password P1 of sufficient strength based on the password evaluator. Preferably, see all "guess times" as "centuries." Your daily work hours offer ample opportunities for you to exercise this important P1.

Browse with Chrome. Use it as a password manager for website visits that require sign-in. Create a strong password as P2 and make sure it is being exercised at least once daily (by turning off "Auto Sign-in") or by taking advantage of the "Autofill" function during re-sign-in after signing out.

For your cryptocurrencies, if not outsourced to an escrow service, concatenate P1, P2, and the "Entropy Extender" into a new password phrase. In the context of Ai-Fi.net, apply this as the Crypton key for recovering the wallet "recovery/seed passphrase." In the event of wallet loss, all the database content, including the DigiVault, email encryption keys, SuperLocks, and other data, can be recovered.

For other non-web applications or standalone apps, use the DigiVault offered by Ai-Fi Central. The wallet and other digital assets in the Ai-Fi Central app are recoverable as described above.

The P1 above takes centuries to crack if attacked offline without throttling. P2 is entered and protected by Google cloud. Although both are used daily on WINDOWS 10 platform in our example, their compromise is still a possibility. However, the combination of P1, P2, and extra Entropy Extender thrown into the mix at the creation of the Ai-Fi Crypton appears indestructible.

In summary, to ward off identity theft, design an indestructible seed/recovery passphrase, memorize it, supplement it with an Autofill tools like iPhone or Google Chrome for web accounts, use 2-factor for critical (bank or any sites involving money) accounts, and diligently record all your non-web passwords in the Ai-Fi DigiVault.

Password Strength Meter

Principle of Password Cracking

The principle behind all password or passphrase cracking is quite straightforward. The first step is to collect all the raw or base materials, namely those which have been cracked in the past. Before we start to be a bit more defensive about the attacks on our passwords, we tend to use a few that we feel comfortable with without giving much thought to them. They tend to be short and easy to memorize, created based on some naive notion of their "strength," most of which are wrong and misleading, including those originally suggested by NIST. At the same time, a large number of web services are quite negligent in handling our passwords we've trusted to their care. We rarely get any compensation other than some "apologies" from those service providers after password breaches. This casual attitude on both sides has led to an ungodly amount of our passwords cracked or stolen by hackers and available openly for anyone to collect for a nominal fee. You will not be surprised to find your precious few passwords recorded as "pwned" by visiting the "Have I been Pwned" site. Those pwned passwords are numbered in the tens of billions.

After getting their hands on those pwned passwords, the hacking steps are simply to try the collection one by one, applying some known "rulesets" with each entry (e.g. capitalizing the first letter, replacing "o" with "0", suffixing some number of digits, etc.). If Amazon AWS is hired for this cracking effort, the number of stolen passwords to try per second can be roughly calculated as 1-billion entries at the cost of $1.

Other than those pwned base words, all known publications including dictionaries, bibles, journals, newspapers, Kindle books, and famous quotes have all been collected to form part of the base words arranged in projected frequency of use.

The password cracking is a shortcut to explore the immense (search) space of possible passwords. The approach above is for untargeted attacks, where there is no known person or target to aim at. However, if we have a specific target in mind, some simple but efficient approach can be designed by collecting the target's name, nickname, phone #, DOB, name of family members, their employer's web site, whitepapers, manuals, vocation specific technical vocabulary, neighborhood specific maps, etc. For us network security practitioners, we have difficulty getting away from words like protocol, protects, privacy, ai-fi, etc. As a consequence, the following guideline is quite difficult to follow:

Known only to you

Long enough to be secure

Hard to guess—even by someone who knows you well

Easy for you to remember

Easy for you to type accurately

An obvious alternative is to adopt Diceware at the expense of ease of memorization. It uses ordinary dice to select words at random from a special list called the Diceware Word List. The random selection of words breaks free from the classical cracking schemes described previously which relies on customary and predictable patterns of password selections to pare down the search space. Note that our Entropy Extender provides one such random string allowing arbitrary length, which may be written down in a notebook, safely protected by our password.

Zxcvbn and Password Meters

There are numerous password strength testers on the web. Some of those are suspected to be rogue password collectors, so take precaution when testing out there. Our recommendation is the well-known password evaluator zxcvbn site, backed by a technical paper and YouTube presentation with Dropbox behind them. The nice thing about this tester is that it gives critique after the test pointing out the weakness of your passwords.

Zxcvbn gives test results based on different attack scenarios. The online attacks apply to our typical sign-in with passwords, which is mostly "throttled" to limit your number of tries per unit time. The offline attacks apply to scenarios when your computing devices were stolen or fell in the hands of attackers, including the many situations when the service providers are compromised that renders the throttling useless.

After playing around with this tester for a while, a few rules seem to emerge. Length is all-critical with a minimum of 12 characters, all else doesn't have a prayer, as echoed in this MICROSOFT report.

| Password Length | Possible Permutations | Time in seconds | Time in minutes | Time in hours | Time in days |
|---|---|---|---|---|---|
| 6 | 782,757,789,696 | 8 | 0.13 | 0.002 | 0.00009 |
| 7 | 75,144,747,810,816 | 751 | 12.52 | 0.21 | 0.01 |
| 8 | 7,213,895,789,838,340 | 72,139 | 1,202.32 | 20.04 | 0.83 |
| 9 | 692,533,995,824,480,000 | 6,925,340 | 115,422.33 | 1,923.71 | 80.15 |
| 10 | 66,403,263,599,150,100,000 | 664,832,636 | 11,086,543.93 | 184,675.73 | 7,654.82 |

We have collected a few pointers from playing around this utility. Sprinkle funny characters and vary letter cases liberally. Repeating or predictable patterns are not effective means of lengthening. A phrase with multiple words separated by blanks works well to achieve long password by utilizing a narrative or storytelling. For example, "This is my master password part 1" (literally) gets "centuries" in all four categories in the zxcvbn tester. Obviously, the suggested practice of "This is my master password part 1"+"This is my master password part 2" will take at least "centuriesxcenturies" to crack.

You will find it rewarding to play around with the passphrases/passwords easy for you to memorize and then try to simplify it but maintain the same strength. For instance, "Ai-Fi.net protects my privacy" may be simplified to "aifinet protects my privacy" but much easier to type in. In anticipation of "Ai-Fi" becoming a household name and targeted attacks, we adopt zifinet instead.

"Google protects my privacy": This oxymoron has the same strength as the one above. The length of the phrase is all critical. There is no funny letters or anything requiring the "shift" key appearing in it, easy on the fingers. "zifinet protects my privacy google protects my privacy" is long winded and with repeating words, however, it is easy to memorize and gets "Centuries" score on all four categories by the zxcvbn evaluator.

both the "one two three four five six" and "how much wood could a woodchuck chuck if a woodchuck could chuck wood" both obtain "centuries" on zxcvbn's scoreboard, which are quite ludicrous with serious consequences if taken on as seed passphrase for BITCOIN wallets.

The Revised Strategy

The efficacy of the memorization strategy laid out here has been proven highly helpful, except those passphrases being used daily. They have been replaced by some different set of passphrases which seem to survive better the test of time based on an alternative tried and true memorization technique.

MiniLock Key Stretching

The passwords collected at the service providers' typically trigger a run of some hashing logic, which can be further extended as a "key derivation" function. The key derivation hash function achieves the biggest gain, maximizing the ratio of crack time from 1 to 100,000 with Argon2 as the preferred algorithm. The client-side salt is also a big winner in thwarting the dictionary attack and injecting entropy into the fray without taxing our rain too much. Ai-Fi.net offers all options in terms of key stretching and salt for our users to adjust their creation of master passphrases. Make sure you understand why we throw in many options and adopt the appropriate level of security per intended application.

| Passphrase length | | | | | | | | |
|---|---|---|---|---|---|---|---|---|
| | | | Random-character passphrase | | | | | |
| Random word passphrase | | | Alphanumeric | Alphanumeric | | Valid | | |
| Short | Long | Lowercase | lowercase | case-sensitive | All printable | English | Attack cost on Amazon | |
| Diceware | Diceware | (a-z) | (a-z, 0-9) | (A-Z, a-z, 0-9} | (ASCII 32-126) | sentence | Today | Year 2030 |
| 4.9 words | 3.9 words | 10.7 characters | 9.8 characters | 8.5 characters | 7.7 characters | 8.9 words | $1,280,000 | $10,000 |
| 5.2 words | 4.2 words | 11.4 characters | 10.4 characters | 9.0 characters | 8.2 characters | 9.4 words | $12,800,000 | $100,000 |
| 5.5 words | 4.4 words | 12.2 characters | 11.1 characters | 9.6 characters | 8.7 characters | 10.0 words | $128,000,000 | $1,000,000 |
| 5.8 words | 4.7 words | 12.9 characters | 11.7 characters | 10.2 characters | 9.2 characters | 10.6 words | $1,280,000,000 | $10,000,000 |
| 6.2 words | 4.9 words | 13.6 characters | 12.3 characters | 10.7 characters | 9.7 characters | 11.2 words | $12,800,000,000 | $100,000,000 |
| 6.5 words | 5.2 words | 14.3 characters | 13.0 characters | 11.3 characters | 10.2 characters | 11.8 words | $128.000,000,000 | $1,000,000,000 |

"?Out//look\\" s imuch weaker than "Facebook sucks?" The first contorted password pattern is hard on us humans, but fails to impress the password cracker. The diplomatic "?" in the second pattern has gotten us quite a bit extended mileage.

Zxcvbn assigns low scores to words of high usage frequency. This is consistent with the classical attack scenarios where high frequency words are more likely to recur in those pwned collections. However, as all other password strength meters, it relies on various heuristics in making educated guesses on how the candidate passwords are formulated in users' brains. Those heuristics are as varied as the models they are based on and their dictionary sizes. For instance, Securing the Passphrases Our Raw Memory Capacity As has been suggested, the best approach to secure our secret is to tie them to a mental mechanism requiring our entering of a high-entropy passphrase to open it.

The concern for self-maintained passphrases is their cryptographic strength and our ability in reliably memorizing them. Even for conscientious users who want to maximize the protection of passphrases, its strength tops out at around 100 bits of entropy if requiring memorization. Deciding on a secure passphrase for secret preservation is a tug of war between the ease of memorization and their built-in entropy. Some additional facilities are needed to boost their strength when deemed necessary.

We will be offering some suggestions about how we can improve our ability in memorizing our passphrases that we find useful.

The Memory Code of Imagery

Modern humans suffer a severe case of memory atrophy. We compensate for this particular atrophied brain function by many memory aids, such as pen and pencil, maps, computer storage, notebooks, password manager, etc. The smartphones have undoubtedly accelerated its pace of deterioration. Those memory aids work adequately in most cases except when we need to keep some information to ourselves as secrets. Passwords are the obvious examples, any tangible records of which may jeopardize their purpose of existence. Secrets, by definition, are not supposed to be outsourced. The promise of decentralization and our independence from surveillance capitalism require some minimal efforts on our part. A tiny amount of memorization appears to be inevitable.

Our memory capacity has not been this week in the past. As a matter of evolution, we have all been champions of memorization until recently. The North American Navajo, for example, named and classified over 700 species of insect by memory. The African Dogon systematically classified about 300 vegetables. The Hanunóo in the Philippines named many more plants for the region than did Western science when botanists worked with them in the middle of the twentieth century. The Matsés peoples of Brazil and Peru have recently documented their traditional medicine in a 500-page encyclopedia to ensure the information is not lost. Before it was written down, their entire corpus of Amazonian plant knowledge was stored primarily in memory. In contrast, our modern day white-collar workers need to write down their password on a post-it and stick it to the back of their computer before losing it.

Many linguists believe all human languages derived from a single tongue spoken in East Africa around 50,000 years ago. Between the birth of this "proto-human language" and the invention of *papyrus* for recording words around 5000 BCE, we humans had managed to create, maintain and communicate a vast amount of knowledges shared among ourselves, and our communities had evolved from hunter-gatherers to an agricultural society with extensive human interaction for passing down vital information including seasonal changes; astronomical events; patterns among the stars; land management and irrigation plans; shaman practices; medicinal plants; animal identification and behavior; law and ethics; genealogies; and countless other uniquely human experience that made us the dominating species on the planet. We had accomplished these amazing feats all without relying on any literate implements or writing materials, We *Homo sapiens* took full advantage of our memory faculty in that long period of time without written words and still managed to flourish.

Our memory does not work like a video camera, but an associative machine that distributes (encodes) different aspects of our experience and ideas, real or imaginary, to various functional parts of the brain for easy retrieval when needed. The key to memorization is not rote repetition but breaking apart the subject matter methodically and archiving subparts into our brain organically. It is believed that our ancestors in those earlier non-literate vocal cultures had developed an extraordinary ability to encode vast amounts of information using a wide range of memory aids through the ancient mnemonic technologies of "memory spaces."

Applying the same methodologies, modern day memory competition champions can memorize 616 random numbers in 5 minutes, a deck of cards in 12.74 seconds, and 335 words in 15 minutes. For protecting our Cryptons, we only need to memorize measly 4 to 6 "random" words. That ought to be a cinch even under the severe threat of atrophy of our memorization faculty. We just need to recover the lost art of ancient memorization technologies. After viewing a highly instructive video: https://www.youtube.com/watch?v=JbLAGpQ9RXg, most of us manage to memorize the passphrase "mother butter apple coffee blossom", apparently totally random, in 1 minute.

Better yet, the phrase can be extended longer still without much additional effort (e.g. placing more things on the folding table or releasing some animals on the lawn). Imagery is so much easier to retain in memory and perfectly in tune with how our brain works.

The Memory Code of Context

Our ability of conceiving an ad hoc imagery for the placement of objects to be memorized may not be as sharp as we want. A different mental apparatus based on familiar spatial environments is known as memory palace, memory journey, or method of loci. It relies less on imagery, but more on depositing items to objects in a familiar landscape or route. When desiring to remember a set of items the subject 'walks' through these loci in their imagination and commits an item to each one by forming an image between the item and any feature of that locus. The method relies on memorized spatial relationships to establish order and recollect memorial content. The "palace," loci, journey, landscape or route in this approach is as fixed and permanent as possible in order for our imaginations to anchor on. Some scholars suggest Stonehenge is actually one such "palace." It can even be built upon something portable as the "lukasa".

We found this short training video helpful: https://www.youtube.com/watch?v=PIbz_gKwOXY. The science behind it can be found at here. After months of using our previous set of passwords, "aifinet protects my privacy" and "google protects my privacy," we found them to fade rather quickly, as both are based on rather abstract concept without concrete contexts to hang (literally) those concepts on. They seem to escape from our brains easily. On the other hand, the phrase "disney BLM Main deck" has passed the test of time since they are first created and tightly attached to an area in Los Angeles we frequently hang out. There is no substitute for real-life experience attached to concrete and tangible context (pictures) as far as memory goes. A picture is worth a thousand words, literally.

As a side note, those palaces and lukasa are memory aids and persistent fixtures by design. They become useful and intelligible only after we instill live content to them. This may be the reason why the Stonehenge and many sites like it had become archeological mysteries after we collectively lost their original contents.

The Real Strength Test

The effort required to memorize passwords is much lighter than those traditional memorization tasks of recording real objects and factual events. All we need to do is to fabricate an imaginary context to aid our memorization of passwords.

Unlike those ancient memory techniques aimed mainly for recording knowledge and history, we have considerable latitude in creating and memorizing our secret passphrases. We don't need them to match rigorously with any real objects or events as long as they exhibit a high degree of randomness to people not in the know and easy retrievability when needed. If the "palace" itself grows out of our own personal environment, like the layout of our homestead or the walk in our neighborhood, and some of the objects or concept we commit to individual feature of the loci emerge by happenstance (but "memorable"), the randomness aspect of the requirement is easily satisfied. Let's look at an example: "disney BLM Main deck" based on a walk route in downtown Los Angeles, where "disney" sources from Walt Disney Concert Hall on 1st and Grant, "BLM" a protest rally taking place in front of the LAPD Headquarters a while ago, "main" is the street where the City Hall is on, which offers a landmark of high and beautiful observation "deck" for the best view of Los Angeles cityscape (free of admission charge to boot). This 4-word passphrase is reasonably strong for our purpose and not too shabby compared to Diceware. It is indestructible if further augmented with our "Entropy Extender."

For any "random" collection of words, a few excellent sites will verify its strength. For example, we've found the following site quite professional and capable:

https://www.onlinehashcrack.com https://emn178.github.io/online-tools/sha256.html: This is to enter your passphrase to get the output hash in desired format, which you enter into the previous onlinehashcrack.com for password cracking.

We have submitted 2 passphrases, each consisting of 4 "words" created during our first few experiments with those memory crafts introduced by some YouTube videos, spending less than 30 minutes total. Both passed the onlinehashcrack.com test after rigorous crack efforts in 3 days continuously.

The Fuzzy Search Utility

Sometimes we do suffer some memory lapse and only remember the gist of the context where the passphrases are first created. For instance, the picture presented previously with cherry blossoms may not trigger the exact recall of the phrase "mother butter apple coffee blossom". However, we still remember the vivid picture with all the objects in it, except we may not recall the order of words or the exact number of objects in the phrase (for example, is the butter churner, the green grass, or the side table part of the phrase?). Some of the syntactic rules may also no longer be retrievable, such as the capitalization of the involved words. In those cases, we tend to explore various possibilities trying to recover it, especially when a large sum of cryptocurrencies is involved. The permutations of words would grow to a large number rather quickly.

For password recovery in those cases, we have designed a utility to ease your trial and error by offering a special mode of "Fuzzy Search," under which you only need to offer a list of words and checkbox a few simple rules such that the trial and error would be automated by this utility. This Fuzzy Search still requires the memory aids you have employed at the creation of the password. The utility presumes that the pictures or the memory palace is still uniquely yours and we only permute through the possibilities to compensate for the fuzziness.

This is obviously assuming that the passphrase and its original context remain secure without leakage. The only help one needs is to recover the exact number of words in the password and their order.

Figure 20:
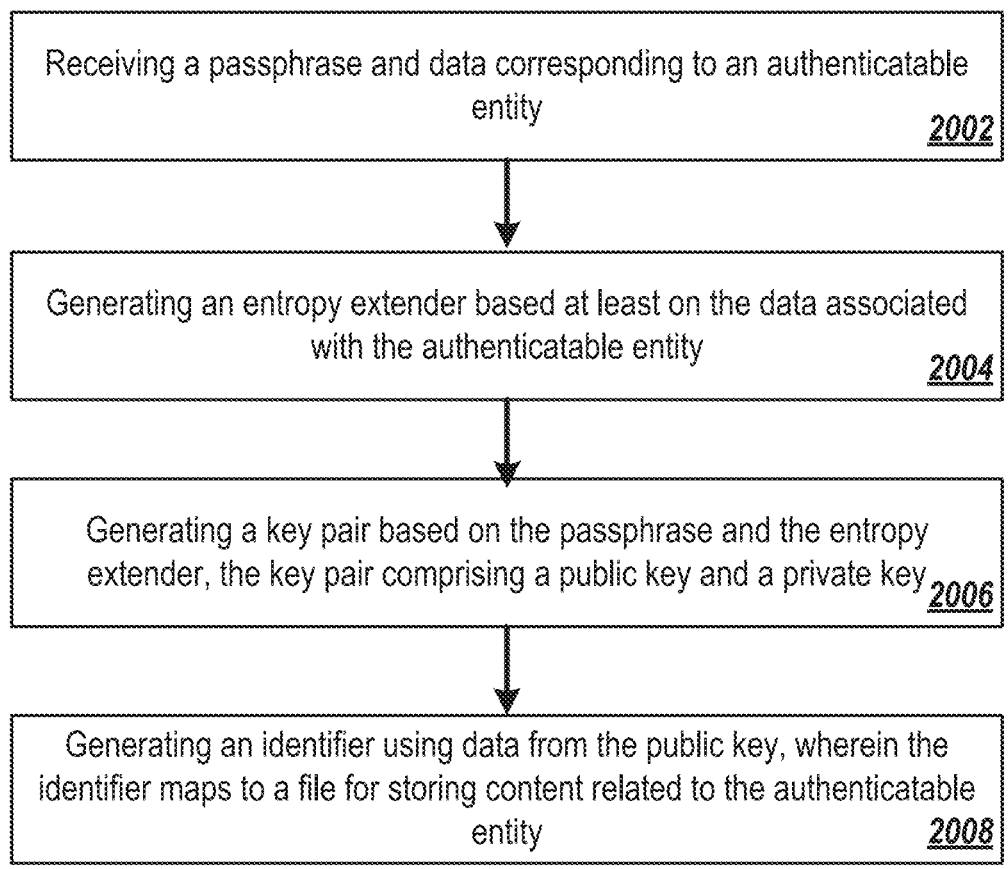
FIG. 20 is a flow diagram that illustrates an example process for generating a PEX token.

FIG. 20 is a flow diagram that illustrates an example process 2000 for generating a PEX token. The process 2000 can be performed by the device 201 and a server or client device associated with FIG. 1.

The server can receive a passphrase and data corresponding to an authenticatable entity (2002). An authenticatable entity can include, for example, individual, group, account holder, or organization on behalf of whom the request was issued, or that owns cryptocurrency protected by the token. The authenticatable entity may send a request from a client device to a server to create a token for a block chain, financial transactions, or other transactions. In some cases, the authenticatable entity may interact with a personal computer or desktop and send a request to create or access the token. In particular, the request can include a passphrase that corresponds to a human-readable passphrase. The data corresponding to the authenticatable entity can be data associated with the client device of the authenticatable entity and/or from which the request was submitted, data associated with at least one of an email address, a telephone number, a social security number, or a random identifier.

The server can generate an entropy extender based at least on the data associated with the authenticatable entity (2004). The server first generates an entropy extender by evaluating the entropy strength of the passphrase. For example, the server evaluates the entropy strength of the passphrase based on a configured strength requirement, e.g., greater than or equal to 100 bits. The server may use an open source method of "zxcvbn" to perform the entropy strength evaluation. If the server determines the passphrase does not satisfy the entropy strength requirement, then the server provides a notification to the user that the passphrase does not meet the required length and requests a new passphrase. In some implementations, the server may provide a recommended passphrase for the user. In some implementations, the user can provide a passphrase that meets the configured strength requirement.

In response to providing the passphrase that meets the configured strength requirement, the authenticatable entity can provide the data identifying the authenticatable entity for entropy enhancement. For example, the data for entropy enhancement can include a personal email address, a social security number, a telephone number, an additional word list, arbitrary bit string, and/or a random string generation. In response, the server can use the data identifying the authenticatable entity as an entropy extender. The entropy extender may be written down and stashed away in notebooks or stored elsewhere in multiple locations.

The server can generate a key pair based on the entropy extender and the passphrase, the key pair comprising a public key and a private key (2006). Once the passphrase and the entropy extender are satisfactorily created, the server can combine the passphrase and the entropy extender in a variety of ways. For example, the server can concatenate them, mix them, encode them, or hash them together. In some cases, the server can hash the passphrase and the entropy extender together using multiple hashing functions. The information provided will be combined and scrambled through a rigorous key derivation function or KDF (including but not limited to Script or Argon2d, with a large number of hash rounds) to generate a PKI key pair. For example, the server can use Argon2 as a key derivation scheme and rely on Curve25519 key pairs generated in the last phase 9. The key pairs generated from the hash key deviation scheme can include a public key and a private key.

The server can generate an identifier using data from the public key, wherein the identifier maps to a file for storing content related to the owner (2008). The identifier may be a token identifier, for example. In particular, the server can generate the token identifier by transforming the public key, e.g., performing a hashing function or a Diffie Hellman scheme that encrypts the token and enables forward secrecy, on the generated public key.

The server can store data associated with the token identifier with a plurality of tokens. Specifically, the server can generate the data associated with the token identifier by performing a hashing function on the token identifier. For example, the server can perform one or more hashing functions on the token file name: "GCZV4NNTSL5MEJEYIMLESFV2NC2JFT4LHAIXIBH DGLXJVH63RW5DEGUZ". The resultant output can be used for storage purposes. For example, the server may include an append-only log file containing all the request/response status logs and the hashed tokens. By storing only the hashes of each token identifier in the log file, the entropy of the protection scheme is reduced, should the log file ever leak. The log can store hash values of other token identifiers for other users as well. Additionally, when a user requests for a token service, at the completion of fulfilling the request a receipt is returned to indicate the successful operation of the request and prove the Ai-Fi's possession of the submitted token file if the operation is a Create or Write. For example, the request may indicate a creation of the token identifier. In another example, the request may indicate a write operation for an additional transaction, such as a block chain transaction, of the token identifier. Thus, the log can include an indication of a type of operation performed when the token identifier was created.

In some implementations, the server can determine whether storing the data associated with the token identifier was successful based on the hashing function performed on the token identifier. If no errors occurred during the hashing function of the token identifier, e.g., no identical hash was created or other permissions error, then the server can deem that a successful storing of the token identifier. Alternatively, should the creation of the hashing function performed on the token identifier fail, then the server can determine an unsuccessful storing of the token identifier.

In response to successfully storing the data associated with the token identifier, the server can provide data indicating a type of storing of the data identifying the token identifier. The data can include a receipt that describes the (i) the requested transaction, (ii) the operation performed, e.g., create or write, (iii) date and time when the operation was performed, (iv) data identifying the token identifier, and (v) data identifying the public key and private key. The server can also identify and provide other data associated with the transaction as well.

In some implementations, the system can also include a set of wallets that interact with the network and store the private key generated by the request. Specifically, a front-end wallet, which typically resides with a primary seal and operates in watch only mode, and relies on multiple back end wallets for signatures. The front-end wallet and multiple back end wallets can communicate with one another. For example, in a cryptocurrency environment, a crypto wallet can be separated into two parts, the software "front-end" wallet, which interfaces directly with the blockchain network, and a separate back-end "key vault," a custom hardware which hosts all the private keys and signs all the crypto transactions. Each wallet, e.g., front end and back end wallets, can include a token identifier. In order for a user to access the front end and the back end wallets, the owner will require a token identifier for each of the wallets. Sometimes a hardware wallet may be built on a simple bootable device of USB or CD ROM with similar or weaker protection if incorrectly implemented. The Front-End wallet runs on the smartphone. The hardware wallet is embodied in a dedicated device (Trezor One). The interface between the Front-End wallet and its hardware back-end may be through some wired (USB as shown) or wireless (e.g. Wi-Fi, Bluetooth) means, in which case a "pairing" step needs to take place before both wallets may interoperate with each other. It may also be "air-gapped", in which case the hardware wallet may be off the network altogether and the communication are conducted through some manual means such as copy-and-paste across devices, 2D barcodes or QR codes, etc., which reduces the attack surface but is by no means attack proof.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by one or more processors, a passphrase and data corresponding to an authenticatable entity;
   generating, by the one or more processors, an entropy extender based at least on the data associated with the authenticatable entity;
   generating, by the one or more processors, a seed based on the entropy extender and the passphrase, wherein the seed is associated with a wallet of the authenticatable entity;
   generating, by the one or more processors and based on the seed associated with the wallet of the authenticatable entity, key pair comprising a public key and a private key; and
   generating, by the one or more processors, an identifier using data from the public key, wherein the identifier maps to a file for storing content related to the authenticatable entity.

2. The computer-implemented method of claim 1, further comprising:
   storing, by the one or more processors, data associated with the identifier with a plurality of identifiers; and
   in response to successfully storing the data associated with the identifier, providing, by the one or more processors, data indicating a type of storing of the data identifying the identifier.

3. The computer-implemented method of claim 1, wherein (i) the passphrase is a human readable passphrase and (ii) the data corresponding to the authenticatable entity is at least one of an email address, a telephone number, a social security number, and a random identifier.

4. The computer-implemented method of claim 3, wherein generating the key pair based on the passphrase and the entropy extender further comprises:
- evaluating, by the one or more processors, a strength of the passphrase, wherein the strength is based on a configured strength requirement;
- determining, by the one or more processors, the strength of the passphrase satisfies the configured strength requirement;
- generating, by the one or more processors, the entropy extender that comprises at least one of the passphrase and the data representing the authenticatable entity based on the strength of the passphrase satisfying the configured strength requirement;
- generating, by the one or more processors, a set of inputs to a KDF that comprises the passphrase and the entropy extender using multiple iterations of cryptographic calculations; and
- generating, by the one or more processors, the key pair comprising the public key and the private key from results of KDF.

5. The computer-implemented method of claim 4, wherein generating the identifier using the data from the public key further comprises:
- generating, by the one or more processors, the identifier by transforming the public key; and
- mapping, by the one or more processors, the identifier to a name of the file that stores content associated with the authenticatable entity.

6. The computer-implemented method of claim 2, wherein storing the data associated with the identifier further comprises:
- generating, by the one or more processors, a key associated with the identifier by performing a function associated with a Diffie Hellman scheme that encrypts the data associated with the identifier and enables forward secrecy; and
- storing, by the one or more processors, the data associated with the identifier with other hashed representations corresponding to each identifier of the plurality of identifiers.

7. The computer-implemented method of claim 6, further comprising:
- storing, by the one or more processors, the data associated with the identifier based on a type of operation included in the received request, wherein the type of operation comprises a create operation or a write operation.

8. The computer-implemented method of claim 6, wherein storing the data associated with the identifier comprises storing an entry in a log file containing each identifier of the plurality identifiers.

9. The computer-implemented method of claim 1, wherein the authenticatable entity can include at least one of an individual, a group, an account holder, and an organization.

10. The computer-implemented method of claim 1, further comprising:
- generating, by the one or more processors, a first wallet that enables interfacing with a transactional network and data in the first wallet is protected by a first seal and a corresponding identifier;
- generating, by the one or more processors, a plurality of second wallets, each second wallet storing a component of data for a requester and each second wallet is protected by a second seal and a corresponding identifier, wherein the first wallet and the second wallet can communicate;
- receiving, by the one or more processors, a request to access at least one second wallet of the plurality of second wallets from the requester, wherein the request includes the corresponding identifier to access the first seal of the first wallet and the corresponding identifier to access the second seal of the second wallet; and
- granting, by the one or more processors, access to the data within the plurality of second wallets based on the identifiers being used to unseal the first wallet and the second wallet.

11. The computer-implemented method of claim 10, wherein the plurality of second wallets are structured as a live system, and the method comprises:
- authenticating, by the one or more processors, the authenticatable entity with the live system using an additional token based on the passphrase and the entropy extender.

12. The computer-implemented method of claim 1, further comprising deriving, by the one or more processors, the passphrase from biometric data recorded from the authenticatable entity.

13. A system comprising:
- one or more computers and one or more storage devices storing instructions that are operable, when executed by the one or more computers, to cause the one or more computers to perform operations comprising:
  - receiving, by one or more processors, a passphrase and data corresponding to an authenticatable entity;
  - generating, by the one or more processors, an entropy extender based at least on the data associated with the authenticatable entity;
  - generating, by the one or more processors, a seed based on the entropy extender and the passphrase, wherein the seed is associated with a wallet of the authenticatable entity;
  - generating, by the one or more processors and based on the seed associated with the wallet of the authenticatable entity, key pair comprising a public key and a private key; and
  - generating, by the one or more processors, an identifier using data from the public key, wherein the identifier maps to a file for storing content related to the authenticatable entity.

14. The system of claim 13, further comprising:
- storing, by the one or more processors, data associated with the identifier with a plurality of identifiers; and
- in response to successfully storing the data associated with the identifier, providing, by the one or more processors, data indicating a type of storing of the data identifying the identifier.

15. The system of claim 13, wherein (i) the passphrase is a human readable passphrase and (ii) the data corresponding to the authenticatable entity is at least one of an email address, a telephone number, a social security number, and a random identifier.

16. The system of claim 15, wherein generating the key pair based on the passphrase and the entropy extender further comprises:
- evaluating, by the one or more processors, a strength of the passphrase, wherein the strength is based on a configured strength requirement;
- determining, by the one or more processors, the strength of the passphrase satisfies the configured strength requirement;
- generating, by the one or more processors, the entropy extender that comprises at least one of the passphrase and the data representing the authenticatable entity based on the strength of the passphrase satisfying the configured strength requirement;

generating, by the one or more processors, a set of inputs to a KDF that comprises the passphrase and the entropy extender using multiple iterations of cryptographic calculations; and generating, by the one or more processors, the key pair comprising the public key and the private key from results of KDF.

17. The system of claim 16, wherein generating the identifier using the data from the public key further comprises:

generating, by the one or more processors, the identifier by transforming the public key; and mapping, by the one or more processors, the identifier to a name of the file that stores content associated with the authenticatable entity.

18. The system of claim 14, wherein storing the data associated with the identifier further comprises:

generating, by the one or more processors, a key associated with the identifier by performing a function associated with a Diffie Hellman scheme that encrypts the data associated with the identifier and enables forward secrecy; and storing, by the one or more processors, the data associated with the identifier with other hashed representations corresponding to each identifier of the plurality of identifiers.

19. A computer-implemented method comprising:

receiving, by one or more processors, a passphrase and a user-provided input corresponding to an authenticatable entity, wherein the user-provided input comprises information for generating an entropy extender that enhances a uniqueness of a seed associated with a wallet of the authenticatable entity;

generating, by the one or more processors, the entropy extender using a key derivation function based at least on the user-provided input corresponding to the authenticatable entity, wherein the entropy extender, in combination with the passphrase, enables rate-limited, portable access to a remote storage system through multi-factor authentication, including knowledge-based authentication via the passphrase and possession-based authentication via the entropy extender stored in a human-readable format, without requiring personally identifiable information;

generating, by the one or more processors, a key pair using the passphrase; the entropy extender and based on the seed associated with the wallet of the authenticatable entity, the key pair comprising a public key and a private key;

generating, by the one or more processors, an identifier using data from the public key, wherein the identifier maps to the wallet for storing content related to the authenticatable entity.

20. The computer-implemented method of claim 19, wherein the user-provided input comprises at least one of a cryptographic value, a biometric hash, a token, or a user-selected string.

21. The computer-implemented method of claim 19, wherein the multi-factor authentication further includes biometric-based authentication in which the user-provided input includes a biometric hash.

* * * * *